United States Patent [19]

Smith et al.

[11] 4,330,828

[45] May 18, 1982

[54] METHOD OF CONTROLLING PRODUCTION PROCESSES AND APPARATUS THEREFOR

[75] Inventors: Richard L. Smith, Livonia; Kent V. Allen, New Baltimore, both of Mich.

[73] Assignee: Scans Associates, Inc., Livonia, Mich.

[21] Appl. No.: 83,832

[22] Filed: Oct. 11, 1979

Related U.S. Application Data

[63] Continuation-in-part of Ser. No. 926,913, Jul. 21, 1978, Pat. No. 4,250,543.

[51] Int. Cl.³ .................... G05B 11/36; G05B 13/02; G01M 19/00

[52] U.S. Cl. .................... 364/431; 73/118; 318/561; 364/160; 364/164; 364/176

[58] Field of Search .............. 364/424, 425, 431, 442, 364/558, 510, 105, 108; 73/118, 116, 117.2, 117.3; 318/609, 610, 611, 621, 624, 561; 324/15, 16, 19, 378

[56] References Cited

U.S. PATENT DOCUMENTS

| | | | |
|---|---|---|---|
| 3,524,344 | 8/1970 | Converse et al. | 73/118 |
| 3,851,523 | 12/1974 | Converse et al. | 73/118 |
| 3,925,640 | 12/1975 | Duggan | 364/118 |
| 3,975,953 | 8/1976 | Smith et al. | 73/118 |
| 4,030,351 | 6/1977 | Smith | 73/118 |
| 4,151,588 | 4/1979 | Hammer | 364/105 X |

*Primary Examiner*—Joseph F. Ruggiero
*Attorney, Agent, or Firm*—Dolgorukov & Dolgorukov

[57] ABSTRACT

A method and apparatus for controlling production processes utilizing a three-state, four-mode process controller which operates on the basis of counteracting any process change by utilizing the difference between a feedback signal related to a current condition of the process and a desired value related to the desired condition of the process, and a signal related to the rate of change between said feedback signal and said desired value signal, to produce a correction signal which is utilized to operate said three-state, four-mode process controller in its three states depending on certain relationships between the value of the desired value and feedback signals, as well as the summation of those values.

104 Claims, 40 Drawing Figures

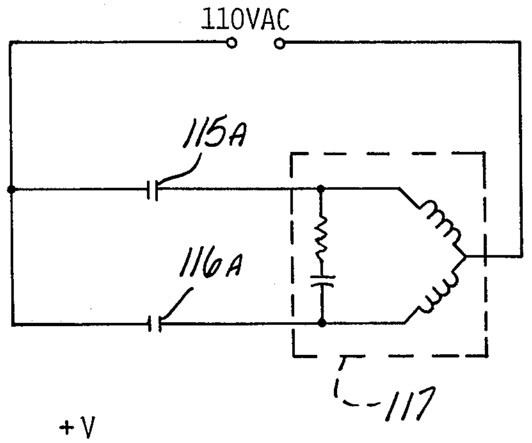
Fig-18
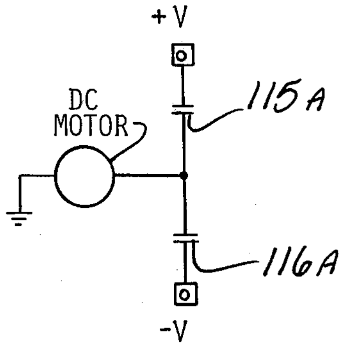
Fig-19
Fig-20
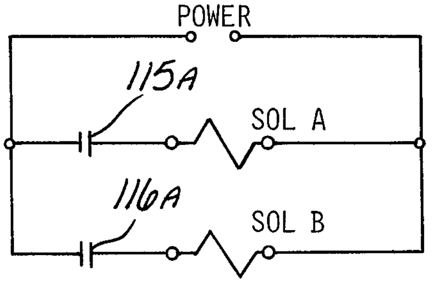
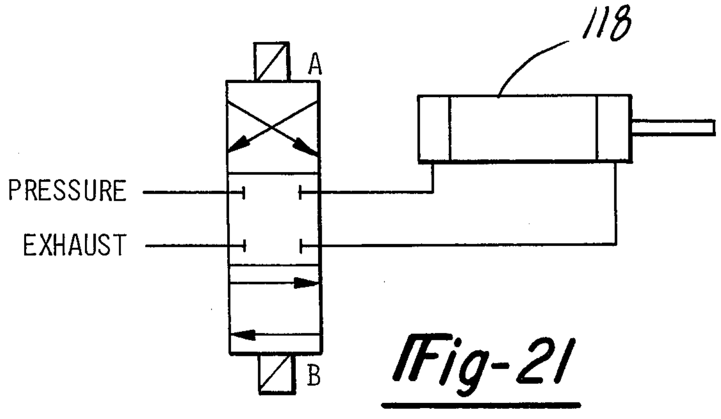
Fig-21

METHOD OF CONTROLLING PRODUCTION PROCESSES AND APPARATUS THEREFOR

This application is a continuation-in-part of the earlier filed co-pending application of Richard L. Smith and Kent Van Allen, Ser. No. 926,913, filed July 21, 1978 U.S. Pat. No. 4,250,543 for "Method of Controlling Production Processes and Apparatus Therefor".

The specification of said earlier filed co-pending application, though largely repeated herein for clarity and ease of understanding, is also specifically incorporated herein by reference.

The present application relates to process controllers and more particularly to an improved process controller wherein the controlling of production type processes and laboratory type processes is more accurate and faster than with those controllers presently available.

We have long been involved in the process controller art by virtue of the need to quickly and accurately control processes involved in equipment for the testing of carburetors, such as those disclosed in the U.S. Pat. Nos. 3,517,552; 3,524,344; 3,851,523; 3,896,670; 3,975,953 and 4,030,351. Processes which must be controlled in the carburetor testing stands are hood pressure, manifold vacuum, air flow, and fuel pressure, among others. When controlling manifold vacuum, the control of the throttle plate of the carburetor to bring it to a desired position to produce a desired manifold vacuum is most critical. In the early days of carburetor testing when perhaps one or two test points were involved, and accuracy requirements were low, test time was not a particularly important factor. However, with the present day emphasis on fuel economy and exhaust emissions, and the need to test automobile carburetors at many points within their operational range, the ability to move the carburetor throttle plate, and thus produce a desired air flow and manifold vacuum at many test points quickly and accurately, is becoming increasingly important.

During the time when low accuracy requirements permitted at simple set of relay contacts operating a motor to cause the throttle plate to move from one position, such as off-idle, to another position, such as part throttle, complex controls were not needed. However, as tests became more complicated and accuracy requirements became tighter, a search was made to determine a better way to cause the movement of the throttle plate from one position to another.

The idea of using a motor which could be moved in gross amounts clockwise and counterclockwise, such as by relay contacts, was abandoned, and the use of a motor which could be moved at two different speeds and could be shut off once the process was at or close to its desired value, called deadband, was instituted. Thus, the motor would move at a fast rate of speed when the process was far away from the desired value, and move at a much slower rate of speed when the process was near the desired value. However, as much of an advance at this two-speed throttle drive or process controller actually was over the prior art, it soon became too slow for the ever increasing demands of production processes. This was primarily because there were only two fixed speeds, and if the process underwent rapid change, there would be quite a time lag for the throttle controller to adjust the throttle plate to a new condition within the deadband limits, which were becoming smaller because of still tighter accuracy requirements.

Therefore, further experimentation led to the invention of a throttle drive for a carburetor test stand having a proportional speed feature, in which the speed of the driving motor was proportional to the amount of error in the process. This invention, of which one of the co-inventors in the present case was a co-inventor, led to the grant of the U.S. Pat. No. 3,975,953, and it was thought that at long last one of the major problems in the carburetor industry was solved.

Between the time of making that invention, and the present day, it was found that in laboratory carburetor test benches where actual values for production tests of carburetors are determined, where, in addition to throttle control, both manifold vacuum and carburetor inlet pressure (known as hood pressure) control are required, it was desirable to improve the speed and accuracy of the tests. At that time, such control of manifold vacuum and hood pressure was done using conventional process controllers, while throttle control was normally performed manually by the test stand operator. It was found that with the use of a computer it was possible to effectively use process control utilizing optimum rate, reset and proportional values for all three parameters—throttle, manifold vacuum and hood pressure. Because of the dedication of the computer to one test stand, not only would you get the laboratory type accuracy which was desired, but also the testing speed became faster. This invention led to the grant of U.S. Pat. No. 4,030,351 for Method and Apparatus for Production Testing of Carburetors by one of the co-inventors.

During the years that were passing by while these developments were taking place, the demand for even faster and more accurate production test stands were being made, and we were compelled to embark on further research to see if we could not get the testing time required for a typical carburetor test below the current test time of approximately 9 minutes for a particular model carburetor, and at the same time obtain the accuracy given by our laboratory test stands previously mentioned.

The mere implementation of the method used in our laboratory test stands might suffice to solve this serious problem in the art. However, upon studying the disclosure in the aforementioned U.S. Pat. No. 4,030,351 one will note that there is a dedicated computer devoted to just one test stand. In the production testing of carburetors, a computer is normally used to control as many as sixteen (16) or more test stand simultaneously.

When you close a process loop with a computer as mentioned above, you restrict the computer's ability to perform other tasks efficiently, thereby slowing the entire process and making it not feasible to control many stations simultaneously. It was for this reason that an extension of the laboratory test stand concept to the production line was impractical. Also, it would be prohibitively expensive to have a dedicated computer for each production test stand when the quantity of production type test stands required for 100% testing of every carburetor manufactured is considered. Thus, while laboratory accuracy could be obtained, the obtaining of it at production rates provided major obstacles. Thus, we needed to find a novel way to have accuracy without a dedicated computer.

By looking at conventional three-mode controllers presently on the market, such as the Model No. 52H-5E made by The Foxboro Company of Foxboro, Massachusetts in an attempt to still use a conventional controller for accuracy, but to get away from the need for a computer, it was very quickly found that because of certain operational characteristics such controllers were not useable. One major consideration was that such controllers do not have a definite deadband. In other words, even though the process controller would operate the carburetor to get the throttle plate to the desired position, one could not automatically and economically stop the action of the process controller at that point, and thus one would have a continuous hunting situation around the desired set point, and one could not get a stable process. Furthermore, such controllers tend to have slower response than required for our test systems.

Further, there was not a single process controller on the market that controlled process operating devices of all three types that were required, namely the DC stepping motor, the AC synchronous motor and the pneumatic or hydraulic type positioner. This obviously than could not be a feasible solution, since the utilization of the available controllers would not produce a process controller capable of handling all the situations which are encountered in the time required with the necessary stability. Further, the standard controllers found to be available were capable of controlling processes only over a relatively narrow range and did not have adequate proportional, rate, and reset functions which were suitable to the processes which had to be controlled in the production testing of carburetors.

Abandoning the old three-mode controllers previously used and developing our own novel controller which controls a process as a function of the difference of, and rate of change between, a desired value and a current state of the process, and includes a deadband feature, we have developed a controller which gives laboratory results on a production line basis.

During the time when development was going on in the invention of our novel single-state four-mode controller, even more stringent requirements were placed on Applicants assignee to determine or make a machine which would test carburetors on a laboratory basis more rapidly then possible with the optimized rate, reset and proportional control discussed early in the present application. We thus had to find a way to speed up laboratory testing of carburetors also, for example, make their testing time ½ of that previously obtainable. To do this however, proved to be quite a problem.

Therefore, we were forced to reevaluate the systems used and previously described in our U.S. Pat. No. 3,517,552, 3,524,344, 3,851,523, 3,896,670, 3,975,953 and 4,030,351.

In the earliest of the patents as discussed there was either a one speed throttle drive which could operate in either direction or a two speed throttle drive with a deadband which of necessity had to have a circuitry designed so that they were not driven too fast because of a coasting problem inherent in the drive motor. You had to have a rather wide deadband also to stop the motor and hope that one would not coast out of the deadband or the system would go into a hunting condition which when supplied to any process being controlled would greatly decrease the ability to properly test the part and also greatly increase the time for going from one test point to another.

The second type of system we looked at was the one wherein the rate or rotation of the throttle plate of the carburetor, or by analogy a process device, was proportional to the difference between the actual and the desired process setting. We found that we could not speed up this system because of the same overshoot problem just mentioned and the fact that because this system was now several years old all of the circuitry which was designed for it used the standard type motor drives which could not be changed. We found also that if we went to a high speed motor drive we would again cause the overshoot problem and end up in a hunting situation. We therefore had to abandon the idea of speeding up the proportional control type of system.

We next looked at the system described in our U.S. Pat. No. 4,030,351 which involved the optimizing of rate, reset and proportion in going from one test point to another.

Theoretically we thought this would give us our solution if we could optimize the values in combination with the saturation of the circuitry previously described. However, we found an unexpected problem since at the time the circuitry was designed for the system which optimized rate, reset and proportion it was primarily designed for use at a constant altitude near sea level at the different test points wherein the optimization of the values was relatively easy.

However, when we tried to apply such technique to the testing of a carburetor under current reglations which require that the carburetor be tested regularly at various altitudes, we found the operation of the stand and the optimizing of the values became unwieldy to the point of being uneconomical to achieve even when a computer was used to aid in operation of the system.

Also, it must be remembered that our process controller is intended to be used to control many different process at many different desired values and it was found that whether a carburetor throttle is being controlled or a valve which may be used in a manifold vacuum or a hood pressure system, there was now a need to optimize the values for many different desired values which, while possible, was no longer economical. Thus we abandoned the idea of trying to obtain a faster test using a test device which works on the idea of optimizing the values of rate, reset and proportion.

Having tried all these existing ways to solve the problem of moving from one test point to another faster and having failed, we took a serious look at our basic premise of trying to avoid a process overshoot and decided to try a new approach of first intentionally causing both the process device and the process itself to overshoot to get the process in the approximate position of the correct value very fast, second having the controller reverse direction at a predetermined rapid speed to again cause the process to approach the new set point, and third controlling the process as previously described until the process was within a preselected deadband.

The effect of this can be seen by referring to FIG. 33 which is a graph of time versus the process correlate signal and process device position. Upon looking at the graph of the process correlate signal in relation to the process device position and by viewing this for what we choose to call the three-states of operation one can see that if one supplies a new desired value, one will cause the circuitry to saturate, as will be described hereinafter, and the process device will start moving rapidly with the process correlate signal following suit. It is to be noted that the process device is continued to be moved until the process correlate signal changes in polarity which means the process has reached the desired value for the first time completing what we shall term state one. The circuitry then enters what is called state two wherein the direction of process device movement is reversed. The process device is operated in this reverse direction rapidly while the rate of change of the error signal between the desired value and process correlate signals is now watched in addition to the error signal itself. It should be noted that the speed of such rapid movement is chosen by consideration of the response time of the process, and thus of the process correlate signal.

When the summation of the error signal and the rate of change signal changes polarity, the circuitry enters state three which is a return to the operation previously described in regard to the single-state four-mode controller. The effect on the test time by using this new method of operation can be seen by referring to FIG. 34 which compares the operation time of a strictly proportional circuit, the operation time of the single-state four-mode controller just described, and the operation time the three-state four-mode controller would typically take to move to a certain set point. The savings in time in using the three-state four-mode controller is very significant in view of the capitol investment which must be made in test equipment today and the ever increasing need for more and more laboratory type tests to meet current regulations. Before proceeding to the detailed operation of the three-state four-mode process controller, a brief discussion of the definition of the states and modes is in order. State one consists of a predetermined rapid, constant speed process device movement which continues until the error between the feedback signal and the desired value changes polarity. State two consists of a predetermined rapid, constant speed process device movement in the reverse direction which continues until the summation of the error between the feedback signal and the desired value signal and the rate of change of said error changes polarity. State three consists of the four-mode operation, in which the four modes are proportion, rate, minimum speed, and deadband as previously described.

Thus, one the objects of the present invention is to provide a new and improved process controller capable of providing laboratory accuracy at production process speed.

Another object of the present invention is to provide a controller of the above nature having a definite deadband capability.

Another object of the present invention is to provide a process controller which is capable of controlling DC stepping motor type operators, DC Servo motor operators, AC synchronous operators, and pneumatic or hydraulic positioners.

A further object of the present invention is to provide a process controller having a wide range capability.

A further object of the present invention is to provide an improved single-state four-mode process controller having rate, reset and proportional types of action which will quickly and accurately reach a value within a deadband range of the desired value and turn itself off, thus eliminating any hunting condition.

A further object of the present invention is to provide a four-mode process controller of the above nature which is capable of manual or automatic control.

A still further object of the present invention is to make an improved process controller which can easily set processes to a multitude of different conditions for use in setting different process conditions and can be directed to do so by any automation device.

A further object of the present invention is to provide a process controller of the above nature which is capable of controlling manifold vacuum across a carburetor during a carburetor test cycle.

Another object of the present invention is to provide a production type process controller capable of obtaining laboratory accuracy while controlling pressure inside a carburetor test hood.

Another object of the present invention is to provide a production type process controller capable of controlling the pressure of a liquid in a conduit in a quick and accurate manner.

Another object of the present invention is to provide a process controller of the above-described nature which is suitable for controlling air flow through a carburetor.

Another object of the present invention is to provide a production type process controller which is reliable and relatively inexpensive to manufacture.

Another object of the present invention is to provide a two-directional switched driver capable of controlling the operation of any two-directional device, such as an AC synchronous motor.

A still further object of the present invention is to provide a new and improved three-state four-mode process controller for laboratory use which will perform laboratory carburetor tests at rates much faster than previously possible.

A still further object of the present invention is to provide a laboratory type carburetor test facility in which movements from one test point to another test point are made very rapidly by the use of rate, reset, proportional, and deadband control.

A still further object of the present invention is to provide a laboratory carburetor test stand of the foregoing nature in which the device controlling the process in question is moved rapidly until the error signal representing the error in current state of the process changes polarity, and then the device is reversed in direction and moved rapidly until the summation of the error signal representing the error in current state of the process and the rate of change of said error signal changes polarity after which said system will operate in the normal manner using the combination of the rate, reset and proportional types of action until the signal is brought within the deadband range at which time the movement of the process device will stop.

Further objects and advantages of this invention will be apparent from the following description and appended claims, reference being had to the accompanying drawings forming a part of this specification, wherein like reference characters designate corresponding parts in the several views.

Figure 4A:
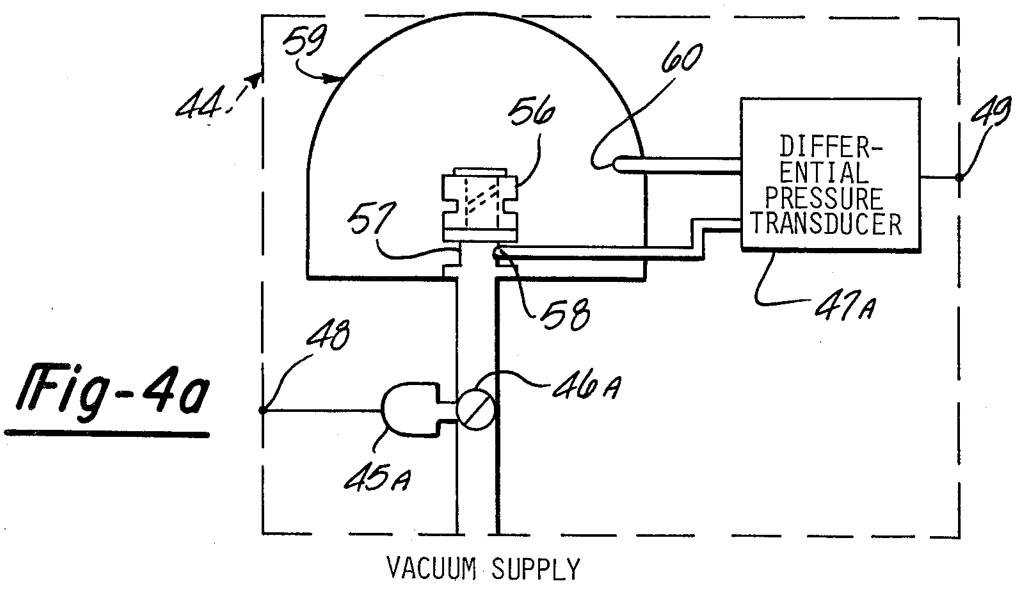

FIG. 4*a* is a diagrammatic view of a manifold vacuum control process which may be controlled utilizing a process controller embodying the construction of our invention.

Figure 4B:
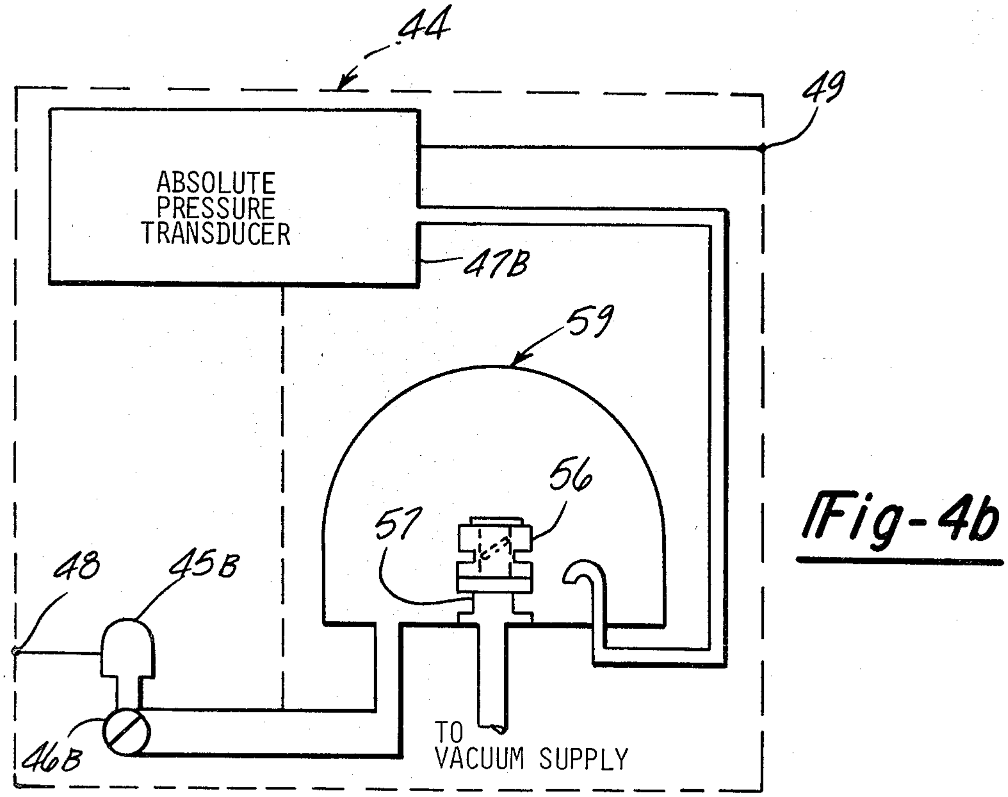

FIG. 4*b* is a diagrammatic view of a hood pressure control process which may be controlled utilizing a process controller embodying the construction of our invention.

Figure 4C:
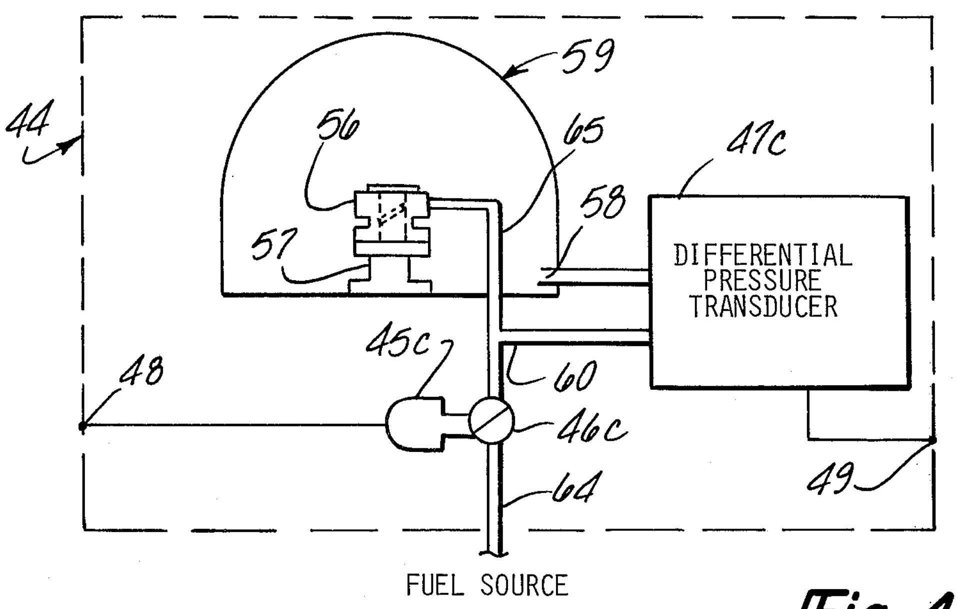

FIG. 4*c* is a diagrammatic view of a fuel pressure control process which may be controlled utilizing a process controller embodying the construction of our invention.

Figure 4D:
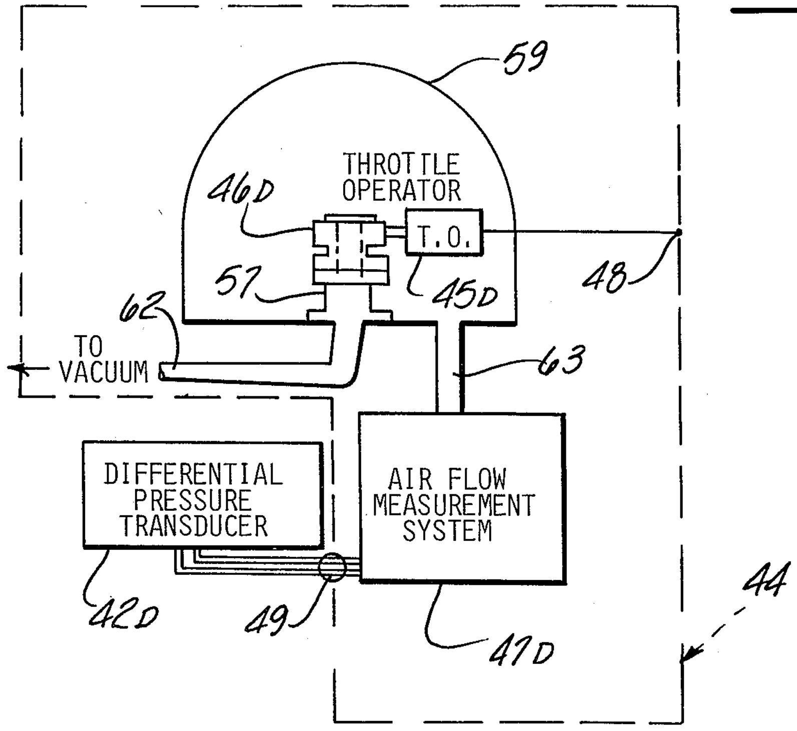

FIG. 4*d* shows an air flow measurement system which may embody the process controller which utilizes the construction of our present invention to control air flow with the throttle operator.

Figure 4F:
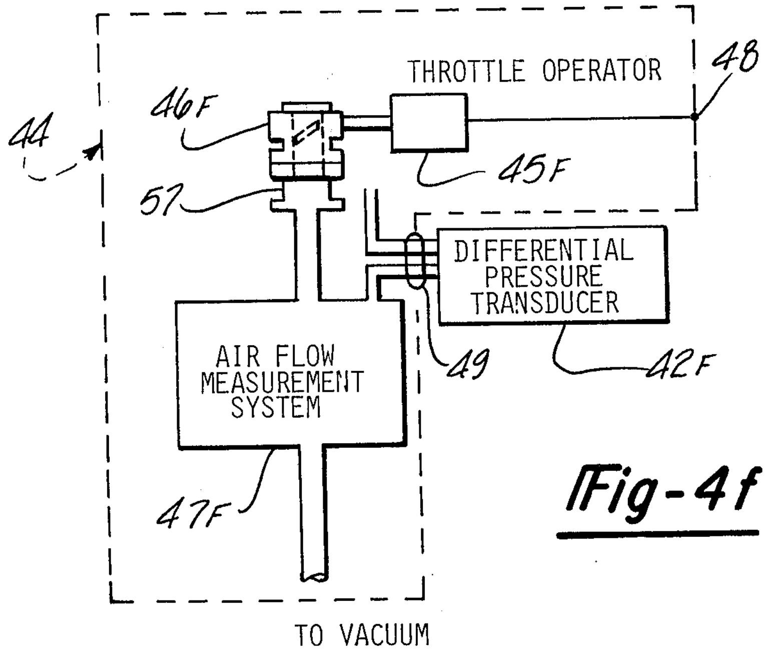
Figure 4E:
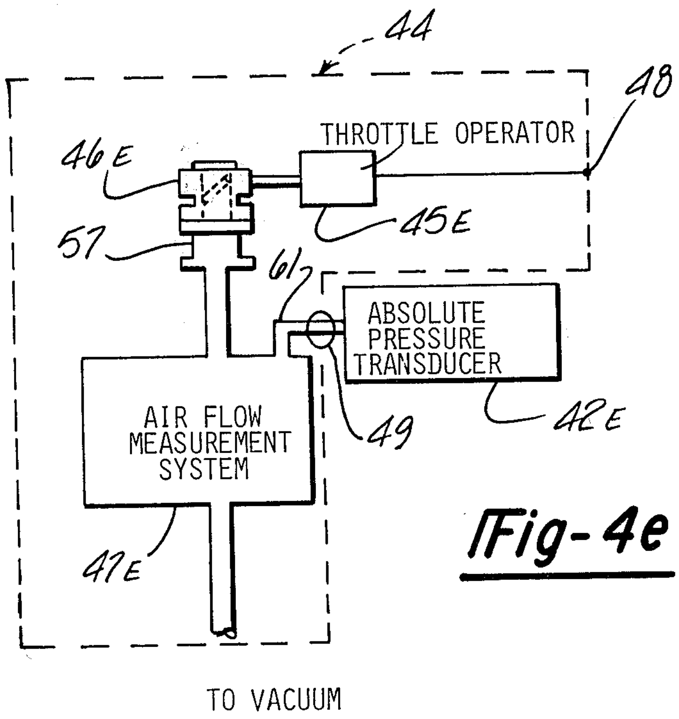

FIG. 4*e* shows an air flow measurement system similar to that shown in FIG. 4*d*, but using sonic flow devices, utilizing the process controller embodying the construction of our invention.

FIG. 4*f* is a view similar to that shown in FIG. 4*e*, but having the air flow measurement system operating in a controlled environment wherein a differential pressure transducer may be used to form the feedback signal device in place of the absolute pressure transducer.

Figure 5:
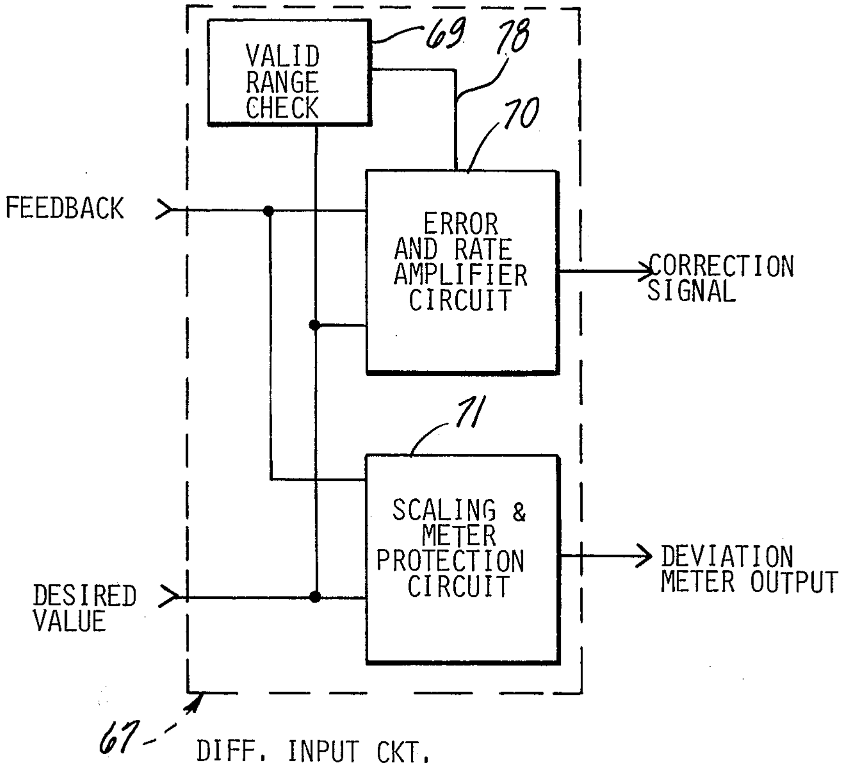

FIG. 5 is a schematic diagram of one embodiment of the differential input circuit embodied in the process controller utilizing the construction of our invention.

Figure 6:
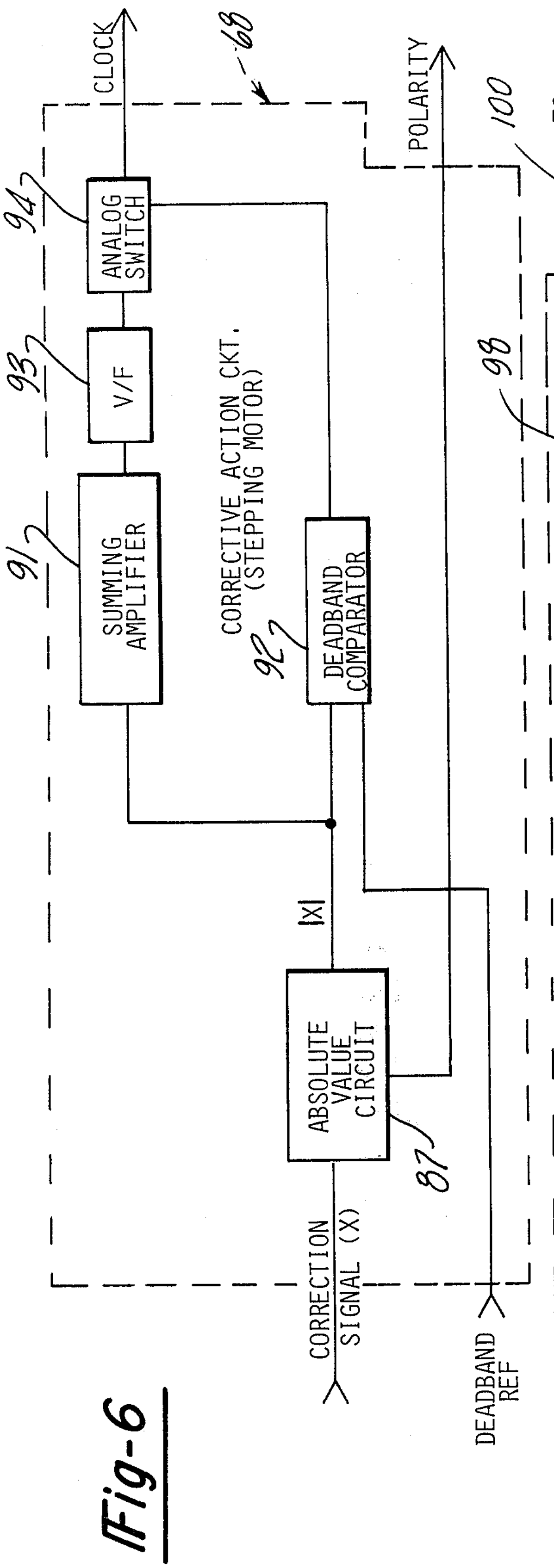

FIG. 6 is a schematic diagram of one embodiment of a corrective action circuit used in the process controller embodying the construction of our invention.

Figure 7:
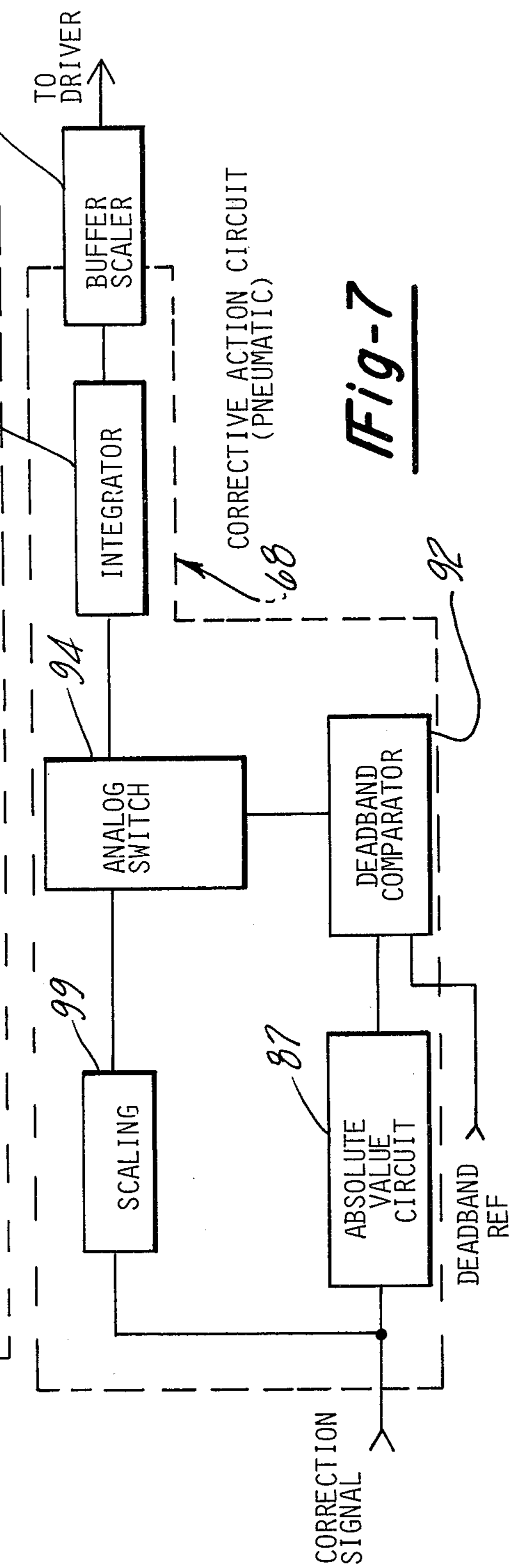

FIG. 7 is a schematic view of another embodiment of a corrective action circuit which may be used in our novel process controller.

Figure 8:
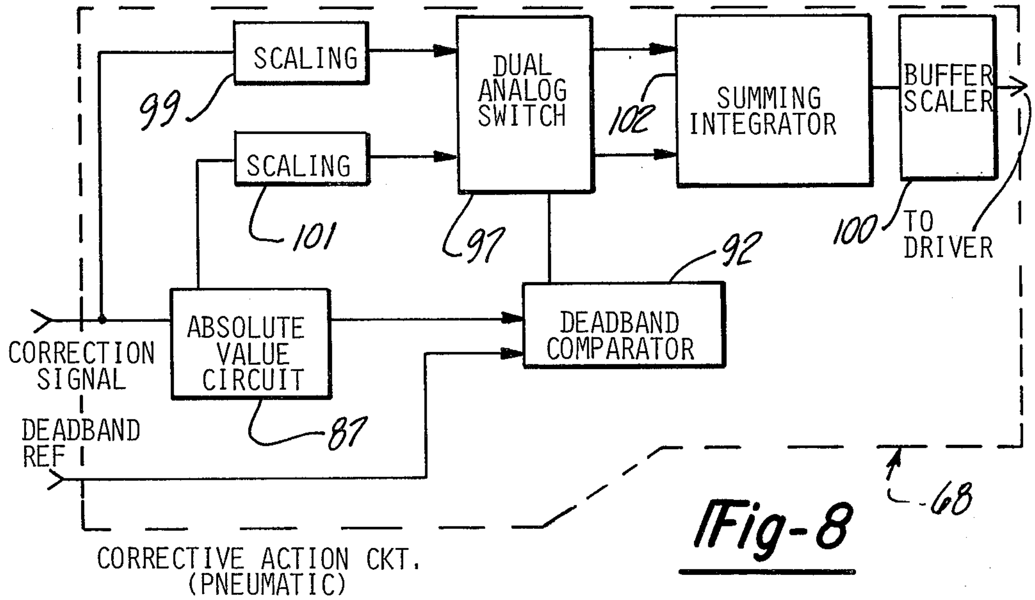

FIG. 8 shows another embodiment of a corrective action circuit which may be used in our novel process controller.

Figure 9:
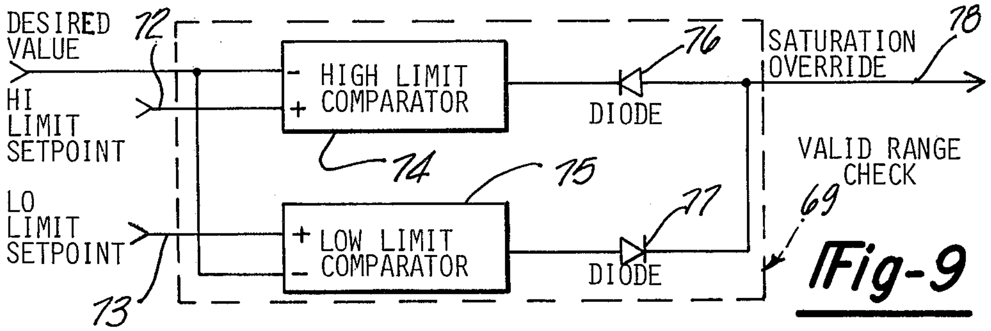

FIG. 9 is a schematic diagram of the valid range check circuit embodied in the construction of our invention.

Figure 10:
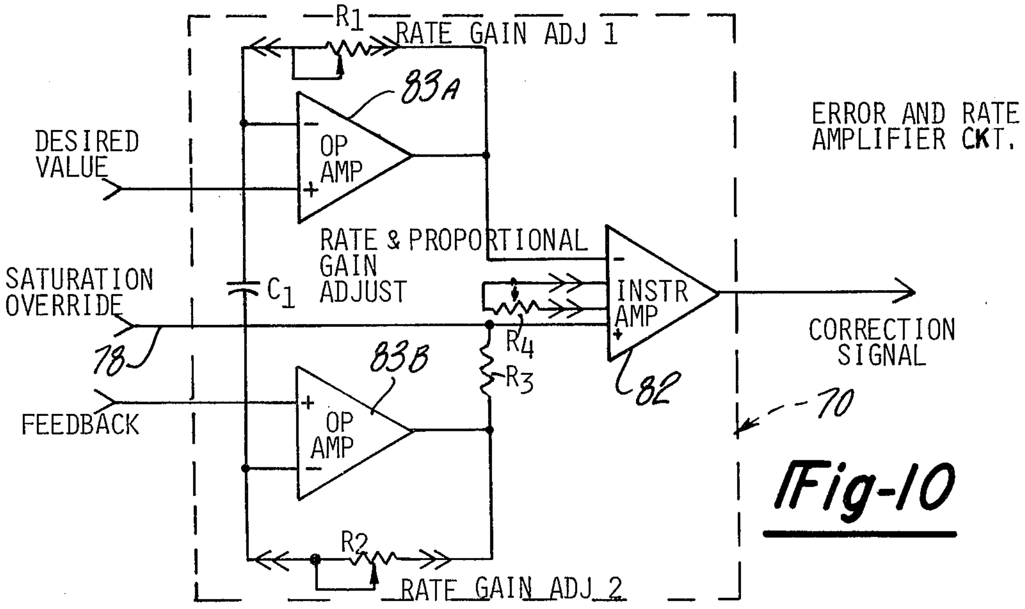

FIG. 10 is a schematic diagram of the error and rate amplifier circuit used in the construction of our invention.

Figure 11:
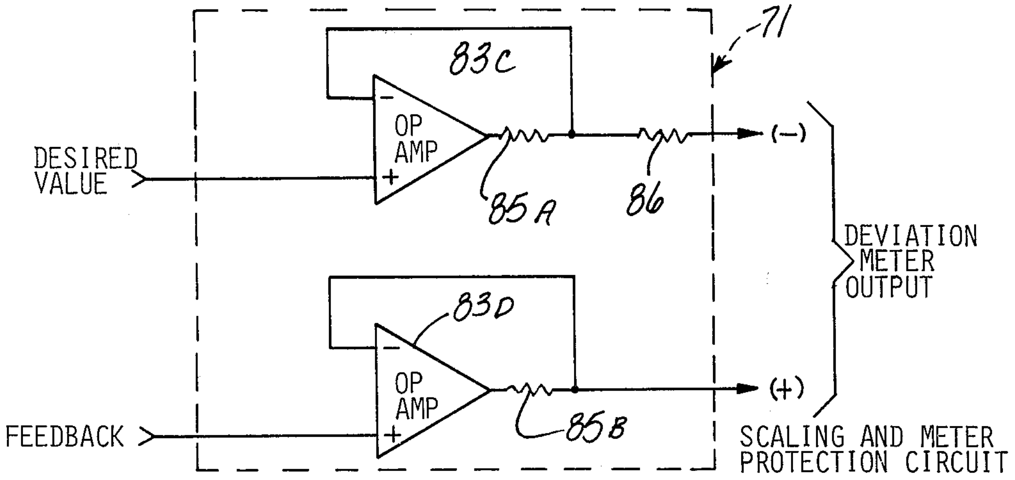

FIG. 11 is a schematic diagram of an embodiment of a scaling and meter protection circuit embodied in the construction of our invention.

Figure 12:
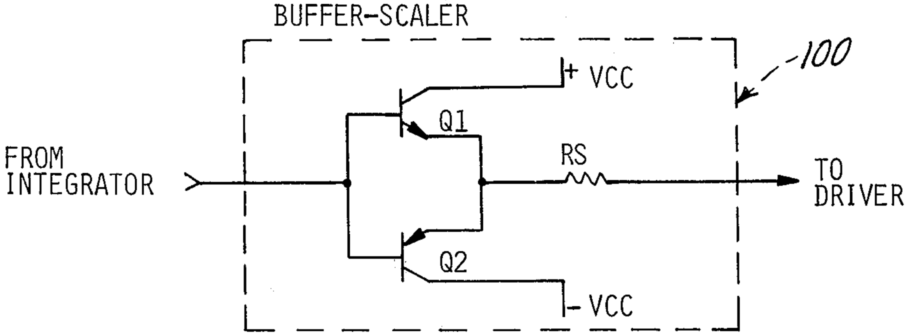

FIG. 12 is a schematic diagram of a buffer-scaler which may be embodied in the construction of our invention.

Figure 13:
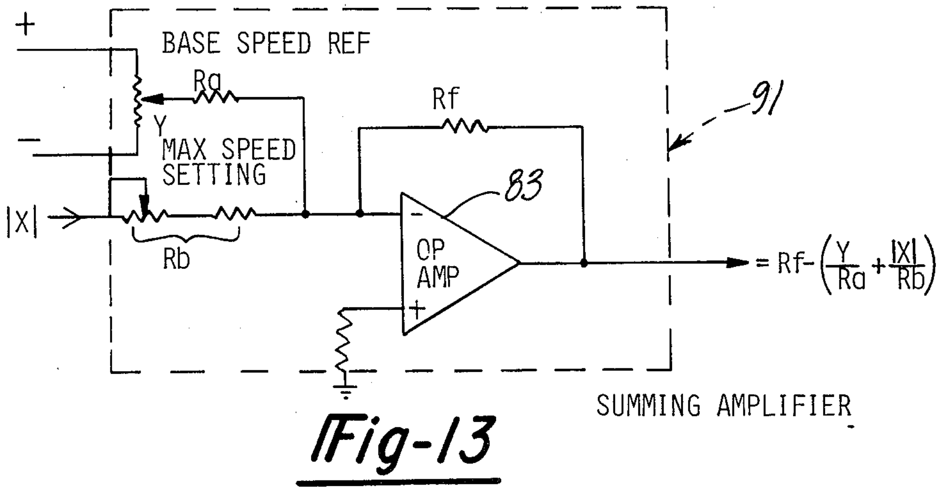

FIG. 13 shows a summing amplifier embodied in the construction of our invention.

Figure 14:
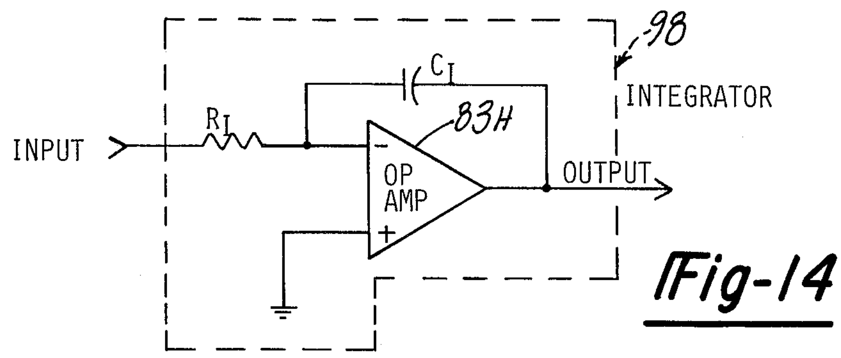

FIG. 14 is a schematic diagram showing an embodiment of an integrator as used in the construction of our invention.

Figure 15:
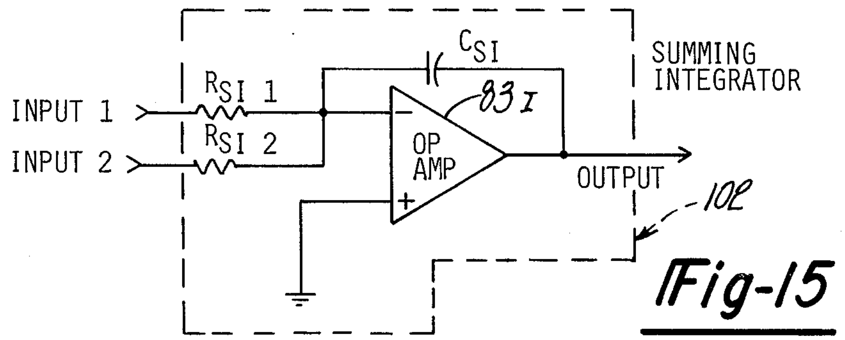

FIG. 15 is a schematic diagram of a summing integrator which may be used in the construction of our invention.

Figure 16:
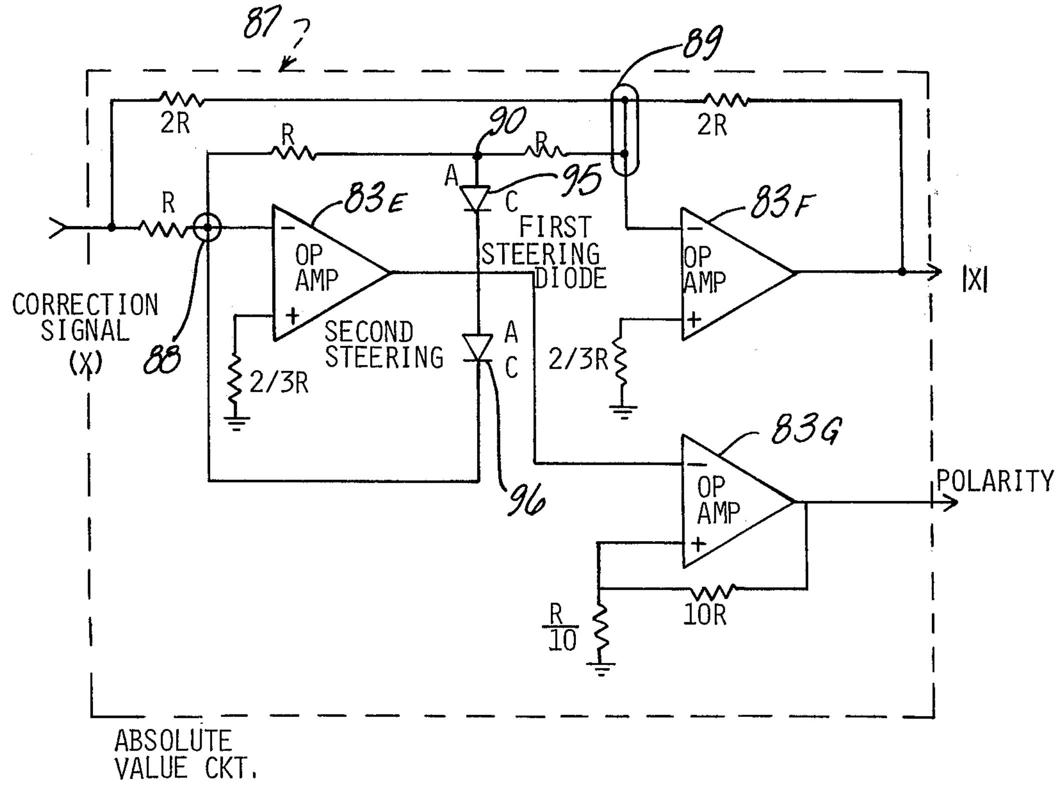

FIG. 16 is a schematic diagram of an absolute value circuit which may be embodied in the construction of our invention.

Figure 17:
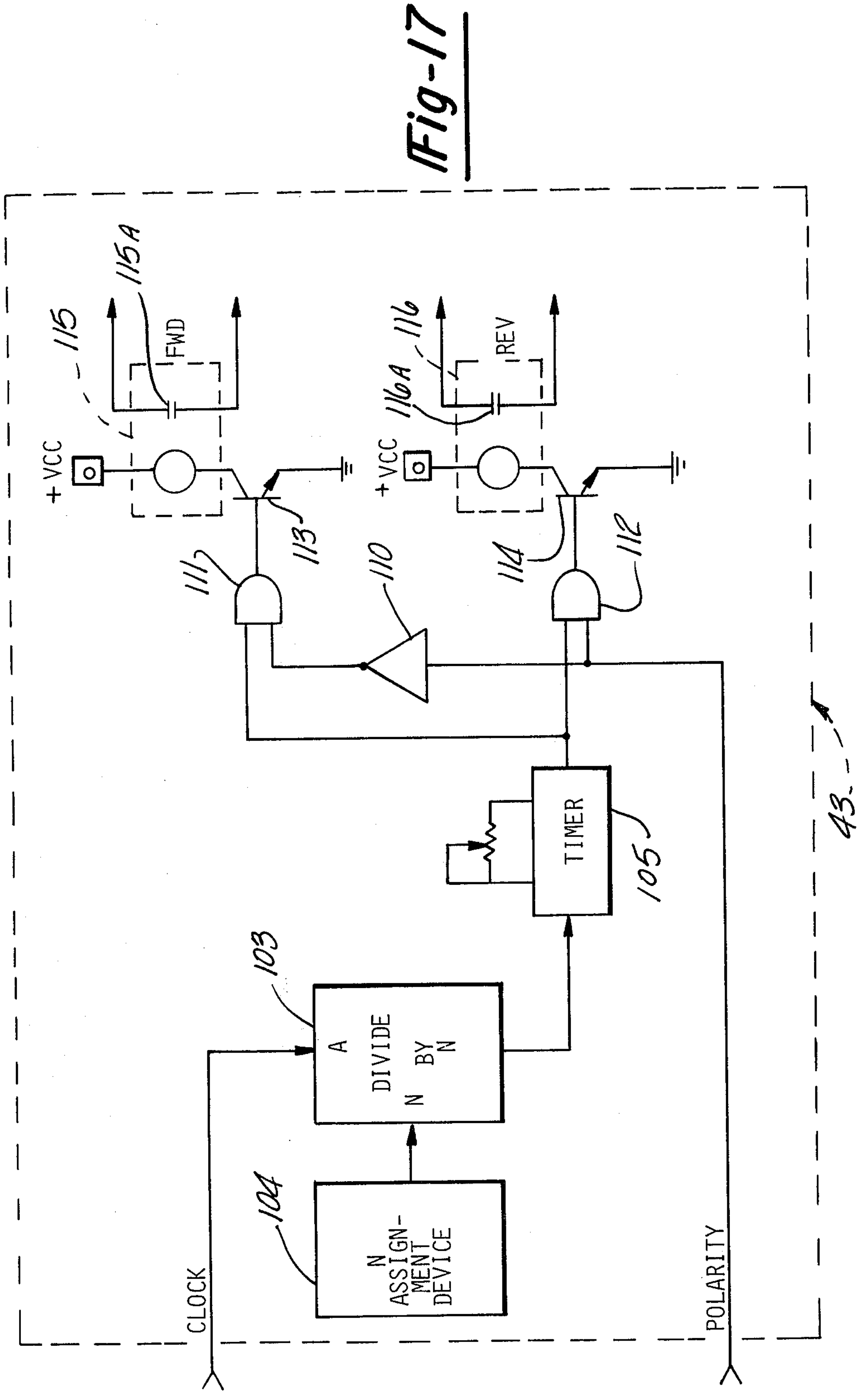

FIG. 17 is a schematic diagram of a two-directional switched driver which may be utilized in the construction of our present invention when a reversible AC synchronous motor, or other reversible devices are to be utilized to control a process with our invention.

FIG. 18 is a schematic diagram of a reversible AC synchronous motor, which may be the operator controlled by our improved process controller.

FIG. 19 is a schematic diagram of a reversible DC motor whose direction is controlled by a pair of relay contacts connected to opposite polarities.

FIG. 20 is a schematic diagram showing how a pair of solenoids may be connected.

FIG. 21 is a diagrammatic view showing how the solenoids of FIG. 20 may be connected to operate a pneumatic or hydraulic cylinder.

Figure 1:
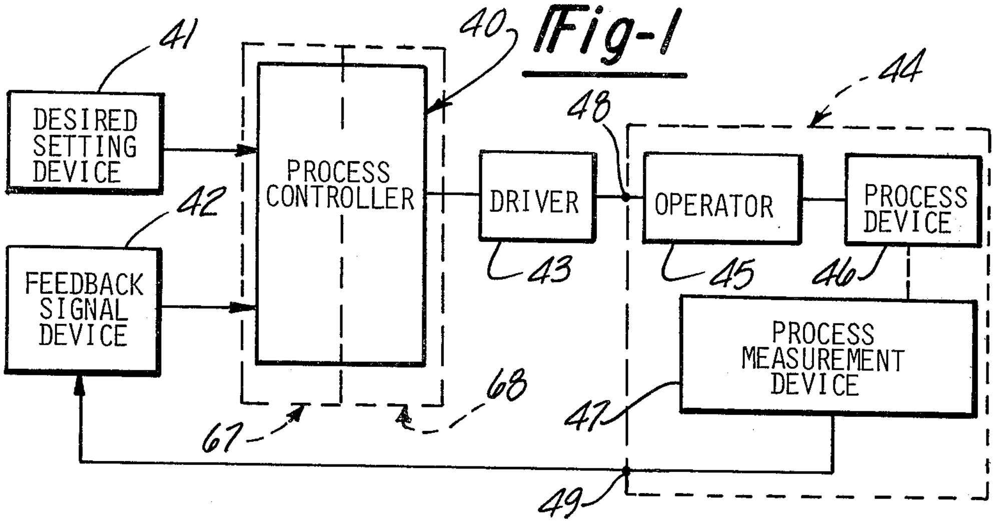
FIG. 1 is a general diagrammatic view of a closed-loop process embodying a process controller utilizing the construction of our invention.
Figure 22:
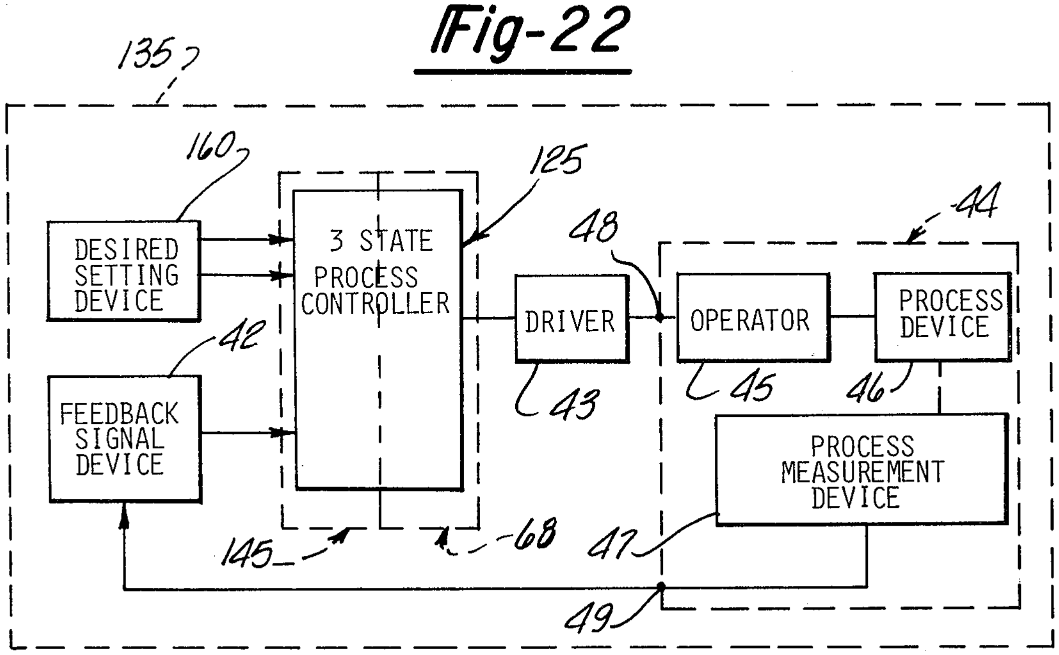

FIG. 22 is similar to FIG. 1 in that it is a general diagrammatic view of a closed-loop process, but in this case embodying a three-state four-mode process controller utilizing the construction of the present invention.

Figure 23:
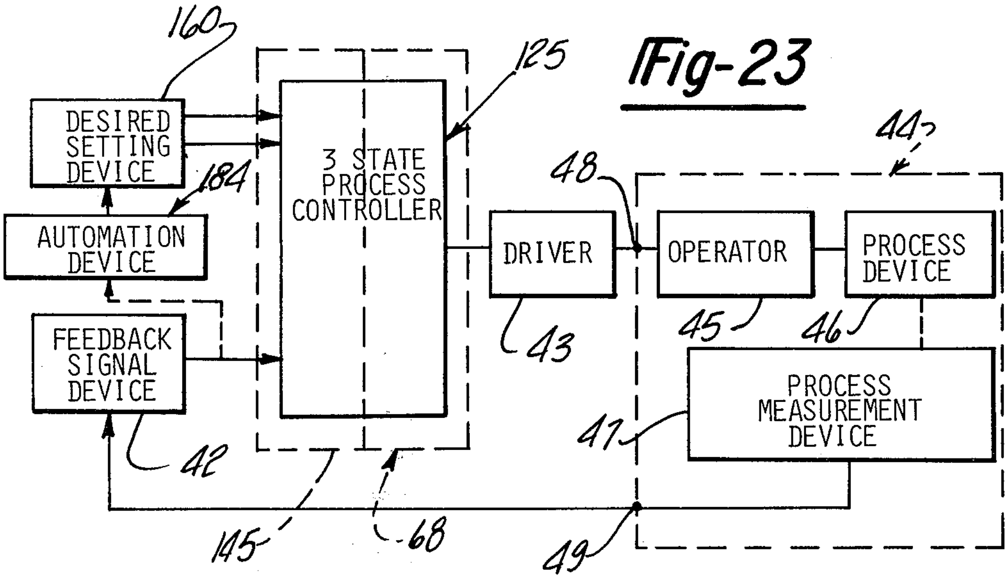

FIG. 23 is a diagrammatic view similar in part to that shown in FIG. 22, but showing a closed loop process which has to repeatedly be set to many conditions, and which thus embodies an automation device in connection with the three-state four-mode process controller.

Figure 24:
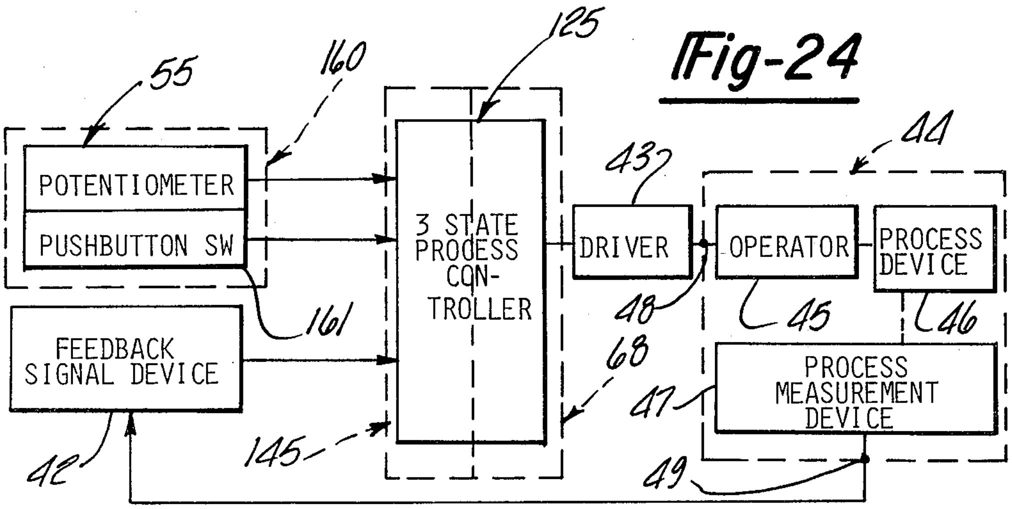

FIG. 24 is a view of a closed-loop process embodying a three-state four-mode process controller embodying the construction of our present invention and adapted to be operated manually.

Figure 25:
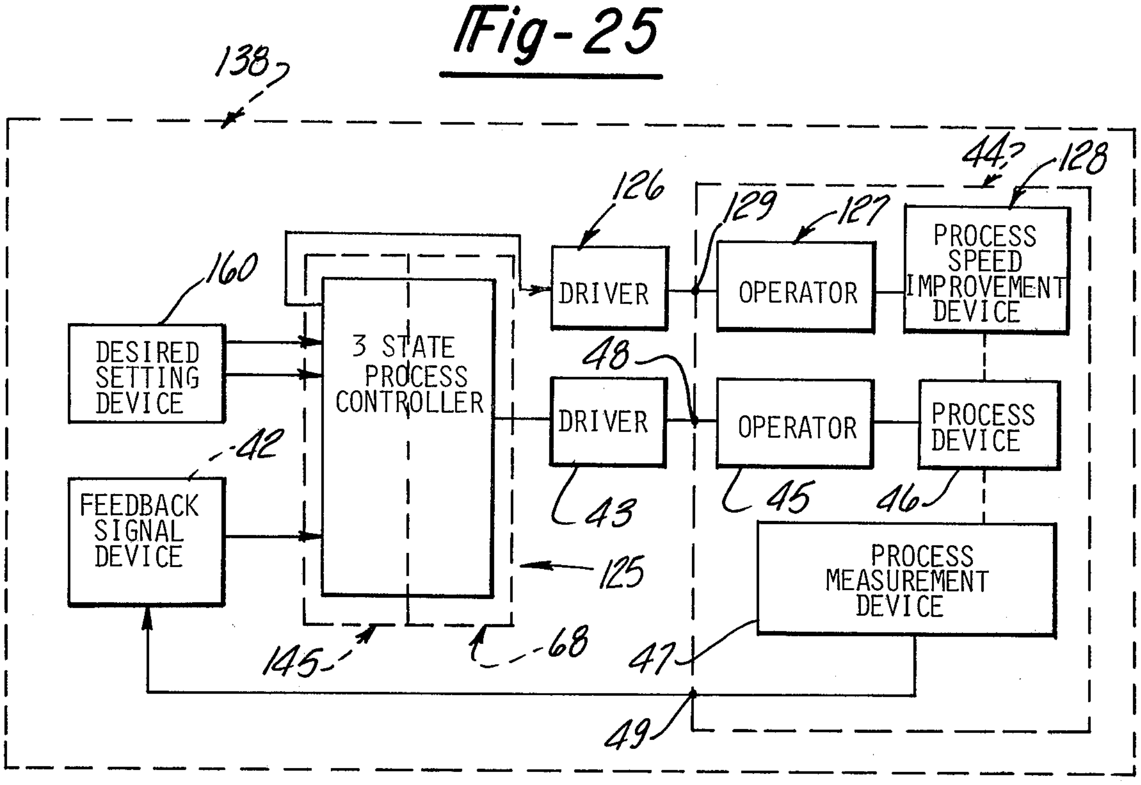

FIG. 25 is similar to FIG. 22 but in this case utilizies a process speed improvement device of a type to be described hereinafter to enable the entire process to move from one position to another at an increased rate of speed.

Figure 26:
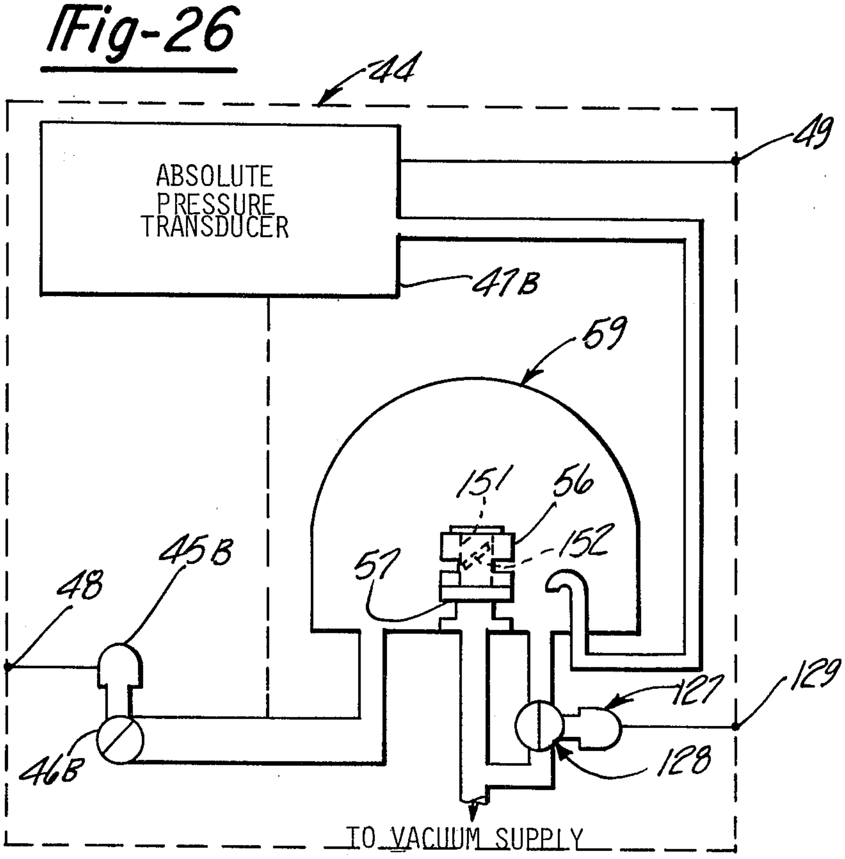

FIG. 26 is similar in part to FIG. 4*b*, and shows a hood pressure control system of the type which may embody the three-state four-mode controller having the construction of our present invention, and utilizing a process speed improvement device.

Figure 27:
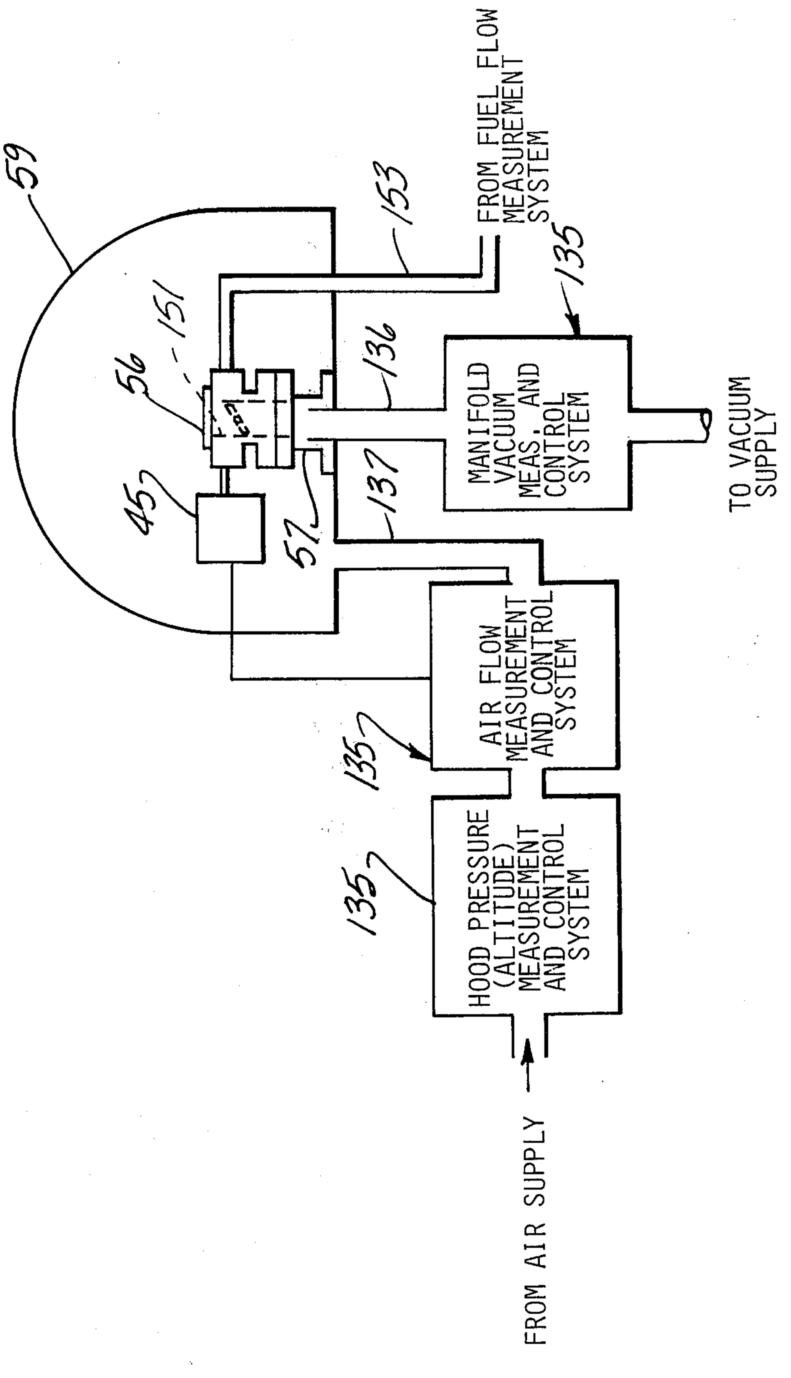

FIG. 27 is an overall diagrammatic view of a test system which may be constructed utilizing the controllers of the present invention, and showing as subsystems thereof an air flow measurement and control system, a manifold vacuum measurement and control system, and a hood pressure measurement and control system. The hood pressure, manifold vacuum, and air flow measurement and controls and system utilize a three-state four-mode controller embodying the construction of the present invention which will be described in detail below.

Figure 28:
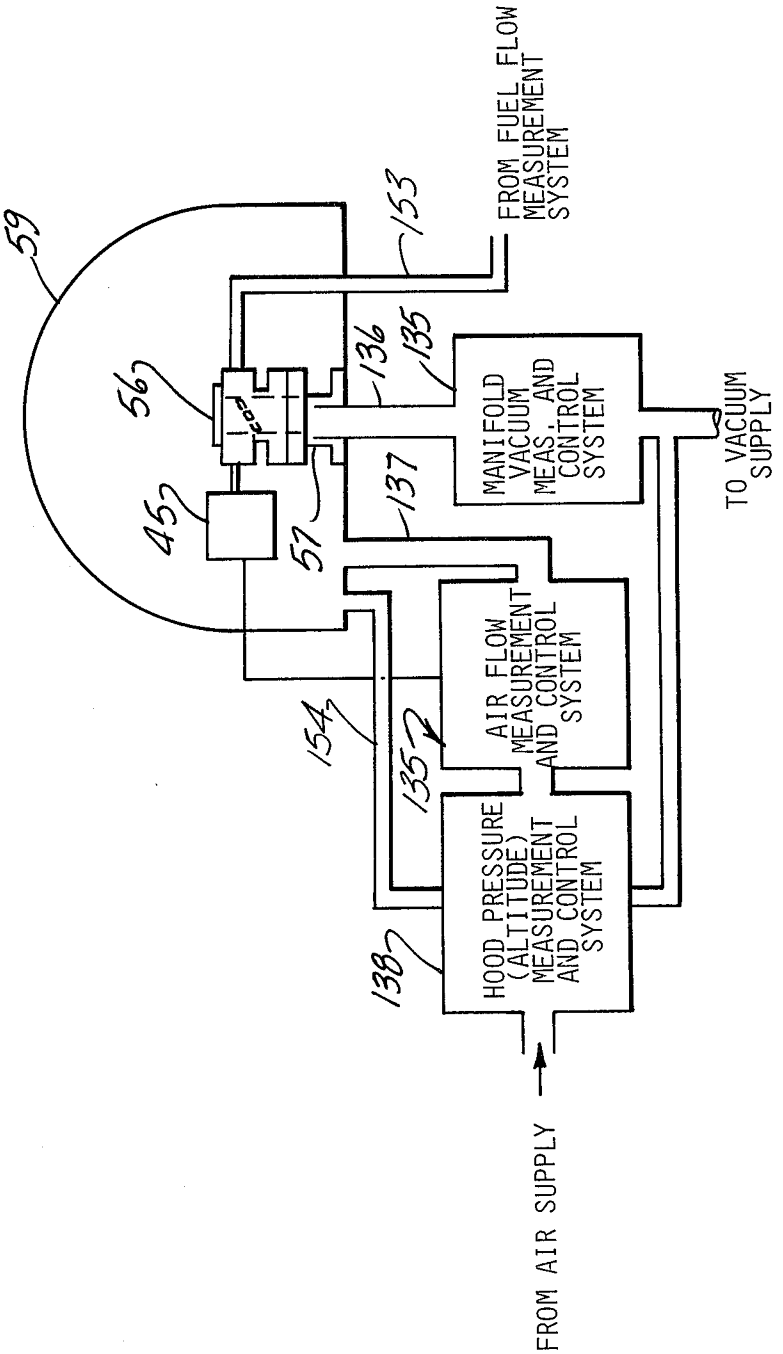

FIG. 28 is similar to FIG. 27 but includes the use of a process speed improvement device in the hood pressure measurement and control system.

Figure 29:
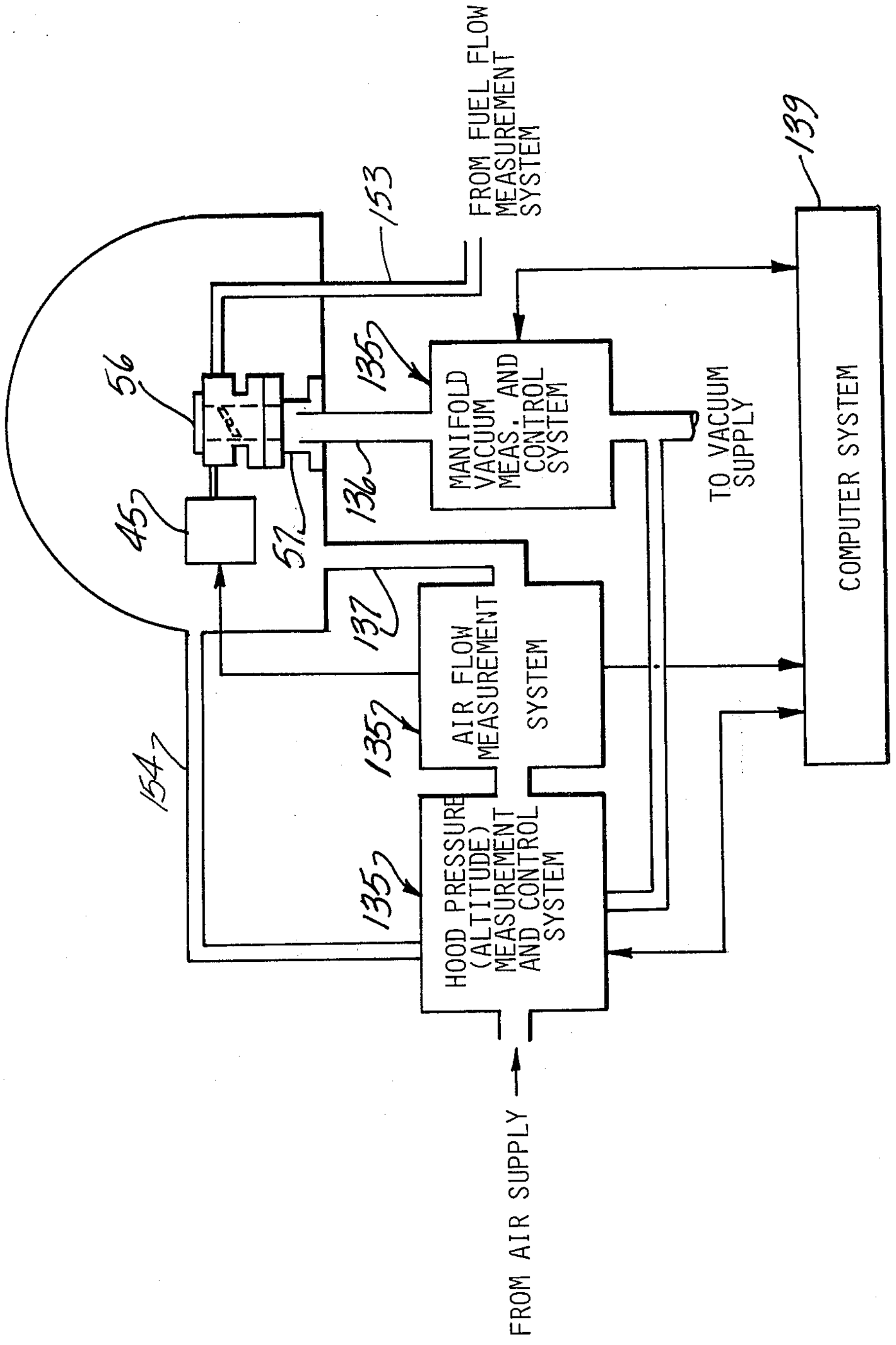

FIG. 29 is a view similar to FIG. 27 but utilizing a computer system for automatically testing a carburetor in the laboratory at several test points.

Figure 30:
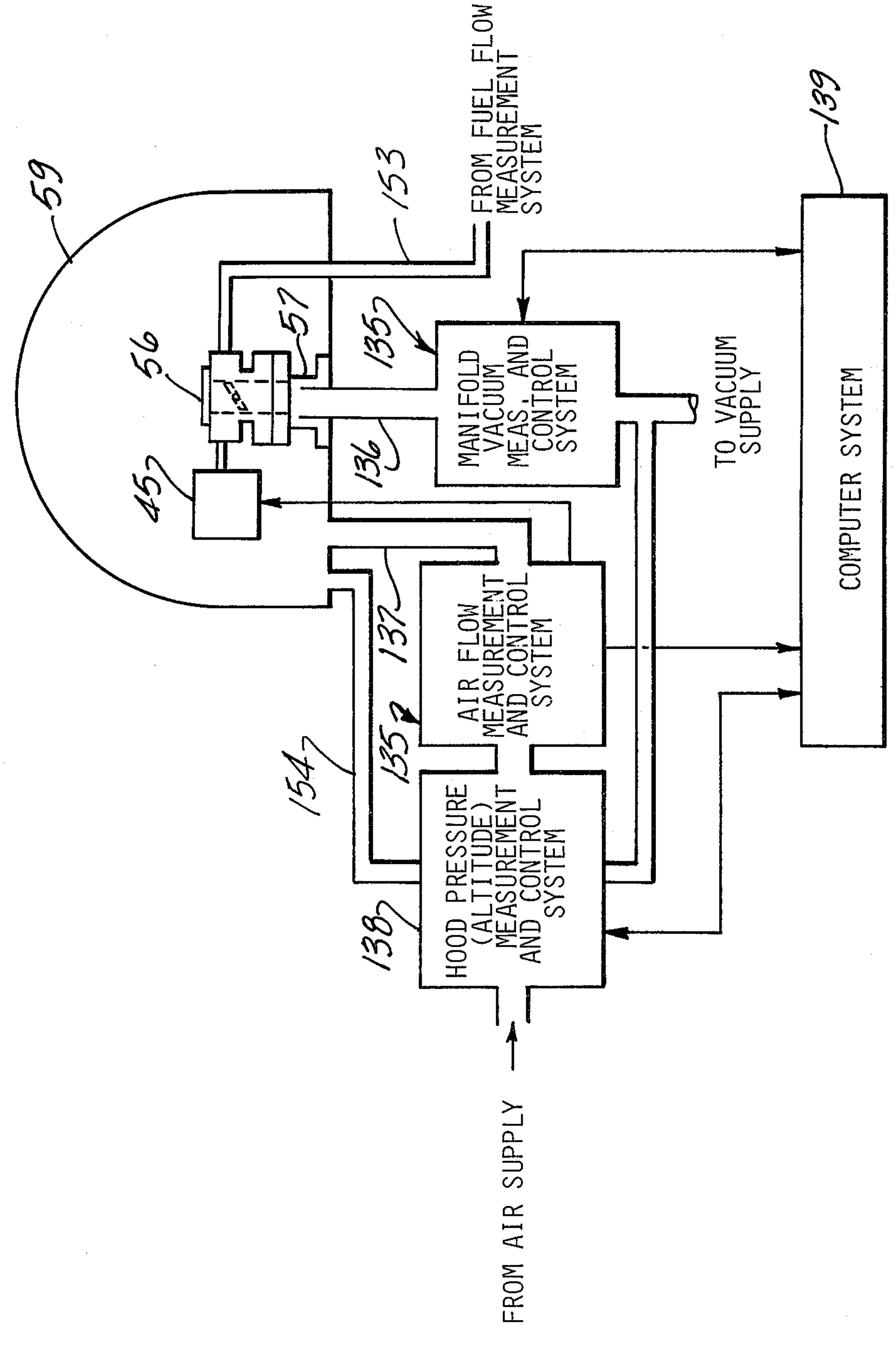

FIG. 30 is similar in large part to FIG. 29 but using the process speed improvement device to more rapidly test the carburetor in the laboratory under many test points.

Figure 31:
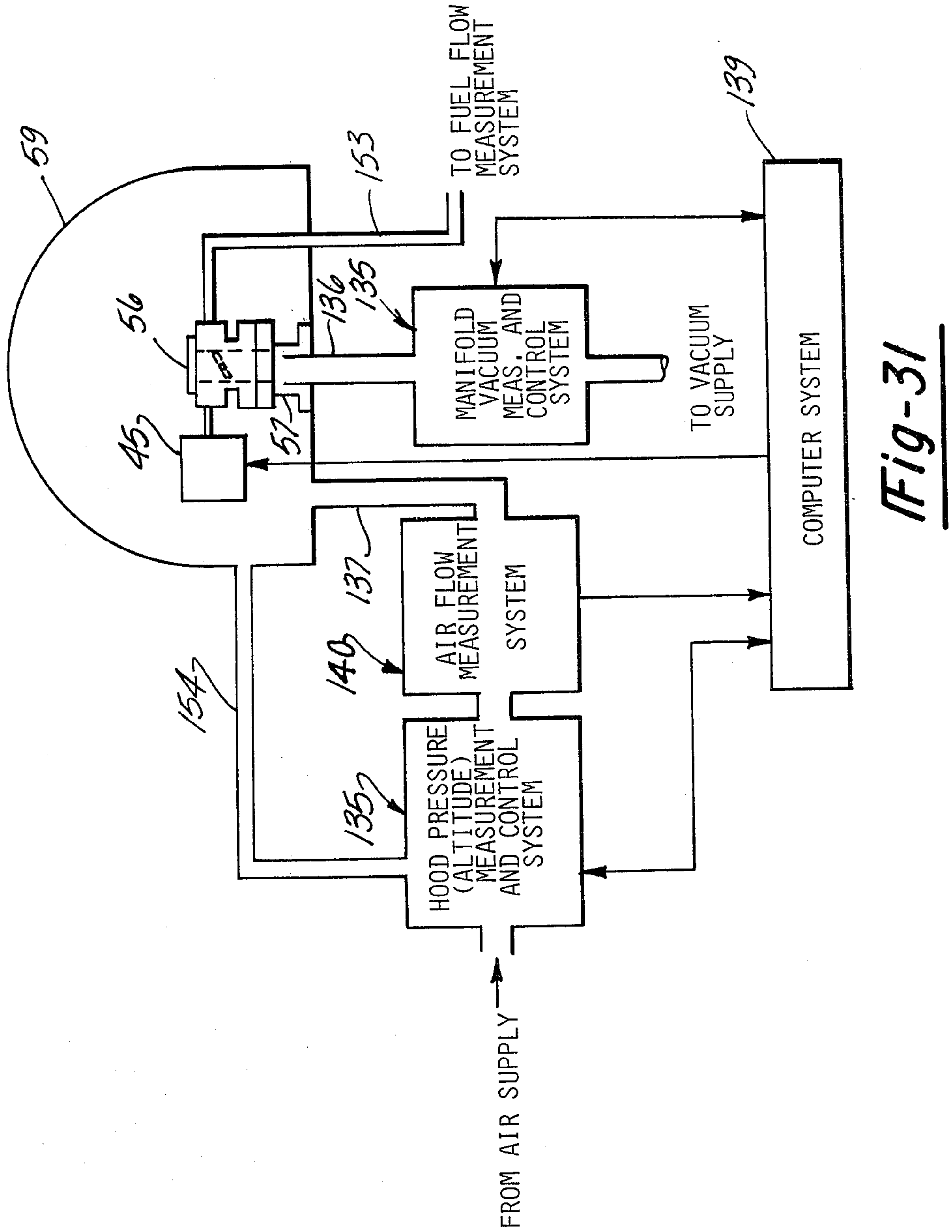

FIG. 31 is a view similar to FIG. 30, but showing an air flow measurement system, and utilizing the computer for controlling the carburetor throttle plate rather than having the subsystem itself controlling it.

Figure 32:
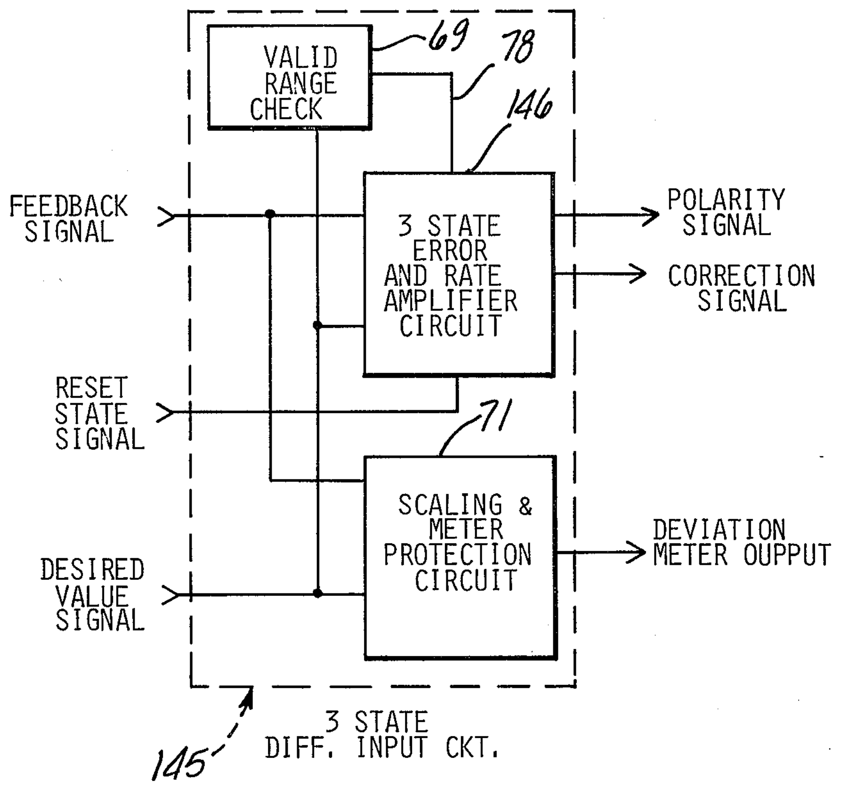

FIG. 32 is similar to FIG. 5, but showing a three-state differential input circuit including a three-state error and rate amplifier circuit as utilized in the three-state four-mode process controller.

Figure 33:
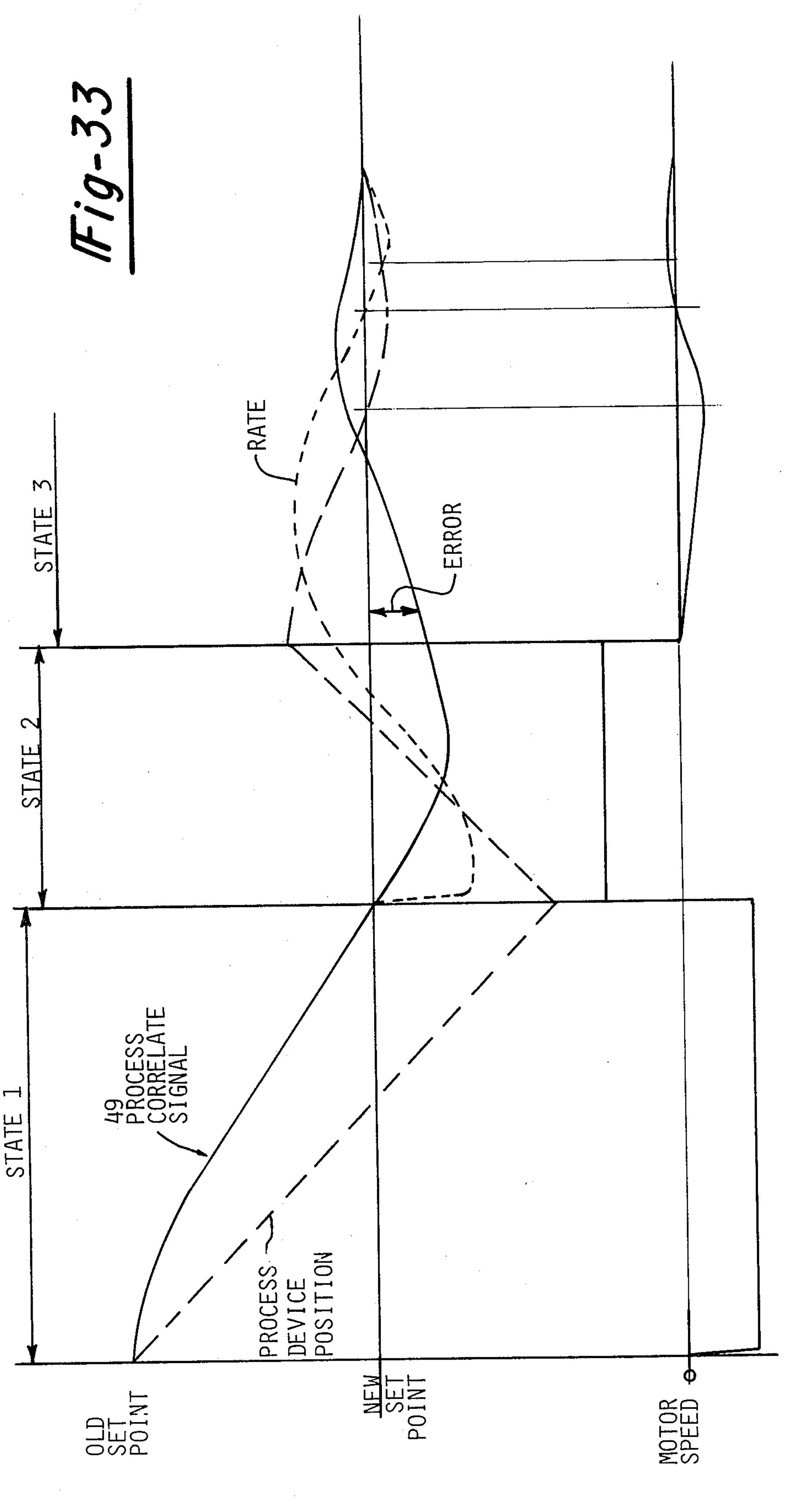

FIG. 33 is a graphical representation showing the three different states utilized by our three-state four-mode process controller and the values of the process correlate signal and the process device position as a function of time.

Figure 34:
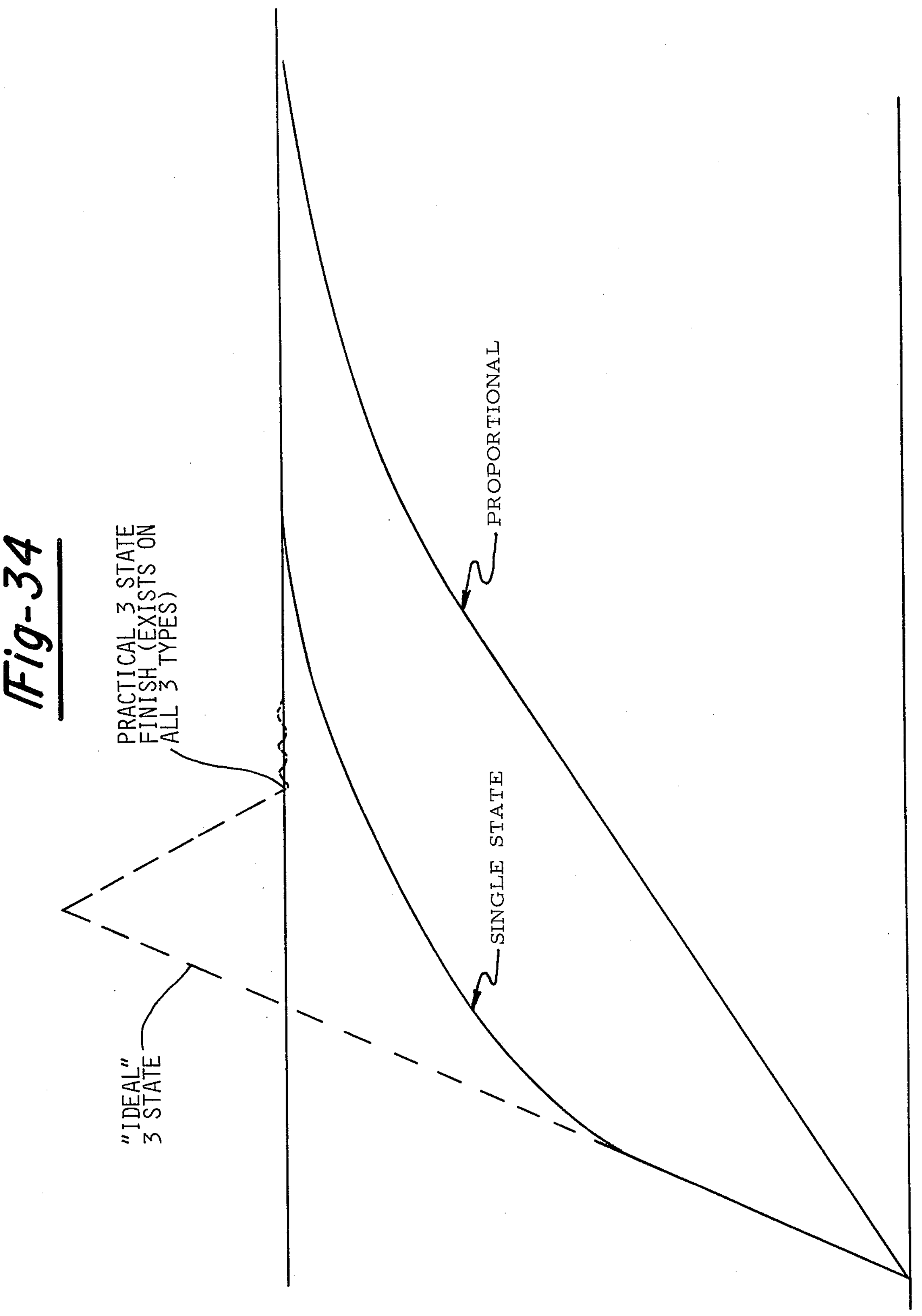

FIG. 34 is a graphical representation of time versus process correlate signal showing the comparative time a process controller will take to move from an old set point to a new set point using various process controllers. This figure shows relative times for systems using a three-state four-mode controller, a signle-state four-mode controller, and a rate plus proportion type control.

Figure 35:
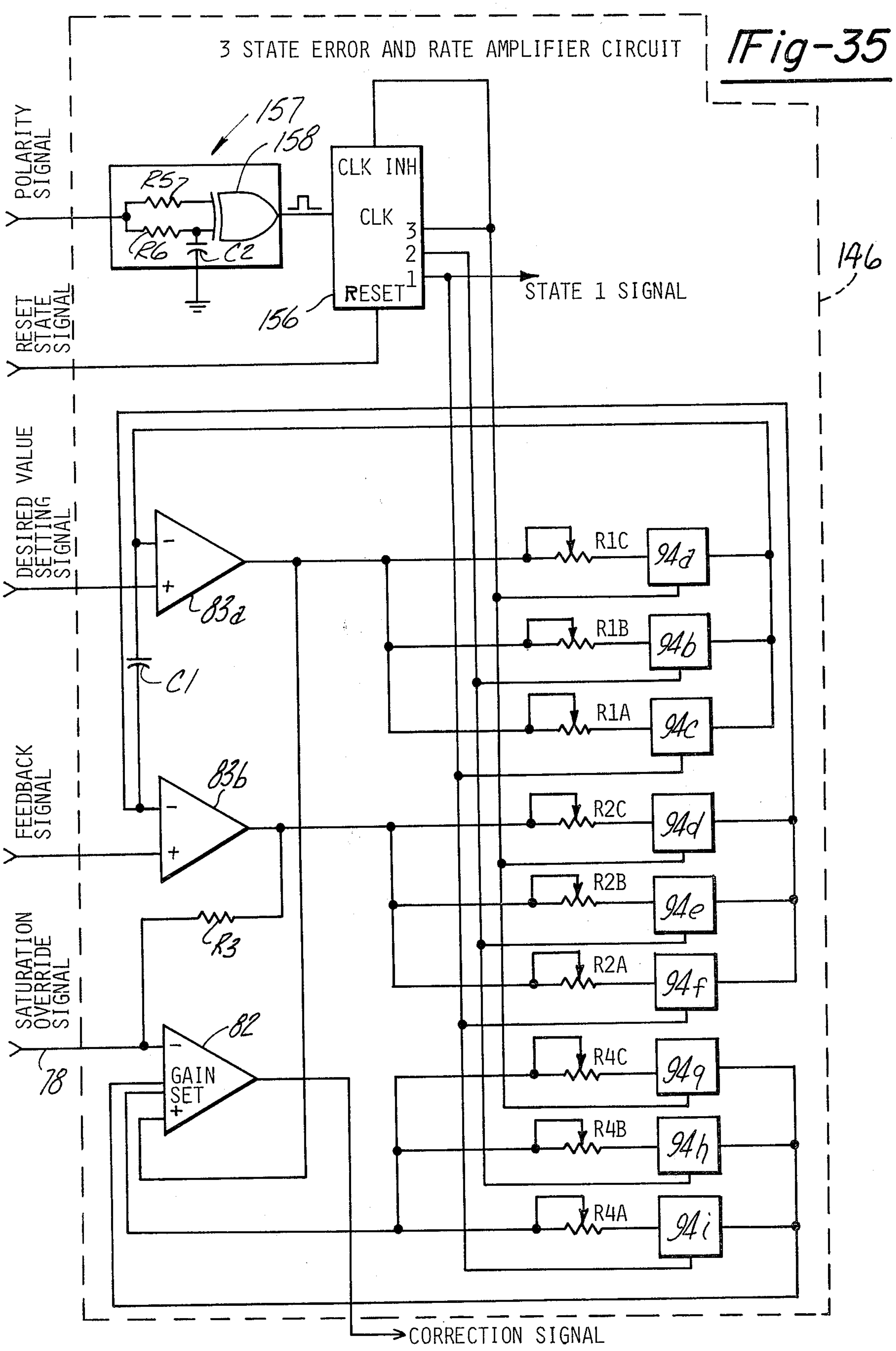

FIG. 35 is a view similar to FIG. 10 but showing the three-state error and rate amplifier circuit which is used in the three-state four-mode controller.

It should be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

There is shown in FIG. 1 a typical use of our improved single-state process controller, generally designated by the number 40. The process controller is supplied with a voltage reference indicating a desired value from a desired setting device 41 which causes the controller to supply a signal to the driver 43 which, in turn, supplies a process input signal 48 to the process generally designated by the numeral 44. Since this is a closed-loop system we are concerned with, the process 44 will then supply a process correlate signal 49 indicating the current state of the process. If the correlate signal is a voltage signal useable by the process controller 40, it may be directly supplied thereto. If, however, the correlate signal is not directly compatible, a feedback signal device 42 is needed to convert the process correlate signal into one useable by the controller. For example, if the process correlate signal 49 is pneumatic in nature, the feedback signal device may take the form of a pressure transducer.

Since the means for converting these signals are well known in the art, and the types of conversions needed are so numerous, it is believed not practical to describe all the various possibilities in the present application. It suffices to say that one skilled in the art would be able to provide a proper feedback signal device 42.

It should be understood that the process 44 under control generally consists of a process measurement device 47 which is used to measure the current state of the process, a process device 46 which is used to change the current state of the process, and an operator 45 which is used to change the process device.

Figure 2:
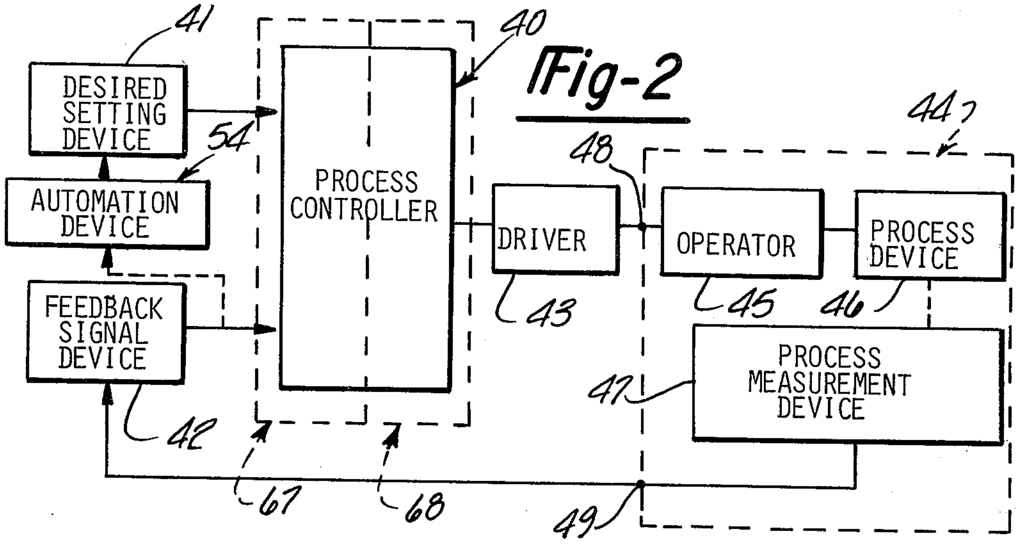
FIG. 2 is a diagrammatic view similar in part to that shown in FIG. 1, but showing a closed-loop process which has to repeatedly be set to many conditions and thus embodies an automation device in connection with our improved process controller.

While FIG. 1 has shown a generalized diagrammatic view of a closed-loop system embodying our process controller 40, FIG. 2 shows an embodiment of our invention where it is desired to automatically operate at a variety of desired value settings, such as to test over many test points of a device such as a carburetor or the like, where one may test at as many as 30 points. Some modification is needed for this situation because you would need a new desired value from the desired setting device 41 for each test point. While these could be set manually, as will be discussed below in relation to FIG. 3, it is much easier to have an automation device 54 which will automatically change the desired value for the next condition upon completion of the test at the present test point. It is also possible, as shown by the dotted line in FIG. 2, to tie the output from the feedback signal device 42 or the process correlate signal 49 to the automation device 54. This may be desired to confirm that the particular condition at which the process has arrived is indeed the desired condition before the automation device 54 takes further action.

Figure 3:
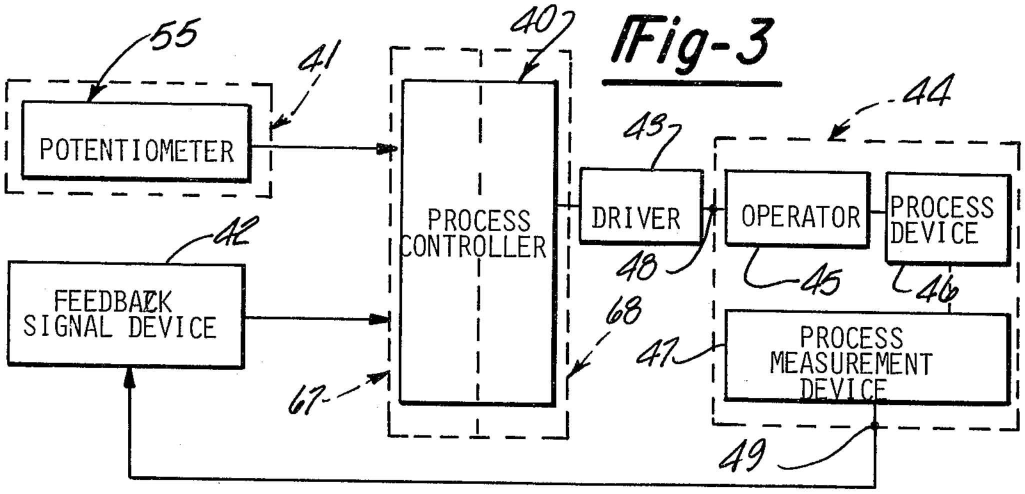
FIG. 3 is a view of a closed-loop process embodying a process controller utilizing the construction of our invention and adapted to be operated manually.

As shown in FIG. 3, a manual system is possible using our invention where the particular design requirements for the system permit it, or where economy dictates such a system. In this case a potentiometer 55 could actually be the desired setting device 41.

It should be understood that there may be some conversion or signal conditioning necessary of the signal from the feedback signal device, and of the actual signal from the desired setting device 41, which is set either manually or by the automation device 54 before the signals can be used by the process controller 40. Again the number of possibilities of conversion and signal conditioning means are numerous, and so well known in the art, that is not deemed necessary to describe them further herein.

For processes which can utilize our improved process controller, there are shown in FIGS. 4*a* through 4*f* different examples. Referring specifically to FIG. 4*a*, the process 44 in this example is one wherein the manifold vacuum across the carburetor 56 must be precisely controlled, and must be able to set different test conditions rapidly. In this instance the carburetor 56 is mounted on a riser 57 in any suitable manner inside the hood 59. In order to control the manifold vacuum across the carburetor, it is of course first necessary to know what the actual manifold vacuum is at any given moment. For this purpose, a differential pressure transducer 47*a* becomes the process measurement device, and is capable of giving a process correlate signal 49 as an output. Such a differential pressure transducer, which may be such as the 1151DP series manufactured by Rosemount Engineering Co. of Minneapolis, Minnesota, has a high pressure input 60 connected to sense the pressure above the carburetor under the hood 59, and a low pressure input 58 connected in the throat of the carburetor riser 57 to sense the pressure beneath the carburetor. By methods well known in the art such a differential pressure transducer then produces a process correlate signal 49 continuously related to the pressure drop across the carburetor at any given point, which is commonly known as the manifold vacuum.

Now referring back to any one of FIGS. 1, 2 or 3, such process correlate signal would be fed through a feedback signal device 42, if necessary, and then fed into the process controller 40. The process controller would compare the process correlate signal with a desired value and, if necessary, provide a corrective action signal to the driver 43, which the driver would then convert, in a manner to be described hereinbelow, into a process input signal 48 capable of driving the operator 45.

Referring again to FIG. 4*a*, the operator 45 is in the form of a valve operator 45*a*. This then closes the loop and this operation will continually take place until the valve operator 45*a* causes the process device 46, which in this case is a valve 46*a*, to move to a position such that the process changes result in a change to the differential pressure transducer 47*a* causing the process correlate signal to become stable and to correspond to the desired value signal. At this point the process will have stabilized at the desired value. Once the process is stable and at the desired value within the deadband range, the process controller remains active, continuously repeating the comparison and correction process. Upon a process change for any reason or a new desired value, further correction is made until the process is again stable at the desired value within the selected deadband range. It can be seen that this operation holds true whether the system is the generalized version shown in FIG. 1, the automated version as shown in FIG. 2, or the manual version as shown in FIG. 3.

Another example of a process which can be controlled by out improved process controller is that shown in FIG. 4*b* where it is desired to accurately control the pressure inside the hood 59. In order to control such pressure one must measure the hood pressure, and this is done by an absolute pressure transducer 47*b* which may be such as the 1332 series transducer manufactured by Rosemount Engineering Co. of Minneapolis, Minnesota. In a manner well known in the art, said absolute pressure transducer produces a process correlate signal 49 which, in a manner similar to that just described, is fed through a feedback signal device 42, if necessary, and then supplied to the process controller 40.

As previously described, the process correlate signal 49 would be compared in a manner shown in FIGS. 1 to 3 with a signal from the desired setting device 41, and if a difference exists between the actual state of the process and the desired state of the process, the process controller would then supply the necessary signal to the driver 43 to drive the operator 45, which in this case is a valve operator 45*b* driving the process device which is in the form of a valve 46*b*. Again the changed process correlate signal 49 would be supplied to the controller, compared to the desired value signal from the desired setting device 41, and, if necessary, modified signals would be given to the driver 43 which would again produce a new process input signal 48, with the comparison and correction process continually repeating itself until the process is at the desired value within the selected deadband range.

Referring to FIG. 4*c* there is shown a process 44 adapted to control the pressure of the fuel being supplied to a carburetor or other like device. In this case, similar to that previously described, the carburetor 56 would be mounted on a riser 57 inside the hood 59, with fuel from the fuel source (not shown) passing through a first conduit 64 through a process device 46 in the form of a valve 46*c* through a second conduit 65 and into the carburetor 56. A process input signal 48 is supplied to the valve operator 45*c* which operates the valve 46*c* to perform the actual function of controlling the pressure within the second conduit 65. It should be understood that carburetors are also tested without use of hoods, and the pressure of the fuel supplied to the carburetor may be controlled by our improved process controller in such a system with a hood.

To obtain a measurement of the pressure in the conduit 65, a differential pressure transducer 47*c* is used as the process measurement device. Connections to the high pressure input 60 and the low pressure input 58 enable the differential pressure transducer 47*c* to determine the fuel pressure in the system at any given time and supply the process correlate signal 49 to the process controller 40 through a feedback signal device 42, if needed. Again the comparison and correction process will take place in a manner previously described until the process is at the desired value within the selected deadband range of the process controller. The comparison process continues to occur even though the process is within the deadband range until the process goes outside of the dead band whether due to a process change or a change in the desired value. At this time, the correction and comparison process again occurs until the process is again at the desired value within the deadband range.

In carburetor testing it is also necessary to measure the air flow to the carburetor, which in this case is controlled by the carburetor itself as shown in FIG. 4*d*. Thus, the carburetor previously referred to under the numeral 56 becomes the process device and is now referred to by the numeral 46*d*. In order to measure the air flow through the carburetor, a hood 59 is provided which has an outlet 62 connected to a vacuum source, and an inlet 63 connected to an air flow measurement system 47*d*, which may be such as subsonic nozzles or laminar flow tubes. The quantity of air flowing through the carburetor 46*d* then is controlled by the movements of the throttle plate, which is controlled by the throttle operator 45*d*. The throttle operator 45*d* is driven by the process input signal 48.

To arrive at a desired air flow through the carburetor, it is necessary to know the air flow present in the system at any time. In this case, the air flow measurement system will provide a pressure correlate signal 49 in the form of a differential pressure signal which will be supplied to the feedback signal device 42, which now takes the form of a differential pressure transducer 42*d*. This, in turn, will supply the signal to the process controller relating to the current air flow condition through the carburetor 46*d*. In a manner similar to that previously described, the comparison and correction operations will take place until the desired value within the selected deadband limits is reached.

When it is desired to have a sonic air flow measurement system using critical venturi meters or variable area critical venturi meters, the systems shown in FIGS. 4*e* and 4*f* may be the ones controlled by our process controller. Referring to FIG. 4*e*, it is actually the carburetor that is the process control device as in FIG. 4*d*, and it is therefore, now labeled 46*e* rather than 56. The turning of the carburetor throttle plate by the throttle operator 45*e* controls the amount of air passing through the carburetor.

Since sonic air flow measurement is being used, wherein air flow is basically proportional to the absolute pressure, the carburetor hood 59 previously described is not required, but may be used. The carburetor 46*e* will be mounted on the riser 57 as previously described. The process input signal 48 drives the throttle operator while the absolute pressure signal from the air flow measurement system 47*e* is the process correlate signal 49. Said process correlate signal is supplied through the conduit 61 to the absolute pressure transducer 42*e*. The process correlate signal 49 is transformed into a signal compatible with the process controller by the feedback signal device 42 in the form of the absolute pressure transducer 42*e*. Again, the signal, in a manner similar to that previously described, is compared with a desired value signal from a desired value setting device and, if necessary, the process controller supplies a signal to the driver 43 which, in turn, supplies a process input signal 48 to the operator 45*e*. The comparison and correction process will continue until the process correlate signal corresponds to the desired setting, thus setting the air flow through the carburetor 46*e* to the desired value within the selected deadband limits of the process controller.

Another system 44 setting the air flow through the carburetor using the sonic flow devices is shown in FIG. 4*f*. In this case, the throttle operator 45*f*, the carburetor 46*f*, and the carburetor riser 57 may be the same as those indicated by numerals 45*e*, 46*e*, and 57, shown in FIG. 4*e*. However, to utilize a transducer with a smaller span, the differential pressure transducer 42*f* may be used instead of the absolute pressure transducer 42*e* to form the feedback signal device. In this case the measurement of air flow is taking place as a function of manifold vacuum because when the process 44 is being performed in a controlled atmospheric room, manifold vacuum relates to absolute pressure and, therefore, air flow is also a function of the manifold vacuum. Thus, the process correlate signal 49 is the differential pressure signal, and this would be supplied to the differential pressure transducer 42*f*. The signal from the feedback signal device, in this case the differential pressure transducer 42*f*, would be used in a manner described immediately above to produce any changes necessary in the process input signal 48 until the process input signal 48 corresponds to the process correlate signal 49 and the process is at the desired value within the selected deadband limits of the process controller.

The description thus far has dealt substantially with illustrations of a general nature showing various closed-loop processes embodying our invention and the types of processes they can control, and has not dealt with any detailed description of the operation of the process controller itself, or of its novel features over those controllers known in the art.

To more fully understand the novelty and operation of this invention, it is to be noted that the single-state process controller 40 shown in FIGS. 1, 2, and 3 consists of two portions, the differential input circuit 67 and the corrective action circuit 68. In general, the process controller compares the feedback signal with the desired value signal from the desired setting device, finds the actual error difference between the two signals (static), finds the rate of change (dynamic) between the two signals, sums them algebraically, and then provides an output signal, related to the error, the rate of change, and a deadband range to operate the driver 43, as necessary.

When in a stable and static condition there will be no saturation override signal 78 and the difference error between the feedback signal from the feedback signal device 42 which relates to the process correlate signal and the desired value from the desired setting device 41 is less than the preselected deadband there is no movement of the process device 46. If the desired value is within the set points 72 and 73, the error and rate amplifier circuit 70 will operate normally, resulting in the appropriate correction signal being supplied to the corrective action circuit 68 to operate the driver 43. However, if the desired value is outside the valid range set points, this will cause the error and rate amplification circuit to become saturated and go to a full plus or full minus saturated condition depending on whether the desired value was outside the high limit set point 72 or the low limit set point 73. This, in turn, will ultimately cause the process device 46 to rapidly go to one extreme or another, for example, fully opened or fully closed, and stay there until some further signals are received from the circuitry.

It should be understood that the process being controlled is generally one of a dynamic nature, and the process controller is attempting to obtain a stable static condition. If the correction signal from the error and rate amplifier circuit 70 is within deadband limits, the process controller 40 provides a static output signal and the control remains held until an upset or change in the process causes the process to go outside the deadband limits. The process will be considered to be within the deadband limits when said correction signal is essentially at zero value, which may be when the rate of change of the error is equal in value to the error signal, but opposite in polarity, or when the error and rate of change of the error are both at a zero value.

Referring to FIG. 5, the feedback and the desired value signals are fed to both the error and rate amplifier circuit 70 and to the scaling and meter protection circuit 71. Additionally, the desired value signal is fed to the valid range check circuit 79. The purpose of the error and rate amplifier circuit is to algebraically sum the actual difference between the feedback and the desired value signal, which is a static error, and the rate of change of the feedback signal with respect to the desired value signal, which is a dynamic error. Additionally, in order to protect the process equipment, the valid range check circuit 69 is provided. This is necessary because in some embodiments of our invention, the stepping motors used can easily damage the equipment being tested due to the motor characteristics. As is well known in the art (see Design Engineer's Guide to DC Stepping Motors by Superior Electric Company, Bristol, Connecticut) at very high speeds, stepping motors have very low torque. However, at the lower speeds the torque is very high. Thus, in certain types of tests, for example a carburetor test where the stepping motor is turning the carburetor throttle plate, when the desired value is out of range, an undesirable condition could occur, namely that the carburetor throttle plate could become fully closed or fully opened with the stepping motor turning slowly with large torque. The carburetor could easily become damaged, or the mechanical connection between the stepping motor and the carburetor could become damaged.

To prevent this, the valid range check circuit 69 compares the desired value against the high limit set point 72 and the low limit set point 73, as shown in FIG. 9. If the desired value is within the valid range set points, the valid range check circuit 69 will permit the error and rate amplifier circuit 70 to operate in its normal mode supplying the correction signal to the corrective action circuit 68. However, if the desired value is outside the valid range set points, the valid range check circuit will act in a manner to cause the stepping motor to operate at its maximum speed and drive the process device to its fully closed or fully opened position. As previously mentioned, at high speeds stepping motors have a very low torque, so in this case when the process device reaches its fully opened or fully closed position, the stepping motor will simply stall, causing the process device 46 to cease further adjustment. Upon becoming aware of this condition, the operating personnel can take the necessary action to correct this situation.

Typically, in a process control circuit there is provided a deviation meter to indicate the relationship between the current condition of the process and the desired set point. Since these process ranges are usually rather large, and the desired meter range is relatively small, it is necessary to provide a means of scaling the available error signal to a signal useable by the meter. It is also desirable to protect the meter from an overload condition should the process error exceed the range. This is done by the scaling and meter protection circuit.

A detailed description of the components and operation of the valid range check circuit, error and rate amplifier circuit, and scaling and meter protection circuit can be found by reviewing FIGS. 9, 10 and 11, respectively.

In FIG. 9, the valid range check circuit 69 operates by connecting a high limit set point 72 to the high limit comparator 74 and the low limit set point 73 to the low limit comparator 75. At the same time the desired value signal is supplied to both comparators, which can be such as Model AD311 made by Analog Devices, Inc. of Bloomingdale, Illinois. The output of the high limit comparator is connected to the cathode of the high limit diode 76, and the output of the low limit comparator is connected to the anode of the low limit diode 77. The anode of the high limit diode 76 and the cathode of the low limit diode 77 are connected together and form the saturation override signal 78. If the desired value signal supplied to the high limit comparator is less than the high limit set point, then the high limit comparator goes to its high state causing the high limit diode 76 to go to a nonconductive state allowing normal operation.

Similarly, if the desired value is greater than the low limit set point, the low limit comparator 75 goes to its low state and the low limit diode 77 goes to its nonconductive state allowing normal operation. Thus if both circuits allow normal operation, the error and rate amplifier circuit operates normally.

However, if the desired value is above the high limit set point, the high limit comparator will go to its low state causing the high limit diode 76 to become conductive supplying a saturation override signal 78 to the error and rate amplifier circuit and ultimately to the corrective action circuit to be described.

Also, if the desired value is less than the low limit set point, the low limit comparator will go to its low state causing the low limit diode 77 to become conductive and supply a saturation override signal to the error and rate amplifier circuit shown in FIG. 10.

Referring now to FIG. 10, for the error and rate amplifier circuit, it can be seen that the saturation override signal 78 is supplied to the positive input of an instrumentation amplifier 82 which may be such as the Model No. AD521, also manufactured by Analog Devices, Inc. Referring to FIG. 9, when the desired value is within the high and low limit set points 72 and 73, the high limit diode 76 and the low limit diode 77 are both in their nonconductive state, resulting in no saturation override signal 78 being supplied, thus effectively disconnecting the valid range check circuit 69 and allowing the error and rate amplification circuit 70 to operate in its normal fashion.

Again, referring to FIG. 10, the desired value signal, which is commonly a static signal, is connected to the positive input of a first operation amplifier 83*a*, the output of which is connected to the negative input of the instrumentation amplifier 82 with a resistive feedback R1, connected in parallel with the operational amplifier and providing a signal to the negative input thereof. Under static conditions this provides what is commonly known in the art as a voltage follower circuit whereby the voltage output of the operational amplifier 83*a* is equal to the input thereof, which in this case is the desired value signal.

A second voltage follower circuit is similarly provided by connecting the feedback signal to the positive input of a second operational amplifier 83*b*, the output of which is connected to the resistor R3 with the feedback resistor R2 being connected between the output and the negative input thereof. The resistor R3, which is preferably of a rather low value, allows the saturation override signal 78 to override the normal operation of the error plus rate amplifier circuit under predetermined conditions, as described previously. With both the voltage follower circuits effectively connected to the instrumentation amplifier 82, and with the saturation override signal 78 effectively eliminated as described above, and with the system effectively in a static state condition, the correction signal is equal in magnitude to the difference between the feedback and the desired value signal, multiplied by the rate and proportional gain factor. We, in effect, now have the static state correction signal which is supplied to the corrective action circuit for the purposes previously described.

However, a dynamic state is encountered when the feedback signal is changing in relation to the desired value signal, which is the case when the process is changing or the desired value has just been changed.

In this case, we in effect have a series circuit from the output of the first operational amplifier 83*a* through its feedback resistor R1 through the capacitor C1 through the feedback resistor R3 to the second operational amplifier 83*b* output. Depending upon the relationship between the desired value signal and the feedback signal, there will be current flow from the output of one of the operational amplifier circuits through the capacitor C1 and both feedback resistors R1 and R2 to the output of the other operational amplifier circuit causing the voltage change rate across the capacitor C1 to be the same as the rate of change between the desired value signal and the feedback signal.

The voltage developed across R1 as a result of the current flow will be added algebraically to the desired value signal voltage and fed to the negative input of the instrumentation amplifier 82. Similarly, the voltage developed across R2, which will be of opposite polarity, will be algebraically added to the feedback signal voltage and fed through resistor R3 to the positive input of said instrumentation amplifier.

The instrumentation amplifier 82 provides as an output a signal correction signal which is a function of the difference of the desired value, the feedback signal, the gain factors, the value of the capacitor C1 and the rate of the change between the desired value signal and the feedback signal. This can be expressed in the formula that the correction signal is a function of:

$$G[(F-DV)+C_1\times(R_1+R_2)\times d(F-DV)/dt]$$

where $C_1$ = value of C1 in farads
G = rate + proportional gain factor
F = feedback signal voltage
DV = desired value signal voltage
T = time in seconds
d = derivative of
R = resistance in ohms The value of the resistances R1 and R2 will depend upon the particular process and the desired proportional gain and rate gain. In this particular embodiment of the error and rate amplifier circuit, the rate plus proportional gain adjust will be set for the proportional gain desired for the particular process being controlled. Then the variable resistances R1 and R2 will be set, preferably equal to each other, at the value such that the overall rate gain will be equal to the product of the rate plus proportional gain factor times the rate gain factor.

In this particular mode, which is a differential mode, operating our novel controller with the use of relatively high gain factors, such as the one used by Applicants in one application of the present invention having a value of 5, the circuit can easily go to a saturated condition, thus making the above formula for the correction signal inoperable. Since it is desired to have such formula operable over as large a range as possible, by use of this novel arrangement of circuitry we are able to bring the circuit out of the saturated condition by use of the rate portion of the circuit, which is, in effect, a look ahead feature, much earlier than the proportional circuit itself could be brought out of the saturated condition, thus giving much greater controllability than was possible heretofore.

To more fully understand the operation of the error and rate amplifier circuit, we should analyze the correction signal output function as defined in the formula above. It should also be understood that typical operational amplifiers, such as those shown as 83*a* and 83*b* in FIG. 10, and a typical instrumentation amplifier, such as that shown as 82, also in FIG. 10, reach their saturated state at approximately 2 volts less than the power supply voltage furnished them. In a typical case, the saturated state occurs at approximately ±13 volts DC. This is to mean any input greater than +13 volts or less than −13 volts may not entirely be useable and no output will exceed 13 volts nor be less than −13 volts. The typical feedback signal voltage and desired value signal voltage are in the range of zero to 5 volts DC, although other voltages and other operational amplifiers and instrumentation amplifiers are available that would result in other useable voltage ranges.

Referring to the above formula, in a static condition, the value of d(F−DV)/dt equals zero since there is no change with respect to time in the feedback and desired value signals. As such, the correction signal becomes a function of $$G \times (F - DV)$$

when the gain factor, for example, has a value of 10, and when the difference between the feedback and desired value signals exceeds approximately 1.3 volts, instrumentation, amplifier 82 becomes saturated and the effect of the correction signal is to cause the process device to move to an extreme condition at a rapid rate, preferably one that the process correlate signal can continuously respond to.

In the typical operation, the process controller utilizes the feedback and desired value signals which are initially equal in value, for example zero volts. Thus, the correction signal equals zero. The desired value signal is then suddenly changed to another value within the valid range, such as 3 volts DC, which causes the correction signal to attempt to become saturated. In this case, since this is momentarily a static condition, the correction signal attempts to become $$10 \times (0-3) = -30 \text{ Volts}$$

However, being beyond the saturation limit, it in fact becomes −13 volts typically, resulting in attempting to move the process device, such as a carburetor throttle, full speed towards the wide open throttle position. As the process device moves, the process correlate signal starts to increase. We should now reanalyze the above formula by using a slightly different form, namely $$G\left[F + G_2\frac{d(F-DV)}{dt} - \left(DV - G_2\frac{d(F-DV)}{dt}\right)\right]$$

where $G_2 = R_1C_1$, and for example might equal 10. The factor $$F + G_2\frac{d(F-DV)}{dt}$$

is the output of the second operational amplifier 83*b*, while the factor $$DV - G_2\frac{d(F-DV)}{dt}$$

is the first operational amplifier 83*a*, neither of which can exceed the saturation limit, typically 13 volts. Also, the value of the entire formula cannot exceed the saturation limit.

As the process correlate signal, and thus the feedback signal F starts to increase, the value of the left portion of the above formula which is the output of the second operational amplifier, increases in value from zero volts, and the value of the right portion, which is the output of the first operational amplifier, increases in value from 3 volts at a somewhat slower rate since the value DV is static. This results in an overall reduction in the magnitude of the output of the correction signal from −30 volts until the system becomes within saturation. It should be observed that the main factor in changing the correction signal is the factor $$G_2\frac{d(F-DV)}{dt}$$

which equates to the rate of change between the feedback and desired value signals. This factor typically might be changing at a speed ten times that at which the feedback signal might change. As such, the correction signal is reduced at a rate much faster by also using the rate of change of the actual error between the feedback and desired value signals then if the error difference only was considered. This is termed the look ahead feature, wherein the effect of the rate of change between the feedback and desired value signals is a much larger factor in determining the correction signal than the error difference between the feedback and desired value signals. When the correction signal falls within the saturation voltage, the process starts changing at a slower rate, although the process correlate signal response from the process is somewhat slower than the process device because normal operation of the carburetor, for example, is somewhat sluggish in nature.

As the process continues to change at a continuously slower rate, the correction signal value changes to a value within the deadband, thereby stopping further process device change. As the process correlate signal, and thus the feedback signal, continues to change somewhat, the correction signal reverses polarity, and a process device change starts to occur in the operation direction, although at a slow rate since the magnitude of the correction signal typically remains small. This demonstrates a process device overshoot with little or no process overshoot yielding a faster process acquisition time, thus faster process control.

In another typical operation in which an external means, such as throttle adjustment, is causing a process, such as controlling hood pressure, to change at a relatively steady rate, the process starts with the process being controlled. Thus, the feedback and desired value signals are in a static condition and are equal in value, and thus the correction signal equals zero. In this case, the desired value is held at a constant value, but the external means of throttle adjustment is used to change the process and ultimately the process correlate signal, and thus change the feedback signal by for example 0.25 volts per second, if no corrective action were to be taken. Again, as this is momentarily a static condition, the correction signal becomes some non-zero value. This results in moving the process device, such as the hood pressure valve, in such a manner as to attempt to keep the feedback signal at its desired value. As the changes of throttle adjustment and hood pressure valve are occurring, the correction signal takes on a value such that the process operator tends to move at a relatively constant speed in tracking the feedback signal change caused by the throttle adjustment. This correction signal tends to be independent of the d(F−DV)/dt function, since the process correlate signal is essentially maintaining a value somewhat different than its original value. At an essentially constant value, there is no rate of change in the difference between the feedback and desired value signals. When further throttle adjustment is ceased, the tracking ends and the look ahead feature will tend to dampen the process overshoot as in the previous example.

In an additional type of operation in which the desired value signal is changed at some relatively steady rate, the operation of the error and rate amplifier circuit is somewhat similar to that of the previous example. The process device will be moving in such a manner so as to attempt to change the feedback signal at the same rate that the desired value signal is changing, again resulting in the d(F−DV)/dt funtion essentially becoming zero in value, while the F−DV function takes on some relatively constant value. When the desired value change stops, the tracking ends, and the look ahead feature will again tend to dampen the process overshoot yielding a faster process acquisition time, thus faster process control.

In the case where a saturation override signal 78 is not effectively eliminated, and has been supplied to the error and rate circuit 70, this signal, which itself is a saturated signal, causes the instrumentation amplifier 82 to be driven and held into positive or negative saturation. The polarity of the instrumentation amplifier 82 output correction signal will be the same as the polarity of the saturation override signal. This correction signal, as above, is fed into one of the corrective action circuits shown in FIGS. 6, 7 and 8.

Referring now to FIG. 11, the operation of the scaling and meter protection circuit 71 can be described. In this case, we have, in effect, two voltage follower circuits with current limiting resistors before the feedback loop. The first of these circuits is formed by the first scaling circuit operational amplifier 83*c* and the first current limiting resistor 85*a*, and the second of these circuits is formed by the second scaling circuit operational amplifier 83*d* and a second current limiting resistor 85*b*. A scaling resistor 86 is provided at the output of the first current limiting resistor 85*a*, and the second of these circuits is limiting resistor 85*a*. Thus, when the desired value signal enters the first scaling circuit operational amplifier 83*c*, and the feedback signal enters the second scaling circuit operational amplifier 83*d*, the two operational amplifiers together provide a differential output which is in the form of voltage, which has limited current capacity such that the meter will not be overranged Depending upon the particular meter and scaling resistor 86 used, the desired deviation meter output may be obtained.

Referring now to FIG. 6, which is the preferred embodiment of the corrective action circuit 68, if a DC stepping motor is to be used as the operator 45, the purpose of the corrective action circuit is basically threefold. First to determine the absolute value of the correction signal, second to indicate to the driver, to be described hereinafter, the original polarity of the correction signal, and third to supply a clock signal to the driver. It should be understood that the clock signal is a series of pulses wherein the frequency varies.

The absolute value circuit 87, shown in FIG. 16, consists of a plurality of operational amplifiers connected to various circuit components. A first absolute value circuit operational amplifier 83*e* having a positive and negative input is provided. The positive input is connected to analog common through a resistor having a value of $\frac{2}{3}$R as described hereinafter. The negative input of said operational amplifier 83*e* is connected to a first summing junction 88. The correction signal is supplied to the summing junction 88 through a resistor having a value of R and to a second summing junction 89 through a resistor having a value of 2R. Also interposed between the first summing junction and the second summing junction 89 are two resistors in series, both having a value of R. A first steering diode 95 is interposed between said two resistors at junction point 90 with the cathode of said first steering diode connected to the output of said first absolute value circuit operational amplifier 83*e*. There is also provided a second steering diode 96 having its cathode connected to said first summing junction 88 and its anode connected to the output of said first operational amplifier 83*e*. A second absolute value circuit operational amplifier 83*f* has its negative input connected to said second summing junction 89, and its positive input connected to analog common through a second resistor having a value of $\frac{2}{3}$R. The output of said second operational amplifier 83*f* is also connected to said second summing junction 89 through a resistor having a value of 2R, and provides an output signal having an absolute value of the input correction signal. A third absolute value circuit operational amplifier 83*g* having its negative input connected to the output of said first operational amplifier 83*e* is provided. The positive input of said third operational amplifier 83*g* is connected to analog common through resistor having a value of R/10, and a feedback loop is provided wherein there is interposed a resistor of value 10R. A polarity signal is taken off the output of said third operational amplifier 83*g*.

It is well known in the art that one does not want to operate an operational amplifier at its maximum current rating continuously because its reliability suffers a serious drop. Also, one does not want to operate it at too small a current because then such factors as noise, bias currents, and other considerations come into play. We prefer to operate the operational amplifiers at approximately 10% of their rating, and would choose the various resistors in the circuit to so limit the current. In order to do this, the value of any particular resistor would follow the relationship shown wherein the resistors are rated from R/10 to 10R with various values in between.

When the correction signal enters the absolute value circuit 87, the correction signal voltage is applied to the resistor R associated with the first absolute value circuit operational amplifier 83*a*. For a correction signal voltage greater than zero, the first operational amplifier circuit in effect has a gain factor of minus one and will cause the output of said circuit at junction point 90 to become the negative value of the input correction signal. The second operational amplifier circuit associated with summing junction 89 effectively provides an output voltage equal to the negative sum of the input correction voltage and twice the voltage at junction point 90. In this case where the input correction voltage is positive and the voltage at junction point 90 is negative, the output voltage is $-[CV+2(-CV)]=+CV$ where CV is a correction voltage greater than zero.

However, when the correction signal voltage is less than zero, the voltage at junction point 90 would become the positive value of the correction signal voltage except that now the steering diodes give the first operational amplifier circuit an effective gain factor of zero. This results in the voltage at junction point 90 becoming zero. Now the output of the second operational amplifier circuit is $-[CV+2(0)]=-CV$ where CV is a correction voltage less than zero. Therefore, the output of the second operational amplifier circuit is a positive signal equal in amplitude to the input correction voltage and is commonly termed absolute value.

Since the output of the first operational amplifier 83*e* between the two steering diodes will always have the opposite polarity of the input correction signal, the negative polarity signal is fed to the negative input of the third operational amplifier 83*g* which, in effect, acts as a comparator. The output of the third operational amplifier 83*g* is caused to be saturated in the opposite polarity of its input since the resistors 10R and R/10 were chosen to obtain said saturated condition. This gives us a polarity signal as indicated in FIG. 6 with the same polarity as the correction signal.

Again referring to FIG. 6, the absolute value signal from the absolute value circuit 87 is then supplied to the deadband comparator 92 which may be such as Model No. AD311 manufactured by Analog Devices, Inc. previously mentioned. The function of said deadband comparator is to compare the absolute value of the correction signal with deadband reference values which have been supplied thereto by any suitable means. If the absolute value of the correction signal (X) is between zero and the deadband reference value, the deadband comparator acts to cause the process device 46 to remain in its present position by disabling the analog switch 94 thereby preventing any clock output.

The absolute value of the correction signal is also supplied to the summing amplifier 91 shown in FIG. 13. Summing amplifiers are common in the art and the components thereof, or its operation, need not be described herein in detail. It is to be noted, however, that the transfer function for the particular circuit as shown in FIG. 13 used in this summing amplifier results in the equation:

$$\text{Output} = -Rf \times \left(\frac{Y}{Ra} + \frac{X}{Rb}\right).$$

Thus, we now supply the signal from the summing amplifier 91 to the voltage to frequency converter 93 which may be such as the model No. AD537 manufactured by Analog Devices, Inc. of Bloomingdale, Ill., or any of several other devices known in the art. If the deadband comparator 92 has not previously caused the analog switch 94 to disable the output from said voltage to frequency converter 93 because the absolute value of the correction signal was between zero and the deadband reference value, a clock signal will be supplied to the driver 45. The analog switch may be such as the Model No. AD7513 manufactured by the aforementioned Analog Devices, Inc., or could be an equivalent transistor circuit well known in the art.

The clock signal and the polarity signal being supplied to the driver will ultimately be transferred to the operator 45, which in this case is a DC stepping motor, and will control the speed and direction at which said motor operates. Since the corrective action circuit shown in FIG. 6 is particularly adapted for driving a DC stepping motor, a stepping motor driver should be used in conjunction therewith. There are many stepping motor drivers such as those manufactured by the Superior Electric Co. of Bristol, Conn. and Sigma Instruments, Inc. of Braintree, Mass. However, the preferred embodiment of the present invention when a DC stepping motor is to be used, consists of a stepper translator connected to a quad 5 Amp DC driver. These units are available commercially from Scans Associates, Inc., of Livonia, Mich., as stepper translator Model No. 30086 and quad 5 Amp DC driver Model No. 30083. We have found this particular driver system to be very advantageous because of the fact that it is a higher performance system than others commercially available, and it has several other features, such as full or half step operation, polarity reversal, and optically isolated outputs and inputs, which are very desirable in reducing noise effects in the system and allowing interconnection with and around machine control apparatus. Also, if desired, in place of the valid range check circuit 69, limit switches could be connected to this preferred driver system to prevent the ultimate process operating device 46 from exceeding the fully opened or fully closed type position.

If for reasons such as speed, torque, cost of the particular application or the like, the drivers so far described, which are all DC in nature, may not be applicable, it may be desirable to use a standard reversible motor other than a DC stepping motor in an incremental or step mode. Such a motor would normally be an AC motor which would require, in turn, a two-directional switched driver which is shown in FIG. 17. In this instance, a divide by N circuit 103 is provided which may be the same as a Motorola Model No. MC14522B or its equivalent. This circuit has the clock signal connected to one input, and a N assignment device 104, which may be a thumbwheel switch or other suitable switching device, connected to the present inputs. The output of the divide by N circuit is connected to a retriggerable timer 105 which may be similar to Motorola Model No. MC14528B or some similar device. This particular timer has proven to be desirable because it is of a programmable nature having provisions for an increment duration or magnitude adjustment. The output of the timer 105 is connected to one input each of a first two input "and" gate 111 and a second two input "and" gate 112. The polarity signal from the corrective action circuit is connected to the second input of the second two input "and" gate 112 and is also connected through an inverter 110 which may be such as Motorola Model No. MC14049B to the second input of the first two input "and" gate 111 in the manner shown in FIG. 17. The output of the first two input "and" gate 111 is connected to the base of the first driver transistor 113. The emitter of said first driver transistor is connected to the logic common and the collector thereof is connected to a first driver relay 115 which may be such as the Model No. 65630-22 manufactured by Hathaway Controls of Tulsa, Okla. The contact connections from the first driver relay may be used in many ways, three of which will be described below in regard to FIGS. 18 through 21.

Similarly, the output of the second two input "and" gate 112 is connected to the base of the second driver transistor 114 which may be indentical to the first driver transistor as is the case in the present embodiment. The emitter thereof is again connected to logic common with the collector being connected to the input of a second driver relay 116 which may be identical to the first, if desired. The contacts from the second driver relay 116 can be also used for any desired purpose. One particular use of the contacts from the first driver relay and the second driver relay which we have actually used is to connect them in the manner shown in FIG. 18 to an AC synchronous motor 117 such as the Model No. SS400RC maufactured by Superior Electric Co. of Bristol, Conn.

It should be understood, and will be understood by one skilled in the art that many of the components shown in the figures for which model numbers have been supplied can be substituted by many other substantially identical components having other model numbers and being manufactured by other manufacturers, and the circuitry of the present invention will perform as desired. Only the preferred embodiment has been shown herein, and some of the reasons for such preference have been given. Other reasons having to do with availability, cost, size, etc. also were taken into account by the Applicants.

It is contemplated that when a substitution is made, after appropriate substitution guides have been consulted, wiring diagrams for the particular device being substituted may be easily obtained from the literature supplied by the manufacturer of the particular device being used.

Also, it should be understood in regard to FIG. 18 that the contacts from the first and second driver relay can be used in many other ways other than connecting them to the particular AC motor with which Applicants have experience. Examples of such uses are the use of most any reversible motor, or two direction actuator to control mechanical, pneumatic or hydraulic circuits. Such actuator may be rotational or nonrotational in nature.

Referring again to FIG. 17, our two direction switched driver would accept the input of the clock and polarity signals and the N input supplied by the N assignment device 104. The divide by N circuit puts out one pulse for every N input pulses and this serves to scale down the high frequency clock rate producing the increment rate. The scaled pulse rate is then used to trigger the retriggerable timer 105. The timer output is then gated with the above mentioned polarity signal to produce separate forward and reverse output signals by means of the first and second two input and gates, the first and second driver transistors and the first and second driver relays. The signals, which are in the form of contact closures as previously mentioned, may be used to drive most any motor or two direction actuator by way of standard switching techniques. The increment magnitude adjustment is used to determine the duration of contact closure for each N clock pulses.

A use of our two-directional switched driver for controlling a DC motor may be such as that shown in FIG. 19 wherein the relay contact **115*a* which is understood to be the contact of the first driver relay 115 and the relay contact 116*a*, which is understood to be the relay contact of the second driver relay 116**, are connected in the manner shown to a standard DC motor.

If it is desired to operate pneumatic or hydraulic circuits incrementally with the two-directional switched driver, the method of use illustrated in FIGS. 20 and 21 have been shown to be satisfactory, wherein the first driver relay contact **115*a* and the second driver relay contact 116*a* are connected as shown in FIG. 20 to a solenoid A and a solenoid B of a double solenoid valve which are, in turn, connected to a pressure operated cylinder 118 in the manner shown in FIG. 21. When solenoid B is operating the position of the double solenoid valve shown in FIG. 21 causes pressure to enter the left-hand end of the cylinder 118**, causing the piston thereof to move to the right and the cylinder to extend. When the solenoid A is operating, the valve shifts position causing the piston to move to the left and the cylinder to retract.

However, in certain processes it is desirable to use pneumatic control actuators as the operator 45. This requires some changes in the corrective action circuit and results in the embodiment shown in FIGS. 7 and 8. When the pneumatic corrective action circuit shown in FIG. 7 is used, the correction signal from the differential input circuit 67 first passes into an absolute value circuit 87, which is identical to that previously described in FIG. 16. The output of the absolute value circuit again is the absolute value of the corrective action signal and this is passed into the deadband comparator 92. The polarity output from the absolute value circuit is not used in this embodiment. In a manner similar to that previously described, the absolute value of the correction signal will be compared with the deadband reference and if it is between zero and the deadband reference the analog switch 94 is disabled. Therefore, no current can flow into the integrator 98 and no change in the output of the pneumatic corrective action circuit occurs, and thus the signal to the driver 43 is effectively frozen.

However, if the absolute value of the correction signal is greater than the deadband reference, the analog switch 94 is enabled allowing current to flow to the integrator 98. In this condition, the correction signal is supplied to the scaling circuit which, in effect, is a simple potentiometer well known in the art. Thus, the correction signal is reduced in value in a predetermined proportion and provides a properly scaled signal to the integrator 98.

Referring to FIG. 14, the input to the integrator 98 passes through a resistor $R_I$ into the negative input of the integrator circuit operational amplifier **83*h*. A feedback loop containing a capacitor $C_I$ is provided from the output of the operational amplifier back to its negative input with its positive input connected to analog common. The effect of this is to change the input signal into a voltage signal representing the rate of change of the voltage. The values of $R_I$ and $C_I$ are chosen to provide a time constant for the circuit such that the process device 45 is capable of following the output signal through the driver 43**. In general, the output is a function of $V/R_I C_I$ and time.

The voltage signal out of the integrator 98 is then passed through a buffer-scaler 100 shown in more detail in FIG. 12. The buffer-scaler is, in effect, a bipolar driver follower composed of a NPN transistor Q1 such as a 2N4921 and a PNP transistor Q2 such as a model 2N4918 with their bases both connected to the input signal supplied from the integrator 98 and the emitters both connected to a scaling resistor RS which provides an output signal to the driver. The collector of Q1 is connected to plus VCC (power supply voltage) and the collector of Q2 is connected to minus VCC. Thus, a signal is provided to the driver 43 which in this case might be a current to pressure converter such as a Moore Products Model No. 77 manufactured in Springhouse, Pa.

In a process where a pneumatic control device 45 and thus a pneumatic driver is necessary and a reset type action is desirable, the embodiment shown in FIG. 8 has proven desirable. In this case, similar to that described in connection with FIG. 7, the correction signal from the differential input circuit is supplied to the absolute value circuit which, in the manner previously described in connection with FIG. 16, supplies an output equal to the absolute value of the correction signal and a polarity signal. The absolute value signal from the absolute value circuit is again supplied to a deadband comparator 92, and if the absolute value of the correction signal is less than a deadband reference, the dual analog switch 97, which also may be such as Model No. AD7513 manufactured by the aforementioned Analog Devices, Inc., disables both inputs to the summing intergrator 102, thus resulting in the signal to the buffer-scaler 100 being held constant, which ultimately results in no change being supplied to the operating device 45.

However, if the absolute value of the correction signal is greater than the deadband reference, the analog switch will not disable the inputs to the summing integrator 102. In this case, referring again to FIG. 8, the correction signal is simultaneously fed to the scaling device 99, which may be identical to that shown in FIG. 7, and is, in effect, a potentiometer. This results in some change in magnitude of the correction signal being supplied to the analog switch. The saturated polarity signal from the absolute value circuit 87 is simultaneously being supplied to a second scaling device 101, resulting in a second input to the analog switch 97. This second signal will basically be a constant positive or negative signal depending on the polarity signal. With the analog switch in its enabled condition, both of these inputs are supplied to the summing integrator 102 such as that shown in FIG. 15. The summing integrator consists of a summing integrator circuit operational amplifier **83*i* having its positive input connected to analog common and a feedback loop having a capacitor $C_{Si}$ interposed between its output and its negative input. The two input signals from the scaling devices 99 and 101 pass through the resistors $R_{Si1}$ and $R_{Si2}$, respectively, and are connected to the negative input. The values of the resistors and capacitors are again chosen in view of the considerations previously discussed dealing with the integrator shown in FIG. 14 and depending upon the particular application to which the process controller is to be put. The output of the summing integrator 102 is a function of $(V_1/R_{Si1} C_{Si})+(V_2/R_{Si2} C_{Si})$ and time. This voltage signal is supplied to the buffer-scaler 100, which performs the same operation on the signal as described in relation to FIG. 7. It can be seen that FIG. 8 is substantially similar to FIG. 7 except for the second scaling device 101. The function of said second scaling device is to provide a voltage input that effectively gives a minimum speed signal to the driver 43, causing the process device 45 to move at minimum speed thereby creating a reset type of action when outside of the deadband range. In a manner similar to that previously described, the driver may be such as a Moore Products current to pneumatic converter model 77. The driver, in turn, supplies a signal 48 to the process 44 as shown in any one of FIGS. 1 to 3**, and the process correlate signal is continuously compared to the desired value signal until the process is within the desired limits, thus completing the loop for any of the devices described, thus providing a novel single-state four-mode controller which controls a process as a function of the difference of, and rate of change between, a desired value and a current state of a process.

Now referring to FIG. 22, there is shown a typical use of our improved three-state four-mode process controller generally designated by the numeral 125. Similar to that previously described with FIG. 1, the process controller is supplied with a voltage reference indicating a desired value from a desired value setting device 160, which causes the process controller to supply a signal to the driver 43 which, in turn, supplies a process input signal 48 to the process generally designated by the numeral 44. Since this is a closed-loop system we are concerned with, the process 44 will then supply a process correlate signal 49 indicating the current state of the process. If the process correlate signal is a voltage signal useable by the three-state process controller 125, it may be directly supplied thereto. If however the process correlate signal is not directly useable, a feedback signal device 42 is needed to convert the signal into one useable by the controller. For example, if the process correlate signal 49 is pneumatic in nature, the feedback signal device may take the form a pressure transducer.

As mentioned previously, such means for converting the signals are well known and no additional description of the feedback signal device 42 is deemed necessary herein.

Since we are now mainly concerned with controlling a wide variety of processes all of which might necessitate setting the process at many different desired values, FIG. 23 shows an embodiment of our invention where it is desired to automatically operate at said variety of desired settings, such as to move a control valve over many test points in a system which is designed to control the manifold vacuum in a carburetor testing system such as shown in FIG. 27. In such case for a typical carburetor test one may test at as many 20 or 30 oints. Some modification is preferred for this situation over the generalized version because you would need a new desired value from the desired value setting device 160 for each test point. While these could be set manually, as will be discussed below in relation to FIG. 24, it is much easier to have some sort of automation device 184 which will automatically change the desired value for the next condition similar to that described in connection with FIG. 2. It is also possible, as shown by the dotted line in FIG. 23, to tie the output from the feedback signal device 42, or the process correlate signal 49, to the automation device 184 as before. This may be desired to confirm that the particular condition at which the process has arrived is indeed the desired condition before the automation device 184 takes further action.

As shown in FIG. 24, the manual system is in many respects similar to the system shown in FIGS. 22 and 23 except the automation device 184 is eliminated and the desired setting device 160 is replaced by a potentiometer 55, which is used in the manner previously described, and by a pushbutton switch 161 which is used to reset the three-state process controller to its first state as will be described herein.

An improvement in a system which would be used either with the three-state four-mode process controller being described or the single-state four-mode controller previously described or indeed with any of the systems previously described wherein the controlling of the hood pressure, for example, is concerned is shown in FIG. 25. In this case, and in addition to the driver 43, operator 45 and process device 46 there is a second driver 126 whose input is connected to the three-state process controller 145 and whose output is connected to the input of a second operator 127 at the second process input signal 129. In turn the process speed improvement device 128 has its input connected to the output of the second operator 127.

In this case, when one is initially employing a process 44 in which one is attempting to control the hood pressure one may have a system as shown in FIG. 26. In order to control the hood pressure inside the hood 59 one must first measure the hood pressure, and this is done by an absolute pressure transducer **47*b* which has previously been identified as the 1332 series manufactured by Rosemont Engineering of Minneapolis, Minn. in reference to FIG. 4*b*. In a manner well known in the art, said absolute pressure transducer produces the process correlate signal 49 which in a manner similar to that previously described is fed through the feedback signal device 42, in necessary, and then fed into the three-state process controller 125**.

As previously described, the process correlate signal 49 would be compared with the feedback signal, in a manner shown in FIGS. 22 through 25, with a signal from the desired setting device 160, and if a difference exists between the actual status of the process and the desired status of the process, the process input signal 48 from the driver 43 would be used to drive the operator 45, which in this case is a valve operator **45*b*, which drives the process device, which is in the form of a valve 46*b*, to a new position. However, a second signal would be supplied to the second driver 126 which in turn would supply a second process input signal 129 to a second operator 127 which in this case is in the form of valve operator 127 driving the process speed improvement device 128 which is usually in the form of a valve. This would be done any time the desired hood pressure is much lower than the actual hood pressure because of the relatively large air volumn under the hood. The throttle plate 152 of the carburetor 56 in most cases will be in a position which substantially restricts the carburetor throat 151 and thus an extremely long time will be needed for the vacuum supply to pull sufficient air from under the hood 59 to reduce the hood pressure to the desired value. In the preferred embodiment the process speed improvement device 128 shown as a valve in FIG. 26 would snap completely open whenever a reduction of the hood pressure under the hood 59 was called for and would stay completely open until the new desired hood pressure is reached, at which time the valve 128 would snap completely shut after which time the three-state four-mode process controller would operate to make the final adjustments to obtain the desired hood pressure. This would again be done by continuously supplying the new process correlate signal 49 to the three-state four-mode process controller 125 through the feedback signal device 42, if necessary, then comparing said feedback signal with the desired value signal from the desired setting device 41 and, if necessary, supplying a changed signal to the driver 43 which would again produce a new process input signal 48, with the operation continually repeating itself until the desired value is reached within the selected deadband limits. The actual connection of the second driver 126 and second operator 127 to the process speed improvement device 128 within the process 44** are well known in the art and need not be described further herein.

A basic system which may be used embodying our three-state four-mode process controller is shown in FIG. 27. The basic systems shown in FIGS. 27 through 31 are for testing carburetors in a laboratory environment wherein the control of hood pressure, manifold vacuum and air flow is required. In operation the carburetor 56 would be mounted under the hood 59 to the riser 57 in a manner previously described. The hood 59 is shown in its closed position but of course it should be understood that the hood 59 would either be manually removable from a suitable test stand or an automatic means of opening it would be provided. Needless to say the space under the hood 59 would be sealingly enclosed so that outside conditions would not influence the carburetor test. The next step in a carburetor test utilizing the present invention is for the manifold vacuum measurement and control system 135 to cause air to flow from the air supply (not shown) through the hood pressure and control system generally designated also by the numeral 135 as they may be identical systems from a physical construction point of view as will be discussed below. The air will then flow through the air flow measurement and control system also designated by the numeral 135 for the above stated reason. The air will then flow through the conduit 137 to the space enclosed under the hood 59, through the carburetor throat 151 and in turn through the conduit 136 to the manifold vacuum measurement and control system 135 which is connected to a vacuum supply (not shown). Air flowing through the carburetor 56 draws fuel into the carburetor through the fuel line conduit 153 which is connected to a fuel flow measurement system which may be such as is readily available in the art.

It is not felt that the vacuum supply need be described in detail, as the vacuum source is normally in the form of a vacuum pump of which there are many types on the market. It should be understood that any vacuum pump may be used providing it is of sufficient size to produce the air flow necessary through the carburetor being tested so that all desired tests can be run. In this regard it should be noted that it is necessary to consider whether there are sonic nozzles to be run or the system is to used in a subsonic condition in selecting the vacuum supply system.

Similarly, the air supply need only be a source of air which is being controlled as to temperature, pressure and humidity. Many air supply systems are available and again any of such systems may be used provided they have a sufficient capacity to flow the desired amount of air through the caburetor being tested so that such carburetor may be tested under all desired conditions. Also an adequate fuel supply system must be used in conjunction with the fuel flow measurement system.

To proceed with the details of the carburetor test, the manifold vacuum measurement and control system 135 has caused air to flow through the carburetor 156. Depending upon the test specifications, the hood pressure measurement and control system 135 will usually keep the pressure under the hood 59 at a pressure near sea level or at a pressure equivalent to a certain relatively high altitude such as that at Pikes Peak. In performing a carburetor test in the laboratory, one must set the desired values of hood pressure, manifold vacuum, and air flow for each flow point at which it is desired to test a carburetor. In order to obtain the fastest test speed and proper test conditions, it is desirable that the air flow, hood pressure, and manifold vacuum control and measurement systems operate simultaneously without causing hunting or oscillating type of control in any of the systems. It should be recognized that the air flow measurement and control system 135 will cause the throttle plate in the carburetor to be controlled by the throttle operator 45 and be rotated until the desired air flow is preset through the carburetor. At this point then you have achieved a given air flow at a predetermined manifold vacuum and hood pressure. Having achieved the desired air flow through the carburetor, one is in a position to know the mass air flow rate through the carburetor and if one now also measures the mass fuel flow rate entering the carburetor, the air/fuel ratio of the particular carburetor at the predetermined test point conditions can be determined.

In FIG. 28, when it is desired to use a hood pressure process speed improvement device similar to that described in FIG. 26, the conduit 154 is connected in any suitable manner to the sealed space under the hood 59 at one of its ends and at its other end to the hood pressure measurement and control system, which in this case is indicated by the numeral 138 to show that it is no longer indentical to the manifold vacuum measurement and control system. It should be understood at this point that a process speed improvement device could be used in many systems where there may be an excessive time delay usually caused by a large volume of a compressible fluid.

This system would operate in the manner just described for FIG. 27 but incorporates in addition to the conduit 154, the process speed improvement device in the form of a valve 128*a* and the second operator 127 (See FIG. 26).

In this case we are describing a system which is one embodiment of a carburetor test system utilizing our invention, and only the air flow and manifold vacuum measurement and control systems are identical and use our three-state four-mode controller 125. The hood pressure measurement and control system 138 also uses a three-state four-mode process controller, however it contains the process speed improvement device.

A modification of our invention is shown in FIG. 29 which is similar to FIG. 27 but employs a computer system 139 to aid in the test by monitoring the three controller systems and providing the desired value settings by acting as the automation device 154. A further modification of our invention is shown in FIG. 30 which is similar to FIG. 28 but employs the computer system 139 as previously described.

Another embodiment of our invention is shown in FIG. 31, which is similar to FIG. 28 but employs the computer system 139, and utilizes said computer system to control the air flow. In this embodiment it should be noted that the air flow measurement system is now designated by the numeral 140 as it no longer controls the throttle operator 45, this function now being controlled by the computer system 139. However, this is only true with regard to the air flow measurement and control system, because the hood pressure and manifold vacuum measurement and control systems are now identical and both use our three-state four-mode control in a manner to be more fully described. In this case the computer system acts as a watchdog type system supplying desired value signals to the two process control systems, and as an air flow control system in response to process correlate signals received from the air flow measurement system 140. In most other respects it is similar to the operation described for the system of FIG. 28. In addition, the conduit 153 is again sealingly connected to the enclosed space under the hood 59 at one end thereof, and to the hood pressure measurement and control system 138 at the other end thereof. Again the process speed improvement device would operate similarly to the manner described in connection with the description of the FIGS. 25 and 26 and would require the second driver 126, the second operator 127 and the process speed improvement device 128.

The descriptions of the uses of the three-state four-mode controller thus far described for use in a carburetor testing system have been described in general terms showing various closed-loop processes. It should be understood that such three-state four-mode controllers can be used in virtually any process where a standard process controller, such as the single-state controller previously described or a commercially available controller can be used. This is true whether one is concerned with electrical, pneumatic or hydraulic processes, as the method of control would be the same for all three types of process, only apparatus would be different.

To more fully understand the detailed operation of our three-state four-mode controller it is to be noted that the process controller 125 shown in FIGS. 22, 23, 24 and 25, consists of two portions, the three-state differential input circuit 145 and the corrective action circuit 68. In general the three-state four-mode process controller compares the feedback signal with the desired value signal from the desired setting device, finds the actual error difference between the two signals (static), finds the rate of change (dynamic) between the two signals, sums them algebraically, and then provides an output signal related to the error, the rate of change, a deadband range, and the "state" of the controller to operate the driver 43 as necessary. When in a stable and static condition there will be no saturation override signal 78 and the difference error between the feedback signal from the feedback signal device 42 which relates to the process correlate signal and the desired value from the desired setting device 160 is less than the preselected deadband there is no movement of the process device 46.

For each new set point, the desired value setting device 160 will now supply a new desired value signal to the three-state four-mode controller 125 as shown in FIG. 22. As before this signal will be supplied of the three-state differential input circuit 145 as illustrated in FIG. 32 and more particularly to the three-state error and rate amplifier 146 whose operation will be described later. This signal is also supplied to the valid range check circuit 69 which operates in the same manner as previously described in connection with our single-state four-mode process controller. Also this signal is supplied to the scaling and meter protection circuit shown in FIG. 11 which again acts in the manner previously described. For a new set point, the desired value setting device 160 may also supply a reset state signal to the three-state four-mode controller as shown in FIG. 22, in particular to the three-state differential input circuit 145 as illustrated in FIG. 32.

We refer now to FIG. 35 which shows the detail of the three-state error and rate amplifier circuit. We have already described how the saturation, override, feedback, desired value and reset state signals are provided. As in the single-state error and rate amplifier circuit 67, in this case the desired value signal goes to the positive input of the first operational amplifier 83*a*, the feedback signal goes to the positive input of the second operational amplifier 83*b*, and the saturation override signal goes to the negative input of the instrumentation amplifer 82. In this embodiment the reset state signal is now supplied to the reset input of the state counter device 156 and the polarity signal from the absolute value circuit 87 shown in FIG. 16, which operates in the manner previously described, is supplied to the input of the edge detector 157. The edge detector consists of an "exclusive-or" gate 158, having a first and a second input. Interposed between the input of the edge detector and the first input of the "exclusive-or" gate 158 is the first edge detector resistor R5.

Interposed between the second input of the "exclusive-or" gate 158 and the input of the edge detector 157 is a second edge detector resistor R6 also interposed between ground and the second input of the "exclusive-or" gate 158 is the edge detector capacitor C2.

It should be noted that the polarity signal will go directly to the first input of the "exclusive-or" gate, but will be delayed in getting to the second input of the "exclusive-or" gate because of the manner in which the edge detector capacitor C2 and the second edge detector resistor R6 are connected.

A pulse output is provided from the edge detector 158 every time the polarity signal at its input changes polarity. Such output is connected to the clock input of the state counter device 156 which may be a Motorola, Inc. Model MC14017B. Each time a pulse is supplied to the clock input, the state counter will incrementally advance from the state it was previously in. Since we use a state counter 156 having a state one output, a state two output and a state three output, each time a pulse is received the state counter will provide an output which will advance from state one to state two or from state two to state three. The reset state signal is used to reset the state counter to state one.

The reset state signal will cause the state counter device 156 to initially have a state one output and the absence of a reset signal will allow the state counter to proceed to state two and further to state three. It is necessary to keep the state counter 156 in state three during further changes to the polarity signal. This function is performed by the clock inhibit input of the state counter 156 which is connected to the state three output of the state counter thereby latching the state counter into state three where it remains until another reset state signal is received at the reset state input of the state counter 156.

To actually cause the changes in direction of the process device 46 from state one to state two, and from state two to state three, the correction signal must have different values for each state. It should be recognized that while in state three, the correction signal changes are the same as described for the operation of the single-state four-mode controller.

It is now that the use of the state one, state two and state three outputs of the state counter device 156 are utilized to accomplish this, as they act to connect three different sets of variable resistances (one set for each state) between the outputs and negative inputs of the first operational amplifier 83*a*, and the second operational amplifier 83*b* as well as across the gain set inputs of the instrumentation amplifier 82.

As can be seen from FIG. 35, each set of resistances consists of three separate variable resistors which may be set to the same or different resistance values as needed to cause the proper operation of the three states to occur.

It can be seen that when the state counter device is in state one, corresponding to state one on the graph in FIG. 33, the first state one variable resistor R1A is connected from the output of the first operational amplifier 83*a* to the negative input thereof through first state one analog switch 94*c*, the second state one variable resistor R2A is similarly connected through the second state one analog switch 94*f* across the second operational amplifier 83*b*, and the third state one variable resistor R4A is connected across the gain set inputs of the instrumentation amplifier 82 through the third state one analog switch 94*i*.

When the state counter device is in state two, first, second and third state two analog switches 94*b*, 94*e*, and 94*h* respectively are brought into action and respectively connect the first state two variable resistor R1B from the output of the first operational amplifier 83*a* to the negative input thereof, the second state two variable resistor R2B from the output of the second operational amplifier 83*b* to the negative input thereof, and third state two variable resistor R4B across the gain set inputs of the instrumentation amplifier 82, thus forming gain factors for these three devices which may be different from those in state one.

Similarly in state three, first, second and third state three analog switches 94*a*, 94*d*, and 94*g* respectively are used to respectively connect first state three variable resistor R1C from the output to the negative input of the first operational amplifier 83*a*, second state three variable resistor R2C from the output to the negative input of the second operational amplifier 83*b*, and third state three variable resistor R4C across the gain set inputs of the instrumentation amplifier 82, forming gain factors for these three devices which may be different from those in state one or state two.

To correlate these resistors, and to show how the device goes from one state to another, it should be understood that the resistors R1, R2 and R4 utilized in the three-state error and rate amplifier correspond exactly to the resistors R1, R2 and R4 shown in the error and rate amplifier circuit of FIG. 10 for the single-state controller. The resistor R3 is unchanged for the two different controllers. It can be seen then that the state counter device 156 in connection with the edge detector device 157 causes the three-state process controller to change states as shown in FIG. 33. The state counter 156 is reset to the state one via the reset signal, and then incremented to state two and to state three, via the polarity signal and the edge detector, where it will remain until the reset signal is again provided.

The values of the three sets of resistors across the amplifiers are chosen such that if the state counter is reset to state one the process device 46 will operate at a predetermined rapid speed in the desired direction. When the polarity signal changes polarity, the state counter 156 will receive a pulse from the edge detector 157 causing the state counter and thus the three-state four-mode process controller to go into state two and therefore automatically connecting the set of state two resistors across the amplifiers 82, 83*a* and 83*b* which cause the driver 43 to drive the operator 45 to move the process drive 46 at a predetermined rapid speed in the opposite direction. This is shown as state two in the graph of FIG. 33.

In this state two, the summation of the error and the rate change of the error will begin to be monitored and when the polarity of this summation is again changed, the state counter 156 will increment to state three, thereby connecting the set of state three resistors across the instrumentation amplifier 82, the first operational amplifier 83*a* and the second operational amplifier 83*b* thus causing this device now to act as a single-state four-mode controller identical to that previously described. From the chart on FIG. 34 it can be seen that a great saving of time is achieved.

It should be understood that it is only the three-state differential input circuit 145, and in particular the three-state error and rate amplifier circuit 146 therein, which is changed to cause the controller to operate in these three different states and achieve this great increase in speed. The other circuits used in the single-state controller such as the various corrective action circuits, the valid range check circuit, the scaling and meter protection circuit, the buffer-scaler, the summing amplifier, the summing integrator, and the absolute value circuits operate exactly the same as they did before. It should be recognized that the polarity signal from the absolute value circuit must also be connected to the three-state error and rate amplifier circuit when using the corrective action circuits shown in FIGS. 7 and 8.

As before, the correction signal from the three-state error and rate amplifier circuit is supplied to the driver 43, which in turn is supplied to the operator 45. As before the operator may be any of several devices such as the two-directional switched driver as shown in FIG. 17, a reversible AC synchronous motor shown in FIG. 18, a reversible DC motor as shown in FIG. 19 or solenoids as shown in FIG. 20.

Typically the process speed improvement device 128 is a valve, while the second operator 127 is a solenoid, the combination comprising a solenoid valve. The second driver 126 is any driver capable of converting a logic level signal into a level capable of operating the process speed improvement device, and in the case of operating the solenoid valve might be one section of the quad 5 Amp DC driver as previously listed.

When the process speed improvement device is used in conjunction with our three-state four-mode process controller, the state one signal from the three-state error and rate amplifier circuit is connected to the second driver 126. In this case, the process speed improvement device is operated only when the three-state four-mode process controller is in its first state.

If the process speed improvement device is used in conjunction with the single-state process controller, the signal to the second driver 126 would be typically operated either manually or by the automation device for a limited time until the process correlate signal approaches the desired value signal, thereby decreasing the time required to control large changes in set point.

Another device which has proved particularly useful as an operator in connection with either the single-state or three-state four-mode controllers of our invention is a DC servo motor. For the operation of such a motor, the correction signal is supplied to a driver circuit whose function is to drive a DC servo motor in closed-loop operation so that the motor speed and direction is a direct function of the voltage and polarity of the correction signal. Details of such a driver circuit are well known in the art and can be found for example by referring to the application note AN4, Incremental Motion Servos, of PMI Motors, Division of Killmorgen Corporation, Syosset, N.Y.

Thus, in addition to providing a single state controller which uses the error difference and the rate of change of the error difference to provide the best available controller which conforms to past notions of controller theory and doesn't overshoot, by abandoning such past notions and intentionally overshooting a set point we have developed a process controller which is much faster than those previously available.

We claim:

1. A method of controlling a process using a three-state four-mode process controller including the steps of providing a desired value signal to said process controller related to the condition to which it is desired to set said process, providing a feedback signal to said process controller from the process being controlled indicating the current condition of the process, providing a reset state signal to said process controller adapted to insure that the process controller can be easily reset to a state one condition as desired, which causes said process controller to begin operation in its first state producing a correction signal causing the process device which changes the condition of the process to operate at a predetermined rapid speed in a first desired direction, utilizing said desired value, feedback, and reset state signals to cause said process controller to change to its second state of operation when the error difference between said desired value and said feedback signal changes polarity thereby producing a correction signal causing said process device to operate at a predetermined rapid speed in the opposite direction, utilizing said error difference, the rate of change of said error difference, and the reset state signal to cause said process controller to change to its third state of operation when the summation of said error difference and said rate of change of said error difference changes polarity, producing a correction signal from said desired value and said feedback signals while said process controller is in its third state which will look ahead and attempt to become saturated as soon as a new desired value is supplied or a process change occurs by utilizing said rate of change and said error difference, which will remain unchanged as long as the process being controlled, and said desired value signal both remain unchanged and in a static condition, which will, if saturated, be brought out of saturation by utilizing said error difference and said rate of change in a manner to change said correction signal in value much faster than if said error difference only were used, and which will, if said process is in a dynamic condition, be changed in a series of occurrences to a value smaller in magnitude, but of either polarity, until it arrives at a value related to said condition it is desired to set said process to, and utilizing said correction signal to cause said process to arrive at said desired condition.

2. The method defined in claim 1, wherein the steps of providing said desired value signal and of providing said reset state signal to said process controller include the steps of providing a desired setting device capable of supplying a reference voltage signal and said reset state signal, connecting said desired setting device in an appropriate manner to said process controller, and setting said desired setting device such that said desired reference voltage signal will be an output therefrom and said reset state signal will be a second output therefrom.

3. The method defined in claim 2, wherein the step of providing said desired setting device and connecting said desired setting device include the steps of providing a potentiometer and a pushbutton switch and directly connecting said potentiometer and said pushbutton switch to said process controller.

4. The method defined in claim 1, wherein the step of providing said desired value signal and said reset state signal to said process controller includes the steps of providing a desired setting device capable of supplying a reference voltage signal and said reset state signal, connecting to said desired setting device an automation device to automatically select said reset state signal if desired and automatically change said reference voltage signal from said desired setting device to a value appropriate to a next condition upon the completion of a test, and connecting said desired setting device to said process controller.

5. The method defined in claim 1, wherein the step of providing said feedback signal to said process controller includes the steps of providing a process measurment device capable of measuring the current state of the process being controlled, causing said process measurement device to supply a process correlate signal related to the current condition of the process, causing said process correlate signal to either be directly supplied to said process controller or to a feedback signal device capable of converting or signal conditioning said process correlate signal into a signal usable by and directly supplied to said process controller such that said signal supplied to said process controller is said feedback signal related to the current condition of the process being controlled.

6. The method defined in claim 1, wherein the step of producing a correction signal by utilizing said desired value, feedback and reset state signals includes the steps of providing a three state error and rate amplifier circuit, supplying said three state error and rate amplifier circuit with said desired value, feedback and reset state signals, and yielding a correction signal related to said reset state signal and to the algebraic sum of the actual error difference and the rate of change of said actual error difference between said feedback and desired value signals.

7. The method defined in claim 1, wherein the step of producing a correction signal by utilizing said desired value feedback, and reset state signals includes the steps of providing a three state error and rate amplifier circuit, providing a valid range check circuit, supplying said desired value, feedback, and reset state signals to said three state error and rate amplifier circuit, supplying high limit and low limit set points and said desired value signal into said valid range check circuit, providing an output from said valid range check circuit adapted to produce a saturation override signal if the desired value is outside said high or low limit set points, supplying said saturation override signal to said three state error and rate amplifier circuit, causing said three state error and rate amplifier circuit to provide a correction signal which is saturated when said process controller is in its first state or its second state or when said desired value signal is either above said high limit set point or below said low limit set point, and causing said three state error and rate amplifier circuit to provide a correction signal related to the algebraic sum of the actual error difference and the rate of change of said actual error difference between said feedback and desired value signals.

8. The method defined in claim 7, wherein the step of providing said three state error and rate amplifier circuit includes the steps of providing a first operational amplifier having positive and negative inputs and an output, providing a second operational amplifier having positive and negative inputs and an output, providing an instrumentation amplifier having positive and negative inputs, an output, and gain set inputs, providing an edge detector having an input, a pulse output, and a ground, providing a state counter device having a reset state input, a clock input, a clock inhibit input, a state one output, a state two output, and a state three output, connecting said reset state signal to said reset state input of said state counter device, connecting a polarity signal corresponding to the polarity of said correction signal to said input of said edge detector connecting said saturation override signal to said negative input of said instrumentation amplifier, connecting said output of said edge detector to said clock input of said state counter device, connecting said ground of said edge detector to ground, connecting said desired value signal to said positive input of said first operational amplifier, connecting said feedback signal to said positive input of said second operational amplifier, interposing a capacitor between said negative inputs of said first and said second operational amplifiers, connecting said state three output of said state counter device to said clock inhibit input thereof, connecting a first state three, a second state three and a third state three analog switch to said state three output of said state counter device, connecting a first state two, a second state two and a third state two analog switch to said state two output of said state counter device, connecting a first state one, a second state one and a third state one analog switch to said state one output of said state counter device, connecting said output of said first operational amplifier to said positive input of said instrumentation amplifier, connecting said first state three analog switch, said first state two analog switch, and said first state one analog switch to the negative input of said first operational amplifier, connecting between the output of said first operational amplifier and said first state three analog switch a first state three variable resistor, also connecting between the output of said first operational amplifier and said first state two analog switch a first state two variable resistor, connecting between the output of said first operational amplifier and said first state one analog switch a first state one variable resistor, connecting said second state three analog switch, said second state two analog switch, and said second state one analog switch to the negative input of said second operational amplifier, connecting between the output of said second operational amplifier and second state three analog switch a second state three variable resistor, connecting between the output of said second operational amplifier and said second state two analog switch a second state two variable resistor, connecting between the output of said second operational amplifier and said second state one analog switch a second state one variable resistor, connecting across said gain set inputs of said instrumentation amplifier in series a third state three variable resistor and said third state three analog switch, connecting across said gain set inputs of said instrumentation amplifier in series a third state two variable resistor and a third state two analog switch, connecting across the gain set input of said instrumentation amplifier in series a third state one variable resistor and said third state one analog switch, interposing a resistor between said output of said second operational amplifier and said negative input of said instrumentation amplifier, and obtaining said correction signal from said output of said instrumentation amplifier and providing a state one signal from said state one output of said state counter device.

9. The method defined in claim 8, wherein the step of producing a correction signal causing the process device which changes the condition of the process to operate at a predetermined rapid speed in a first desired direction includes the steps of causing said state counter device to operate in its state one condition thereby connecting said state one output to said first state one analog switch, said second state one analog switch, and said third state one analog switch thereby causing said first state one variable resistor to be connected in series with said first state one analog switch and causing both of said devices to be connected between said output of said first operational amplifier and said negative input of said first operational amplifier, causing said second state one variable resistor to be connected in series with said second state one analog switch and causing both of said devices to be connected between said output of said second operational amplifier and said negative input of said second operational amplifier, causing said third state one variable resistor to be connected in series with said third state one analog switch and causing both of said devices to be connected between said gain set inputs of said instrumentation amplifier, thereby obtaining said correction signal from said output of said instrumentation amplifier which causes said process device to operate at a predetermined rapid speed in a first desired direction.

10. The method defined in claim 9, wherein the step of producing a correction signal causing said process device to operate at a predetermined rapid speed in the opposite direction includes the steps of causing said state counter device to operate in its state two condition thereby connecting said state two output to said first state two analog switch, said second state two analog switch, and said third state two analog switch thereby causing said first state two variable resistor to be connected in series with said first state two analog switch and causing both of said devices to be connected between said output of said first operational amplifier and said negative input of said first operational amplifier, causing said second state two variable resistor to be connected in series with said second state two analog switch and causing both of said devices to be connected between said output of said second operational amplifier and said negative input of said second operational amplifier, causing said third state two variable resistor to be connected in series with said third state two analog switch and causing both of said devices to be connected between said gain set inputs of said instrumentation amplifier, thereby obtaining said correction signal from said output of said instrumentation amplifier which causes said process device to operate at a predetermined rapid speed in the opposite direction.

11. The method defined in claim 10, wherein the step of producing a correction signal from said desired value and said feedback signals while said process controller is in its third state, includes the steps of causing said state counter device to operate in its state three condition thereby connecting said state three output to said first state three analog switch, said second state three analog switch, and said third state three analog switch thereby causing said first state three variable resistor to be connected in series with said first state three analog switch and causing both of said devices to be connected between said output of said first operational amplifier and said negative input of said first operational amplifier, causing said second state three variable resistor to be connected in series with said second state three analog switch and causing both of said devices to be connected between said output of said second operational amplifier and said negative input of said second operational amplifier, causing said third state three variable resistor to be connected in series with said third state three analog switch and causing both of said devices to be connected between said gain set inputs of said instrumentation amplifier, thereby obtaining said correction signal from said output of said instrumentation amplifier which will look ahead and attempt to become saturated as soon as a new desired value is supplied or a process change occurs by utilizing said rate of change and said error difference, which will remain unchanged as long as the process being controlled and said desired value signal both remain unchanged and in a static condition, which will, if saturated, be brought out of saturation by utilizing said error difference and said rate of change in a manner to change said correction signal and value much faster than if said error difference only were used, and which will, if said process is in the dynamic condition, be changed in a series of occurances to a value smaller in magnitude, but of either polarity, until it arrives at a value related to said condition it is desired to set said process to.

12. The method defined in claim 1, wherein the step of utilizing said correction signal to cause said process to arrive at said desired condition includes the steps of providing a corrective action circuit, determining the absolute value of said correction signal, continuously comparing said absolute value of said correction signal with a deadband reference value, changing the output of said corrective action circuit if said absolute value of said correction signal is above said deadband reference, not changing said output if said absolute value is between zero and said deadband reference value, and utilizing said output to cause said process to arrive at said desired condition.

13. The method defined in claim 1, wherein the step of utilizing said correction signal to cause said process to arrive at said desired condition includes the steps of providing a corrective action circuit, supplying said correction signal to an absolute value circuit and to an analog switch through a scaling device, providing a connection between the output of said analog switch and an integrator, determining the absolute value of said correction signal, continuously comparing the absolute value of said correction signal with a deadband reference value, causing said analog switch to be enabled if the absolute value of said correction signal is above said deadband reference value thereby permitting a current flow proportional to said correction signal to enter said integrator and permit a change in the output of said corrective action circuit, causing said analog switch to be disabled if the absolute value of said correction signal is between zero and said deadband reference value, thereby permitting no current to flow from said analog switch to said integrator and permit no change in the output of said corrective action circuit to take place, and utilizing said output to cause said process to arrive at said desired condition.

14. The method defined in claim 1, wherein the step of utilizing said correction signal to cause said process to arrive at said desired condition includes the steps of providing a corrective action circuit, supplying said correction signal to an absolute value circuit and to a dual analog switch through a first scaling device, providing connections between said dual analog switch and a summing integrator, determining the absolute value of said correction signal, providing a polarity signal to said dual analog switch through a second scaling device equal to the polarity of said correction signal, continuously comparing the absolute value of said correction signal with a deadband reference value, causing said dual analog switch to be enabled if the absolute value of said correction signal is above said deadband reference value thereby permitting a first current flow proportional to said correction signal to enter said summing integrator, permitting a second current flow proportional to said polarity signal to enter said summing integrator and permitting a change in the output of said corrective action circuit, causing said dual analog switch to be disabled if the absolute value of said correction signal is between zero and said deadband reference value, thereby permitting no current to flow from said dual analog switch to said summing integrator and permitting no change in the output of said corrective action circuit, and utilizing said output to cause said process to arrive at said desired condition.

15. The method defined in claim 1, wherein the step of utilizing said correction signal to cause said process to arrive at said desired condition includes the steps of providing a corrective action circuit, determining the absolute value of said correction signal, providing a polarity signal corresponding to the polarity of said correction signal, continuously comparing the absolute value of said correction signal with a deadband reference value, providing a clock signal if the absolute value of said correction signal is greater than said deadband reference value, providing no clock output signal if the absolute value of said correction signal is between zero and said deadband reference value, and utilizing said clock output and said polarity signals to cause said process to arrive at said desired condition.

16. The method defined in any one claims 12–15, wherein the step of determining the absolute value of said correction signal includes the steps of providing a first absolute value circuit operational amplifier having a positive and negative input and an output, providing a second absolute value circuit operational amplifier having a positive and negative input and an output, connecting said positive input of said first absolute value circuit operational amplifier to analog common through a resistor having a value of $\frac{2}{3}$R, connecting said positive input of said second absolute value circuit operational amplifier to analog common through a resistor having a value of $\frac{2}{3}$R, connecting said negative input of said first absolute value circuit operational amplifier to a first summing junction, supplying said correction signal to a second summing junction through a resistor having a value of 2R and to said first summing junction through a resistor having a value of R, connecting between said first summing junction and said second summing junction two resistors in series, both having a value of R, providing a first steering diode having its anode connected to the junction of said two resistors in series and its cathode connected to said output of said first absolute value circuit operational amplifier, providing a second steering diode having its cathode connected to said first summing junction and its anode connected to the output of said first absolute value circuit operational amplifier, connecting the negative input of said second absolute value circuit operational amplifier to said second summing junction, connecting the output of said second absolute value circuit operational amplifier to said second summing junction through a resistor having a value of 2R, thereby causing the output of said second absolute value circuit amplifier to be the absolute value of said correction signal in which the magnitude is equal to or exceeds zero.

17. The method defined in any one of claims 14–15, wherein the steps of determining the absolute value of said correction signal and providing a polarity signal corresponding to the polarity of said correction signal includes the steps of providing a first absolute value circuit operational amplifier having a positive and negative input and an output, providing a second absolute value circuit operational amplifier having a positive and negative input and an output, providing a third absolute value circuit operational amplifier having a positive and negative input and an output, connecting said positive input of said first absolute value circuit operational amplifier to analog common through a resistor having a value of $\frac{2}{3}$R, connecting said positive input of said second absolute value circuit operational amplifier to analog common through a resistor having a value of $\frac{2}{3}$R, connecting said negative input of said first absolute value circuit operational amplifier to a first summing junction, supplying said correction signal to a second summing junction through a resistor having a value of 2R and to said first summing junction through a resistor having a value of R, connecting between said first summing junction and said second summing junction two resistors in series, both having a value of R, providing a first steering diode having its anode connected to the junction of said two resistors in series and its cathode connected to said output of said first absolute value circuit operational amplifier, providing a second steering diode having its cathode connected to said first summing junction and its anode connected to the output of said first absolute value circuit operational amplifier, connecting the negative input of said second absolute value circuit operational amplifier to said second summing junction, connecting the output of said second absolute value circuit operational amplifier to said second summing junction through a resistor having a value of 2R, thereby causing the output of said second absolute value circuit amplifier to be the absolute value of said correction signal in which the magnitude is equal to or exceeds zero, connecting the output of said first absolute value circuit operational amplifier to the negative input of said third absolute value circuit operational amplifier, connecting the positive input of said third absolute value circuit operational amplifier to analog common through a resistor having a value of R/10, forming a feedback loop by interposing a resistor having a value of 10R between said output and said positive input of said third absolute value circuit operational amplifier and obtaining a polarity signal from the output of said third absolute value circuit operational amplifier corresponding to the polarity of said correction signal.

18. The method defined in any one of claims 1–15, wherein the step of utilizing said correction signal to cause said process to arrive at said desired condition includes the steps of providing a driver, connecting said driver to an operator adapted to be connected to a process device, and supplying said output signal to said driver to cause said process to arrive at said desired condition.

19. The method defined in claim 15 wherein the step of utilizing said clock output and said polarity signals to cause said process to arrive at said desired condition includes the steps of providing a driver, connecting said driver to an operator adapted to a process device, and supplying said clock and said polarity signals to said driver to cause said process to arrive at said desired condition.

20. The method defined in claim 19, wherein said operator is in the form of a DC stepping motor, and said driver is in the form of a stepping motor driver adapted to receive said clock and said polarity signals to control said operator.

21. The method defined in claim 20, wherein said stepping motor driver includes a stepper translator connected to a quad 5 Amp DC driver and is adapted to receive said clock and said polarity signals and to control said operator.

22. The method defined in claim 19, wherein said operator is in the form of an AC synchronous motor.

23. The method defined in claim 19, wherein the step of providing said driver includes providing a two-directional switched driver.

24. The method defined in claim 23, wherein the step of supplying a two-directional switched driver includes the steps of providing an N assignment device, providing a divide by N circuit having an input, a preset input, and an ouput, connecting the clock signal to said input, connecting said N assignment device to said preset input, providing a retriggerible timer having an input and an output with said input connected to said output of said divide by N circuit, providing a first two input AND gate, providing a second two input AND gate, connecting the output of said retriggerible timer to one input each of said first two input and said second two input AND gates, providing an inverter gate connecting said polarity signal to the second input of said two input AND gate and to the input of said inverter gate, connecting the output of said inverter gate to the second input of said first two input AND gate, providing a first driver transistor having an emitter, a base and a collector, connecting said output of said first two input AND gate to the base of said first driver transistor, providing a first driver relay having a pair of contact connections, connecting said collector of said first driver transistor to said first driver relay, providing a second driver transistor having an emitter, a base, and a collector, connecting said output of said second two input AND gate to said base of said second driver transistor, providing a second driver relay having an input and a pair of contacts, connecting said collector of said second driver transistor to said input of said second driver relay, and connecting the emitter of said first and said second driver transistors to logic common.

25. The method defined in claim 2, wherein the step of providing said feedback signal to said process controller includes the steps of providing a process measurement device capable of measuring the current state of the process being controlled, causing said process measurement device to supply a process correlate signal related to the current condition of the process, causing said process correlate signal to either be directly supplied to said process controller or to a feedback signal device capable of converting or signal conditioning said process correlate signal into a signal usable by and directly supplied to said process controller such that said signal supplied to said process controller is said feedback signal related to the current condition of the process being controlled.

26. The method defined in claim 25, wherein the step of utilizing said correction signal to cause said process to arrive at said desired condition includes the steps of providing a corrective action circuit, determining the absolute value of said correction signal, continuously comparing said absolute value of said correction signal with a deadband reference value, changing the output of said corrective action circuit if said absolute value of said correction signal is above said deadband reference, not changing the output of said corrective action circuit if said absolute value is between zero and said deadband reference value, and utilizing said output to cause said process to arrive at said desired condition.

27. The method defined in claim 25, wherein the step of utilizing said correction signal to cause said process to arrive at said desired condition includes the steps of providing a corrective action circuit, supplying said correction signal to an absolute value circuit and to an analog switch through a scaling device, providing a connection between the output of said analog switch and an integrator, determining the absolute value of said correction signal, continuously comparing the absolute value of said correction signal with a deadband reference value, causing said analog switch to be enabled if the absolute value of said correction signal is above said deadband reference value thereby permitting a current flow proportional to said correction signal to enter said integrator and permit a change in the output of said corrective action circuit, causing said analog switch to be disabled if the absolute value of said correction signal is between zero and said deadband reference value, thereby permitting no current to flow from said analog switch to said integrator and permit no change in the output of said corrective action circuit to take place, and utilizing said output to cause said process to arrive at said desired condition.

28. A three-state four-mode process controller including means of accepting a desired value signal related to the condition to which it is desired to set said process, accepting a feedback signal from the process being controlled indicating the current condition of the process, accepting a reset state signal adapted to insure that the process controller can be easily reset to a state one condition as desired, which causes said process controller to begin operation in its first state, means to produce a correction signal while said process controller is in said first state which will cause the process device which changes the condition of the process to operate at a predetermined rapid speed in a first desired direction, utilizing said desired value, feedback, and reset state signals to cause said process controller to change to its second state of operation when the error difference between said desired value and said feedback signal changes polarity, means to produce a correction signal while said process controller is in said second state which will cause said process device to operate at a predetermined rapid speed in the opposite direction, utilizing said error difference, the rate of change of said error difference, and the reset state signal to cause said process controller to change to its third state of operation when the summation of said error difference and said rate of change of said error difference changes polarity, means to produce a correction signal from said desired value and said feedback signals while said process controller is in its third state which will look ahead and attempt to become saturated as soon as a new desired value is supplied or a process change occurs by utilizing said rate of change and said error difference, which will remain unchanged as long as the process being controlled, and said desired value signal both remain unchanged and in a static condition, which will, if saturated, be brought out of saturation by utilizing said error difference and said rate of change in a manner to change said correction signal in value much faster than if said error difference only were used, and which will, if said process is in a dynamic condition, be changed in a series of occurrences to a value smaller in magnitude, but of either polarity, until it arrives at a value related to said condition it is desired to set said process to, and utilizing said correction signal to cause said process to arrive at said desired condition.

29. The device defined in claim 28, wherein said means to accept said desired value signal and said reset state signal includes a desired setting device adapted to supply for acceptance by said process controller a voltage reference indicating a desired value and said reset state signal.

30. The device defined in claim 29, wherein said desired setting device is a potentiometer and a pushbutton switch.

31. The device defined in claim 28, wherein said means to accept said desired value signal and said reset state signal includes a desired setting device adapted to supply for acceptance by said process controller a reference voltage signal and said reset state signal and an automation device adapted to automatically select said reset state signal if desired and automatically change said reference voltage to a value appropriate to a next condition upon completion of a test.

32. The device defined in claim 28, wherein said means to accept a feedback signal includes a process measurement device adapted to provide a process correlate signal related to the current condition of the process and to supply for acceptance by said process controller a voltage signal indicating a feedback value related to the current condition of the process.

33. The device defined in claim 28, wherein said means to accept a feedback signal includes a process measurement device adapted to provide a process correlate signal related to the current condition of the process and a feedback signal device adapted to convert said process correlate signal to a voltage signal and to supply for acceptance by said process controller said voltage signal indicating a feedback value related to the current condition of the process.

34. The device defined in claim 33, wherein said feedback signal device is a pressure transducer.

35. The device defined in claim 28, wherein the means to produce a correction signal includes a three-state differential input circuit adapted to determine the error difference between said desired value signal and said feedback signal, determine the rate of change of said error difference, and supply said correction signal related to said reset state signal and to the algebraic sum of said error difference and said rate of change of said error difference.

36. The device defined in claim 35, wherein said three-state differential input circuit includes a three-state error and rate amplifier circuit, means to accept said feedback signal connected to said three-state error and rate amplifier circuit, and means to accept said desired value signal connected to said three-state error and rate amplifier circuit, means to accept said reset state signal connected to said three-state error and rate amplifier circuit, all adapted to enable said three-state error and rate amplifier circuit to provide a correction signal.

37. The device defined in claim 35, wherein said three-state differential input circuit includes a three-state error and rate amplifier circuit, a valid range check circuit, means to accept said feedback signal connected to said three-state error and rate amplifier circuit, means to accept said desired value signal connected to said three-state error and rate amplifier circuit, means to accept said reset state signal connected to said three-state error and rate amplifier circuit, all adapted to enable said three-state error and rate amplifier circuit to provide a correction signal.

38. The device defined in claim 35, wherein said three-state differential input circuit includes a three-state error and rate amplifier circuit, a valid range check circuit, a scaling and meter protection circuit, means to accept said feedback signal connected to said three-state error and rate amplifier circuit and to said scaling and meter protection circuits, means to accept said desired value signal connected to said three-state error and rate amplifier circuit and to said scaling and meter protection circuit, means to accept said reset state signal connected to said three-state error and rate amplifier circuit, all adapted to enable said three-state error and rate amplifier circuit to provide a correction signal and to enable said scaler and meter protection circuit to provide a deviation meter output signal.

39. The device defined in claim 38, wherein said scaling and meter protection circuit includes a first scaling operational amplifier having positive and negative inputs and an output, a second scaling operational amplifier having positive and negative inputs and an output, said desired value signal connected to said positive input of said first scaling operational amplifier, said feedback signal connected to said positive input of said second scaling operational amplifier, a first current limiting resistor connected to the output of said first scaling circuit operational amplifier, a second current limiting resistor connected to the output of said second scaling circuit operational amplifier, the negative input of said first scaling operational amplifier connected to said first current limiting resistor, the negative input of said second scaling circuit operational amplifier connected to said second current limiting resistor, and a scaling resistor connected to said negative input of said operational amplifier, all adapted to supply a differential output which is in the form of voltage and has limited current capacity such that a meter will not be over ranged.

40. The device defined in any one of claims 37–38, wherein said valid range check circuit includes a high limit comparator having positive and negative inputs and an output, a low limit comparator having positive and negative inputs and an output, a high limit set point connected to the positive input of said high limit comparator, a low limit set point connected to the positive input of said low limit comparator, said desired value signal connected to the negative input of said high limit and of said low limit comparator, a high limit diode having its cathode connected to said output of said high limit comparator, a low limit diode having its anode connected to the output of said low limit comparator, the anode of said high limit diode and the cathode of said low limit diode being connected together to form the saturation override signal supplied to said three-state error and rate amplifier circuit, all adapted to act in a manner to cause the correction signal to become saturated if said desired value signal is outside said high limit or said low limit set points, but to operate in a normal mode supplying said correction signal if said desired value is within said high limit and said low limit set points.

41. The device defined in any one of claims 36–38, wherein said three state error and rate amplifier circuit includes a first operational amplifier having positive and negative inputs and an output, a second operational amplifier having positive and negative inputs and an output, an instrumentation amplifier having positive and negative inputs, an output, and gain set inputs, an edge detector having an input, a pulse output, and a ground, a state counter device having a reset state input, a clock input, a clock inhibit input, a state one output, a state two output, and a state three output, with said reset state signal to said reset state input of said state counter device, said polarity signal corresponding to the polarity of said correction signal connected to said input of said edge detector, said saturation override signal connected to said negative input of said instrumentation amplifier, said output of said edge detector connected to said clock input of said state counter device, said ground of said edge detector being connected to ground, said desired value signal connected to said positive input of said first operational amplifier, said feedback signal connected to said positive input of said second operational amplifier, a capacitor interposed between said negative inputs of said first and said second operational amplifiers, said state three output of said state counter device connected to said clock inhibit input thereof, a first state three, a second state three and a third state three analog switch connected to said state three output of said state counter device, a first state two, a second state two and a third state two analog switch connected to said state two output of said state counter device, a first state one, a second state one and a third state one analog switch connected to said state one output of said state counter device, said output of said first operational amplifier connected to said positive input of said instrumentation amplfifer, said first state three analog switch, said first state two analog switch, and said first state one analog switch connected to the negative input of said first operational amplifier, a first state three variable resi.tor connected between the output of said first operational amplifier and said first state three analog switch, a first state two variable resistor connected between the output of said first operational amplifier and said first state two analog switch, a first state one variable resistor connected between the output of said first operational amplifier and said first state one analog switch, said second state three analog switch, said second state two analog switch, and said second state one analog switch also connected to the negative input of said second operational amplifier, a second state three variable resistor connected between the output of said second operational amplifier and second state three analog switch, a second state two variable resistor connected between the output of said second operational amplifier and said second state two analog switch, a second state one variable resistor connected between the output of said second operational amplifier and said second state one analog switch, a third state three variable resistor and said third state three analog switch connected across said gain set inputs of said instrumentation amplifier in series, a third state two variable resistor and a third state two analog switch connected across said gain set inputs of said instrumentation amplifier in series, a third state one variable resistor and said third state one analog switch connected across the gain set input of said instrumentation amplifier in series, a resistor interposed between said output of said second operational amplifier and said negative input of said instrumentation amplifier, all adapted to produce a correction signal which will when said state counter device is in its state one position drives said process device at its rapid determined speed in a first desired direction, which will, when said state counter device is in its second state drives said process device at its rapid predetermined speed in a direction opposite to said first desired direction, and which will, when said state counter is in its third state, provide a correction signal as a function of $$G_2\left[(F - DV) + C_1 \times (R_1 + R_2) \times \frac{d(F - DV)}{dt}\right].$$

42. The device defined in claim 41 wherein said edge detector comprises an exclusive-or gate having two inputs and an output with the output thereof serving as the output of said edge detector, a first edge detector resistor interposed between said input of said edge detector and said first input of said exclusive-or gate, a second edge detector resistor interposed between said input of said edge detector and said second input of said exclusive-or gate, and a capacitor interposed between said second input of said exclusive-or gate and ground.

43. The device defined in claim 28, wherein means to cause the process device to operate includes a corrective action circuit adapted to provide signals to a driving means to adjust said process device.

44. The device defined in claim 43, wherein said corrective action circuit is adapted to provide signals to said driving means to operate a stepping motor or a reversible device to adjust said process device and includes an absolute value circuit having an input adapted to receive said correction signal and having outputs consisting of a polarity signal and an absolute value signal equivalent to the absolute value of the correction signal, a deadband comparator having an input and an output with said input connected to the output of said absolute value circuit, means to supply deadband reference values to said deadband comparator, a summing amplifier having an input and an output, with said input connected to the absolute value output of said absolute value circuit, a voltage to frequency converter having an input and an output with said output in the form of a clock signal, with said input connected to the output of said summing amplifier, an analog switch having an input, a control input and an output with said input being connected to the output of said voltage to frequency converter and said control input being connected to the output of said deadband comparator, with said clock signal being passed through said analog switch and forming a clock output signal, with said clock output signal and said polarity signal supplied to said driving means thereby adjusting said process device.

45. The device defined in claim 44, wherein said driving means consists of a stepping motor translator.

46. The device defined in claim 45, wherein said stepping motor translator consists of a stepper translator connected to a quad 5 ADC driver.

47. The device defined in claim 44, wherein said driving means consists of a two directional switched driver.

48. The device defined in claim 43, wherein said corrective action circuit is adapted to provide signals to a driving means to operate an operator which is pneumatic in nature or requires a variable reference signal to adjust said process device and includes an absolute value circuit having an input adapted to receive said correction signal and an output, a scaling circuit having an input and an output, the input of said scaling circuit also connected to said correction signal, an analog switch having an input, a control input, and an output, the input thereof being connected to said output of said scaling circuit, deadband comparator having an input, a reference input, and an output, with said input thereof connected to said output of said absolute value circuit and said output of said deadband comparator connected to said control input of said analog switch, a means to supply deadband reference values, connected to said reference input of said deadband comparator, an integrator having an input and an output with said input thereof being connected to said output of said analog switch, a buffer-scaler having an input and an output with said input thereof connected to said output of said integrator circuit, and said output thereof supplying a signal to said driving means thereby adjusting said process device.

49. The device defined in claim 43, wherein said corrective action circuit is adapted to provide signals to a driving means to operate an operator which is pneumatic in nature or requires a variable reference signal to adjust the process device and includes an absolute value circuit having an input adapted to receive said correction signal, a polarity output, and an absolute value output a first scaling device having an input and an output with said input connected to said corrective signal, with said output connected to said input of said absolute value circuit, a second scaling device having an input and an output with the input thereof connected to said polarity output of said absolute value circuit, a dual analog switch having its two inputs connected to the outputs of said first and said second scaling device and having two outputs, a deadband comparator having an input, a reference input, an output, with said input thereof connected to said output of said absolute value circuit, with said output of said deadband comparator connected to the control input of said dual analog switch, means to supply said deadband reference values to said reference input of said deadband comparator, a summing integrator having two inputs and an output with said inputs thereof connected to said outputs of said dual analog switch, a buffer-scaler having an input and an output with said input of said buffer-scaler connected to the output of said summing integrator, and the output of said buffer-scaler adapted to supply a signal to said driving means thereby adjusting said process device.

50. The device defined in any one of claims 44–49, wherein said absolute value circuit includes a first absolute value circuit operational amplifier having positive and negative inputs and an output, an analog common, a resistor having a value of $\frac{2}{3}$ R connected between the positive input of said first absolute value circuit operational amplifier and analog common, a first summing junction, a connection between the negative input of said first absolute value circuit operational amplifier and said first summing junction, a resistor having a value of R adapted to receive said correction signal and connected to said first summing junction, a second summing junction, a resistor of value 2R interposed between said correction signal and said second summing junction, a junction point, a first resistor of value R interposed between said junction point and said first summing junction, a second resistor of value R interposed between said junction point and said second summing junction, a first steering diode having an anode and a cathode with said anode connected to said junction point and with said cathode connected to the output of said first absolute value circuit operational amplifier, a second steering diode having an anode and a cathode with its cathode connected to said first summing junction and its anode connected to the output of said first operational amplifier, a second absolute value circuit operational amplifier having positive and negative inputs and an output, with said negative input connected to said second summing junction, a resistor having a value of $\frac{2}{3}$ R interposed between analog common and the positive input of said second absolute value operational amplifier, a resistor of value 2R interposed between said output of said second absolute value circuit operational amplifier and said second summing junction, all adapted to provide a signal at the output of said second absolute value circuit operational amplifier corresponding to the absolute value of said correction signal.

51. The device defined in any one of claims 44–47, wherein said absolute value circuit includes a first absolute value circuit operational amplifier having positive and negative inputs and an output, an analog common, a resistor having a value of $\frac{2}{3}$ R connected between the positive input of said first absolute value circuit operational amplifier and analog common, a first summing junction, a connection between the negative input of said first absolute value circuit operational amplifier and said first summing junction, a resistor having a value of R adapted to receive said correction signal and connected to said first summing junction, a second summing junction, a resistor of value 2R interposed between said correction signal and said second summing junction, a junction point, a first resistor of value R interposed between said junction point and said first summing junction, a second resistor of value R interposed between said junction point and said second summing junction, a first steering diode having an anode and a cathode with said anode connected to said junction point and with said cathode connected to the output of said first absolute value circuit operational amplifier, a second steering diode having an anode and a cathode with its cathode connected to said first summing junction and its anode connected to the output of said first operational amplifier, a second absolute value circuit operational amplifier having positive and negative inputs and an output, with said negative input connected to said second summing junction, a resistor having a value of $\frac{2}{3}$ R interposed between analog common and the positive input of said second absolute value operational amplifier, a resistor of value 2R interposed between said output of said second absolute value circuit operational amplifier and said second summing junction, a third absolute value circuit operational amplifier having positive and negative inputs and an output, the negative input of said third absolute value circuit operational amplifier being connected to the output of said first absolute value circuit operational amplifier, a resistor having a value of R/10 connected between the positive input of said third operational amplifier and analog common, and a resistor of value 10R interposed between the output of said third absolute value circuit operational amplifier and its positive input, all adapted to provide a polarity signal at the output of said third absolute value circuit operational amplifier and to provide a signal corresponding to the absolute value of said correction signal at the output of said second absolute value circuit operational amplifier.

52. The device defined in any one of claims 44–47, wherein said summing amplifier includes an operational amplifier having a positive and negative input and an output, with said positive input connected to analog common through a resistor, a voltage follower circuit including the resistor of value Rf interposed between said output and said negative input of said operational amplifier, an adjustable resistor of value Rb connected to the negative input of said operational amplifier and adapted to receive said absolute value signal, and a base speed reference device also being connected through a resistor of value Ra to said negative input of said operational amplifier, all adapted to produce an output from said operational amplifier according to the function $$-Rf\frac{(Y+X)}{Ra\,Rb}.$$

53. The device defined in claim 48, wherein said integrator includes an integrator operational amplifier having positive and negative inputs and an output with said positive input of said integrator operational amplifier being connected to analog common, a capacitor being connected from said negative input of said integrator operational amplifier to said output thereof, and a resistor being connected to said negative input of said operational amplifier, all adapted to provide an output to said buffer-scaler.

54. The device defined in claim 49, wherein said summing integrator includes a summing integrator operational amplifier having positive and negative inputs and an output with the positive input of said summing integrator operational amplifier being connected to analog common, a pair of resistor connected to the negative input of said summing integrator operational amplifier, and a capacitor interposed between said negative input of said summing integrator operational amplifier and said output, all adapted to provide an output to said buffer-scaler.

55. The device defined in any one of claims 48–49, wherein said buffer-scaler includes an NPN transistor, a PNP transistor, the output signal from the integrator or summing integrator supplied to the base of both transistors, the collector of said NPN transistor connected to the positive power supply voltage, the collector of said PNP transistor connected to negative power supply voltage, and the emitters of both transistors connected to a scaling resistance Rs which provides an output signal to said driving means.

56. The device defined in claim 47, wherein the two-directional switched driver consists of a divide by N circuit having an input, a preset input, and an output, said clock output signal from said corrective action circuit being connected to said input of said divide by N circuit, an N assignment device connected to said preset input of said divide by N circuit, a retriggerible timer having an input and an output with said output of said divide by N circuit being connected to said input of said timer, a first two input AND gate and a second two input AND gate, said output of said timer connected to one input each of said first and said second two input AND gates, said polarity signal from said corrective action circuit connected to said second input of said second two input AND gate, an inverter having an input and an output, with said polarity signal from said corrective action circuit also being connected to said input of said inverter, and said output of said inverter being connected to said second input of said first two input AND gate, a first driver transistor having an emitter, a base and a collector, said output of said first two input AND gate connected to said base of said first driver transistor, said emitter of said first driver transistor connected to logic common, said output of said second two input AND gate connected to the base of said second driver transistor, said emitter of said second driver transistor being connected to logic common, a first driver relay connected to said collector of said first driver transistor, a second driver relay connected to said collector of said second driver transistor, and contact connections provided on said first driver relay and on said second driver relay for operating said operator thereby adjusting said process device.

57. The device defined in claim 29, wherein said means to accept said feedback signal includes a process measurement device adapted to provide a process correlate signal related to the current condition of the process and a feedback signal device adapted to convert said process correlate signal to a voltage signal and to supply for acceptance by said process controller said voltage signal indicating a feedback value related to the current condition of the process.

58. The device defined in claim 29, wherein the means to produce a correction signal includes a three-state differential input circuit adapted to determine the error difference between said desired value signal and said feedback signal, determine the rate of change of said error difference, and supply said correction signal related to said reset state signal and to the algebraic sum of said error difference and said rate of change of said error difference.

59. The device defined in claim 58, wherein said three-state differential input circuit includes an three-state error and rate amplifier circuit, a valid range check circuit, a scaling and meter protection circuit, means to accept said feedback signal connected to said three-state error and rate amplifier circuit and to said scaling and meter protection circuits, means to accept said desired value signal connected to said three-state error and rate amplifier circuit and to said scaling and meter protection circuit, means to accept said reset state signal connected to said three-state error and rate amplifier circuit, all adapted to enable said three-state error and rate amplifier circuit to provide a correction signal and to enable said scaler and meter protection circuit to provide a deviation meter output signal.

60. The device defined in claim 59, wherein said scaling and meter protection circuit includes a first scaling operational amplifier having positive and negative inputs and and output, a second scaling operational amplifier having positive and negative inputs and an output, said desired value signal connected to said positive input of said first scaling operational amplifier, said feedback signal connected to said positive input of said second scaling operational amplifier, a first current limiting resistor connected to the output of said first scaling circuit operational amplifier, a second current limiting resistor connected to the output of said second scaling circuit operational amplifier, the negative input of said first scaling operational amplifier connected to said first current limiting resistor, the negative input of said second scaling circuit operational amplifier connected to said second current limiting resistor, and a scaling resistor connected to said negative input of said operational amplifier, all adapted to supply a differential output which is in the form of voltage and has limited current capacity such that a meter will not be over ranged.

61. The device defined in claim 60, wherein said valid range check circuit includes a high limit comparator having positive and negative inputs and an output, a low limit comparator having positive and negative inputs and an output, a high limit set point connected to the positive input of said high limit comparator, a low limit set point connected to the positive input of said low limit comparator, said desired value signal connected to the negative input of said high limit and of said low limit comparator, a high limit diode having its cathode connected to said output of said high limit comparator, a low limit diode having its anode connected to the output of said low limit comparator, the anode of said high limit diode and the cathode of said low limit diode being connected together to form the saturation override signal supplied to said three-state error and rate amplifier circuit, all adapted to act in a manner to cause the correction signal to become saturated if said desired value signal is outside said high limit or said low limit set points, but to operate in a normal mode supplying said correction signal if said desired value is within said high limit and said low limit set points.

62. The device defined in claim 61, wherein said three state error and rate amplifier circuit includes a first operational amplifier having positive and negative inputs and an output, a second operational amplifier having positive and negative inputs and an output, an instrumentation amplifier having positive and negative inputs, an output, and gain set inputs, an edge detector having an input, a pulse output, and a ground, a state counter device having a reset state input, a clock input, a clock inhibit input, a state one output, a state two output, and a state three output, with said reset state signal to said reset state input of said state counter device, said polarity signal corresponding to the polarity of said correction signal connected to said input of said edge detector, said saturation override signal connected to said negative input of said instrumentation amplifier, said output of said edge detector connected to said clock input of said state counter device, said ground of said edge detector being connected to ground, said desired value signal connected to said positive input of said first operational amplifier, said feedback signal connected to said positive input of said second operational amplifier, a capacitor interposed between said negative inputs of said first and said second operational amplifiers, said state three output of said state counter device connected to said clock inhibit input thereof, a first state three, a second state three and a third state three analog switch connected to said state three output of said state counter device, a first state two, a second state two and a third state two analog switch connected to said state two output of said state counter device, a first state one, a second state one and a third state one analog switch connected to said state one output of said state counter device, said output of said first operational amplifier connected to said positive input of said instrumentation amplifier, said first state three analog switch, said first state two analog switch, and said first state one analog switch connected to the negative input of said first operational amplifier, a first state three variable resistor connected between the output of said first operational amplifier and said first state three analog switch, a first state two variable resistor connected between the output of said first operational amplifier and said first state two analog switch, a first state one variable resistor connected between the output of said first operational amplifier and said first state one analog switch, said second state three analog switch, said second state two analog switch, and said second state one analog switch also connected to the negative input of said second operational amplifier, a second state three variable resistor connected between the output of said second operational amplifier and second state three analog switch, a second state two variable resistor connected between the output of said second operational amplifier and said second state two analog switch, a second state one variable resistor connected between the output of said second operational amplifier and said second state one analog switch, a third state three variable resistor and said third state three analog switch connected across said gain set inputs of said instrumentation amplifier in series, a third state two variable resistor and a third state two analog switch connected across said gain set inputs of said instrumentation amplifier in series, a third state one variable resistor and said third state one analog switch connected across the gain set input of said instrumentation amplifier in series, a resistor interposed between said output of said second operational amplifier and said negative input of said instrumentation amplifier, all adapted to produce a correction signal which will when said state counter device is in its state one position drives said process device at its rapid determined speed in a first desired direction, which will, when said state counter device is in its second state drives said process device at its rapid predetermined speed in a direction opposite to said first desired direction, and which will, when said state couner is in its third state, provide a correction signal as a function of $$G_2\left[(F - DV) + C_1 \times (R_1 + R_2) \times \frac{d(F - DV)}{dt}\right].$$

63. The device defined in claim 62, wherein means to cause the process device to operate includes a corrective action circuit adapted to provide signals to a driving means to adjust said process device.

64. The device defined in claim 63, wherein said corrective action circuit is adapted to provide signals to said driving means to operate a stepping motor or a reversible device to adjust said process device and includes an absolute value circuit having an input adapted to receive said correction signal and having outputs consisting of a polarity signal and an absolute value signal equivalent to the absolute value of the correction signal, a deadband comparator having an input and an output with said input connected to the output of said absolute value circuit, means to supply deadband reference values to said deadband comparator, a summing amplifier having an input and an output, with said input connected to the absolute value output of said absolute value circuit, a voltage to frequency converter having an input and an output with said output in the form of a clock signal, with said input connected to the output of said summing amplifier, an analog switch having an input, a control input and an output with said input being connected to the output of said voltage to frequency converter and said control input being connected to the output of said deadband comparator, with said clock signal being passed through said analog switch and forming a clock output signal, with said clock output signal and said polarity signal supplied to said driving means thereby adjusting said process device.

65. The device defined in claim 64, wherein said driving means consists of a a stepping motor translator.

66. The device defined in claim 63, wherein said corrective action circuit is adapted to provide signals to a driving means to operate an operator which is pneumatic in nature or requires a variable reference signal to adjust the process device and includes an absolute value circuit having an input adapted to receive said correction signal, a polarity output, and an absolute value output a first scaling device having an input and an output with said input connected to said corrective signal, with said output connected to said input of said absolute value circuit, a second scaling device having an input and an outut with the input thereof connected to said polarity output of said absolute value circuit, a dual analog switch having its two inputs connected to the outputs of said first and said second scaling device and having two outputs, a deadband comparator having an input, a reference input, an output, with said input thereof connected to said output of said absolute value circuit, with said output of said deadband comparator connected to the control input of said dual analog switch, means to supply said deadband reference values to said reference input of said deadband comparator, a summing integrator having two inputs and an output with said inputs thereof connected to said outputs of said dual analog switch, a buffer-scaler having an input and an output with said input of said buffer-scaler connected to the output of said summing integrator, and the output of said buffer-scaler adapted to supply a signal to said driving means thereby adjusting said process device.

67. The device defined in any one of claims 64–66, wherein said absolute value circuit includes a first absolute value circuit operational amplifier having positive and negative inputs and an output, an analog common, a resistor having a value of $\frac{2}{3}$R connected between the positive input of said first absolute value circuit operational amplifier and analog common, a first summing junction, a connection between the negative input of said first absolute value circuit operational amplifier and said first summing junction, a resistor having a value of R adapted to receive said correction signal and connected to said first summing junction, a second summing junction, a resistor of value 2R interposed between said correction signal and said second summing junction, a junction point, a first resistor of value R interposed between said junction point and said first summing junction, a second resistor of value R interposed between said junction point and said second summing junction, a first steering diode having an anode and a cathode with said anode connected to said junction point and with said cathode connected to the output of said first absolute value circuit operational amplifier, a second steering diode having an anode and a cathode with its cathode connected to said first summing junction and its anode connected to the output of said first operational amplifier, a second absolute value circuit operational amplifier having positive and negative inputs and an output, with said negative input connected to said second summing junction, a resistor having a value of $\frac{2}{3}$R interposed between analog common and the positive input of said second absolute value operational amplifier, a resistor of value 2R interposed between said output of said second absolute value circuit operational amplifier and said second summing junction, a third absolute value circuit operational amplifier having positive and negative inputs and an output, the negative input of said third absolute value circuit operational amplifier being connected to the output of said first absolute value circuit operational amplifier, a resistor having a value of R/10 connected between the positive input of said third operational amplifier and analog common, and a resistor of value 10R interposed between the output of said third absolute value circuit operational amplifier and its positive input, all adapted to provie a polarity signal at the output of said third absolute value circuit operational amplifier and to provide a signal corresponding to the absolute value of said correction signal at the output of said second absolute value circuit operational amplifier.

68. The device defined in claim 64, wherein said summing amplifier includes an operational amplifier having a positive and negative input and an output, with said positive input connected to analog common through a resistor, a voltage follower circuit including the resistor of value Rf interposed between said output and said negative input of said operational amplifier, an adjustable resistor of value Rb connected to the negative input of said operational amplifier and adapted to receive said absolute value signal, and a base speed reference device also being connected through a resistor of value Ra to said negative input of said operational amplifier, all adapted to produce an output from said operational amplifier according to the function $$-Rf\frac{(Y+X)}{Ra\,Rb}.$$

69. The device defined in claim 66, wherein said summing integrator includes a summing integrator operational amplifier having positive and negative inputs and an output with the positive input of said summing integrator operational amplifier being connected to analog common, a pair of resistors connected to the negative input of said summing integrator operational amplifier, and a capacitor interposed between said negative input of said summing integrator operational amplifier and said output, all adapted to provide an output to said buffer-scaler.

70. The device defined in claim 69, wherein said buffer-scaler includes an NPN transistor, a PNP transistor, the output signal from the integrator or summing integrator supplied to the base of both transistors, the collector of said NPN transistor connected to the positive power supply voltage, the collector of said PNP transistor connected to negative power supply voltage, and the emitters of both transistors connected to a scaling resistance Rs which provides an output signal to said driving means.

71. A method of testing carburetors at any desired number of points in the carburetors operating range using subsonic flow to determine the air flow and fuel flow rate through the test carburetor, said method including the steps providing a suitable testing stand on which to mount the carburetor, providing a suitable hood above said testing stand adapted to sealingly enclose said carburetor, continuously controlling the pressure within said hood utilizing a hood pressure measurement and control system including a three-state four-mode process controller utilizing desired value, feedback, and reset state signals to cause said process controller to operate in said three states depending on the value of said signals so as to quickly produce the desired hood pressure at each point at which said carburetor test will take place in the best possible time, simultaneously controlling the pressure of the fuel entering the carburetor, simultaneously inducing air flow through said carburetor by providing a vacuum downstream of said carburetor, simultaneously determining the flow rate of air and fuel entering the carburetor, and simultaneously controlling the rotation of the carburetor throttle plate until the desired predetermined test condition is achieved.

72. A method of testing carburetors at any desired number of points in the carburetors operating range using subsonic flow to determine the air flow and fuel flow rate through the test carburetor, said method including the steps providing a suitable testing stand on which to mount the carburetor, providing a suitable hood above said testing stand adapted to sealingly enclose said carburetor, continuously controlling the pressure within said hood, simultaneously controlling the pressure of the fuel entering the carburetor, simultaneously inducing air flow through said carburetor by continuously controling the manifold vacuum across the carburetor utilizing a manifold vacuum measurement and control system including a three-state four-mode process controller utilizing desired value, feedback, and reset state signals to cause said process controller to operate in said three state depending on the value of said signals, simultaneously determining the flow rate of air and fuel entering the carburetor, and simultaneously controlling the rotation of the carburetor throttle plate until the desired predetermined test condition is achieved.

73. A method of testig carburetors at any desired number of points in the carburetors operating range using subsonic flow to determine the air flow and fuel flow rate through the test carburetor, said method including the steps providing a suitable testing stand on which to mount the carburetor, providing a suitable hood above said testing stand adapted to sealingly enclose said carburetor, continuously controlling the pressure within said hood, simultaneously controlling the pressure of the fuel entering the carburetor, simultaneously inducing air flow through said carburetor by providing a vacuum downstream of said carburetor, simultaneously determining the flow rate of air and fuel entering the carburetor, and simultaneously controlling the rotation of the carburetor throttle plate by the use of an air flow measurement and control system including a three-state fourmode process controller utilizing desired value, feedback, and reset state signals to cause said process controller to operate in said three state depending on the value of said signals until the desired predetermined test condition is achieved.

74. A method of testing carburetors at any desired number of points in the carburetors operating range using subsonic flow to determine the air flow and fuel flow rate through the test carburetor, said method including the steps providing a suitable testing stand on which to mount the carburetor, providing a suitable hood above said testing stand adapted to sealingly enclose said carburetor, continuously controlling the pressure within said hood,, simultaneously controlling the pressure of the fuel entering the carburetor by utilizing a three-state four-mode process controller utilizing desired value, feedback, and reset state signals to cause said process controller to operate in said three states depending on the value of said signals, simultaneously inducing air flow through said carburetor by providing a vacuum downstream of said carburetor, simultaneously determining the flow rate of air and fuel entering the carburetor, and simultaneously controlling the rotation of the carburetor throttle plate until the desired predetermined test condition is achieved.

75. A method of testing carburetors at any desired number of points in the carburetors operating range using subsonic flow to determine the air flow and fuel flow rate through the test carburetor, said method including steps providing a suitable testing stand on which to mount the carburetor, providing a suitable hood above said testing stand adapted to sealingly enclose said carburetor, continuously controlling the pressure within said hood utilizing a hood pressure measurement and control system including a three-state four-mode process controller utilizing desired value, feedback, and reset state signals to cause said process controller to operate in said three states depending on the value of said signals so as to quickly produce the desired hood pressure at each point at which said carburetor test will take place in the best possible time, simultaneously controlling the pressure of the fuel entering the carburetor, simultaneously inducing air flow through said carburetor by continuously controlling the manifold vacuum across the carburetor utilizing a manifold vacuum measurement ad control system including a three-state four-mode process controller, simultaneously determining the flow rate of air and fuel entering the carburetor, and simultaneously controlling the rotation of the carburetor throttle plate until the desired predetermined test condition is achieved.

76. A method of testing carburetors at any desired number of points in the carburetors operating range using subsonic flow to determine the air flow and fuel flow rate through the test carburetor, said method including the steps providing a suitable testing stand on which to mount the carburetor, providing a suitable hood above said testing stand adapted to sealingly enclose said carburetor, continuously controlling the pressure within said hood utilizing a hood pressure measurement and control system including a three-state four-mode process controller utilizing desired value, feedback, and reset state signals to cause said process controller to operate in said three states depending on the value of said signals so as to quickly produce the desired hood pressure at each point at which said carburetor test will take place in the best possible time, simultaneously controlling the pressure of the fuel entering the carburetor, simultaneously inducing air flow through said carburetor by continuously controlling the manifold vacuum across the carburetor utilizing a manifold vacuum measurement and control system including a three-state four-mode process controller, simultaneously determining the flow rate of air and fuel entering the carburetor, and simultaneously controlling the rotation of the carburetor throttle plate by the use of an air flow measurement and control system including a three-state four-mode process controller, simultaneously determining the flow rate of air and fuel entering the carburetor, and simultaneously controlling the rotation of the carburetor throttle plate by the use of an air flow measurement and control system including a three-state four-mode process controller until the desired predetermined test condition is achieved.

77. The method defined in any one of claims 71–76, and including the step of determining the mass air flow rate entering the carburetor.

78. The method defined in claim 77, and including the step of determining the mass fuel flow rate entering the carburetor.

79. The method defined in claim 78, and including the step of calculating the air/fuel ratio from the values of mass air flow and mass fuel flow previously determined.

80. The method defined in claim 79, with the carburetor system being used in a controlled environment room and keeping the pressure of the air entering said laminar flow tubes constant.

81. The method defined in claim 79, with the carburetor test system drawing air from an air supply system having controlled temperature, pressure and humidity and keeping the pressure of the air entering the system constant.

82. The method defined in claim 79, wherein the determining of the mass fuel flow rate includes the steps of providing a fuel supply, passing the fuel through a mass fuel flow transducer enroute to the carburetor, measuring the differential pressure across the fuel flow transducer and calculating the actual mass fuel flow rate from the differential pressure.

83. The method defined in claim 82, wherein said mass fuel flow transducer and differential pressure transducer is replaced by a volumetric flow transducer and including the steps of measuring the temperature of the fuel flowing to said carburetor and calculating the mass fuel flow rate from said measured values.

84. The method defined in claim 82, wherein the mass fuel flow transducer is replaced by a set of orifices, and the differential pressure is measured by a differential pressure transducer and including the steps of measuring the temperature of the fuel entering the carburetor and calculating the mass fuel flow rate from said measured values.

85. The method defined in claim 82, wherein the measuring of the actual fuel pressure entering the carburetor is performed by measuring the differential pressure between said transducer and the air pressure inside said test chamber and calculating the fuel pressure from said measurements.

86. The method defined in claim 82, and including the steps of measuring and calculating manifold vacuum across said carburetor.

87. The method defined in claim 86, and including the step of providing a conduit having an inlet and an outlet, connecting the inlet of said conduit to said hood and connecting the outlet of said conduit to said hood pressure measurement and control system.

88. The method defined in claim 87, wherein a process speed improvement device is included in said hood pressure measurement and control system.

89. The method defined in claim 88, wherein the step of providing said process speed improvement device includes the step of providing an inline valve and connecting a valve operator to said inline valve adapted to be controlled by said hood pressure measurement and control system.

90. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood utilizing a hood pressure measurement and control system including a three-state four-mode process controller utilizing desired value, feedback, and reset state signals to cause said process controller to operate in said three states depending on the value of said signals so as to quickly produce the desired hood pressure at each point at which said carburetor test will take place in the best possible time, means to simultaneously control the pressure of the fuel entering the carburetor, means to simultaneously induce air flow through said carburetor, means to simultaneously determine the flow rate of air and fuel entering the carburetor, and means to simultaneously control the rotation of the carburetor throttle plate until the desired predetermined test condition is achieved.

91. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood, means to simultaneously control the pressure of the fuel entering the carburetor, means to simultaneously induce air flow through said carburetor by continuously controlling the manifold vacuum across the carburetor utilizing a manifold vacuum measurement and control system including a three-state four-mode process controller utilizing desired value, feedback, and reset state signals to cause said process controller to operate in said three states depending on the value of said signals, means to simultaneously determine the flow rate of air and fuel entering the carburetor, and means to simultaneously control the rotation of the carburetor throttle plate until the desired predetermined test condition is achieved.

92. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood, means to simultaneously control the pressure of the fuel entering the carburetor, means to simultaneously induce air flow through said carburetor, means to simultaneously determine the flow rate of air and fuel entering the carburetor, and means to simultaneously control the rotation of the carburetor throttle plate by the use of an air flow measurement and control system including a three-state four-mode process controller utilizing desired value, feedback, and reset state signals to cause said process controller to operate in said three states depending on the value of said signals until the desired predetermined test condition is achieved.

93. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood, means to simultaneously control the pressure of the fuel entering the carburetor by utilizing a three-state four-mode process controller utilizing desired value, feedback, and reset state signals to cause said process controller to operate in said three states depending on the value of said signals, means to simultaneously induce air flow through said carburetor, means to simultaneously determine the flow rate of air and fuel entering the carburetor, and means to simultaneously control the rotation of the carburetor throttle plate until the desired predetermined test condition is achieved.

94. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood utilizing a hood pressure measurement and control system including a three-state four-mode process controller so as to quickly produce the desired hood pressure at each point at which said carburetor test will take place in the best possible time, means to simultaneously control the pressure of the fuel entering the carburetor, means to simultaneously induce air flow through said carburetor by continuously controlling the manifold vacuum across the carburetor utilizing a manifold vacuum measurement and control system including a three-state four-mode process controller utilizing desired value, feedback, and reset state signals to cause said process controller to operate in said three states depending on the value of said signals, means to simultaneously determine the flow rate of air and fuel entering the carburetor, and means to simultaneously control the rotation of the carburetor throttle plate until the desired predetermined test condition is achieved.

95. An apparatus for testing carburetors at any desired number of points in the carburetors operating range using subsonic flow to determine the air flow and fuel flow rate through the test carburetor, said apparatus including means to provide a suitable testing stand on which to mount the carburetor, means to provide a suitable hood above said testing stand adapted to sealingly enclose said carburetor, means to continuously control the pressure within said hood utilizing a hood pressure measurement and control system including a three-state four-mode process controller utilizing desired value, feedback, and reset state signals to cause said process controller to operate in said three states depend on the value of said signals so as to quickly produce the desired hood pressure at each point at which said carburetor test will take place in the best possible time, means to simultaneously control the pressure of the fuel entering the carburetor, means to simultaneously induce air flow through said carburetor by continuously controlling the manifold vacuum across the carburetor utilizing a manifold vacuum measurement and control system including a three-state four-mode process controller, means to simultaneously determine the flow rate of air and fuel entering the carburetor, and means to simultaneously control the rotation of the carburetor throttle plate by the use of an air flow measurement and control system including a three-state four-mode process controller until the desired predetermined test condition is achieved.

96. The apparatus defined in any one of claims 90–95, and including means to determine the mass fuel flow rate entering the carburetor.

97. The apparatus defined in claim 96, and including means to determine the mass air flow rate entering the carburetor.

98. The apparatus defined in claim 97, and including means to calculate the air/fuel ratio of said carburetor from the values of mass air flow and mass fuel flow.

99. The apparatus as defined in claim 98, wherein the means to induce an air flow through the inlet of said chamber including a vacuum producing means, a first conduit connected to an air supply controlled as to temperature, pressure and humidity, an enlarged chamber having an inlet and an outlet, with the inlet thereof connected to said first conduit, a second conduit connected to said outlet with the other end of said second conduit communicating with said test chamber, a wall dividing said enlarged chamber into two portions and at least one flow restricting device mounted through said wall to allow air to pass through said chamber, an air flow differential pressure transducer to sense the pressure drop across said flow restricting device and to provide a signal related to said pressure drop, means to obtain the absolute pressure upstream of said flow restricting device, means to sense the temperature upstream of said flow restricting device, means to calculate from the differential pressure, absolute pressure and temperature the actual mass flow rate of air passing through said flow restricting device.

100. The apparatus as defined in any one of claims 90 or 94–95, and including a conduit having an inlet and an outlet, said inlet of said conduit connected to said sealed space under said hood, said outlet of said conduit being connected to said hood pressure measurement and control system.

101. The apparatus defined in claim 100, wherein a process speed improvement device is included in said hood pressure measurement and control system.

102. The apparatus defined in claim 101, and including an operator connected to said process speed improvement device, a driver connected to said operator and said hood pressure measurement and control system.

103. The apparatus defined in claim 102, wherein said process speed improvement device is in the form of a valve.

104. The device defined in claim 103, wherein said valve is adapted to snap shut as soon as said hood pressure measurement and control system is caused to go to its first state.

* * * * *